US012756571B2

(12) United States Patent
Ott et al.

(10) Patent No.: US 12,756,571 B2
(45) **Date of Patent: *Oct. 6, 2026**

(54) METHODS AND SYSTEMS FOR IDENTITY VERIFICATION USING VOICE AUTHENTICATION

(71) Applicant: Aegis-CC LLC, Los Angeles, CA (US)

(72) Inventors: Alexander Tai Ott, Los Angeles, CA (US); Gary Dean Ott, Los Angeles, CA (US)

(73) Assignee: Aegis-CC LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/455,516

(22) Filed: Jan. 21, 2026

(65) Prior Publication Data

US 2026/0205298 A1 Jul. 16, 2026

Related U.S. Application Data

(63) Continuation-in-part of application No. 19/364,127, filed on Oct. 21, 2025, which is a continuation of (Continued)

(51) Int. Cl.
*H04L 9/08* (2006.01)
*H04L 9/32* (2006.01)

(52) U.S. Cl.
CPC .......... *H04L 9/3231* (2013.01); *H04L 9/0863* (2013.01); *H04L 9/3228* (2013.01)

(58) Field of Classification Search
CPC .... H04L 9/3231; H04L 9/0863; H04L 9/3228

(Continued)

(56) References Cited

U.S. PATENT DOCUMENTS 5,506,631 A * 4/1996 Boothe ................ A61B 5/4863 351/200
7,027,621 B1 * 4/2006 Prokoski .............. G06V 40/165 340/576

(Continued)

FOREIGN PATENT DOCUMENTS

KR 102320921 B1 11/2021
WO WO 2021037788 3/2021

(Continued)

OTHER PUBLICATIONS

Meunier et al., "A video-based image processing system for the automatic implementation of the eye involuntary reflexes measurements involved in the Drug Recognition Expert (DRE)," Mar. 31, 2008.

(Continued)

*Primary Examiner* — Thanh T Le
(74) *Attorney, Agent, or Firm* — Knobbe, Martens, Olson & Bear LLP

(57) ABSTRACT

During a voice authentication process, a code is transmitted to a first user electronic address. A determination is made as to whether the code was received from the first user and a second user within a threshold time period, and if so, the first and second users are enabled to record a consent verification script. Characteristics of the first user recording are compared with those of a first user reference voice recording to determine whether they are from the same person. Characteristics of the second user recording are compared with those of a second user reference voice recording to determine whether they are from the same person. In response to determining that the first recording and the first user reference voice recording are from the same person and that the second recording and the second user reference voice (Continued)

recording are from the same person a consent verification indication is generated.

28 Claims, 33 Drawing Sheets

Related U.S. Application Data application No. 18/439,548, filed on Feb. 12, 2024, now Pat. No. 12,470,395.

(60) Provisional application No. 63/489,976, filed on Mar. 13, 2023.

(58) Field of Classification Search
USPC .......................................................... 713/186
See application file for complete search history.

(56) References Cited

U.S. PATENT DOCUMENTS

| | | | | |
|---|---|---|---|---|
| 7,158,776 | B1 * | 1/2007 | Estes | H04L 63/0892 455/410 |
| 7,357,507 | B2 * | 4/2008 | Waldorf | A61B 3/112 351/221 |
| 8,226,574 | B2 | 7/2012 | Whillock et al. | |
| 8,783,869 | B2 | 7/2014 | Harris et al. | |
| 8,899,748 | B1 * | 12/2014 | Migdal | A61B 5/004 351/210 |
| 9,002,067 | B2 * | 4/2015 | Siilats | G06T 7/20 382/107 |
| 9,042,615 | B1 * | 5/2015 | Bradley | G06T 7/0014 382/128 |
| 9,357,918 | B1 | 6/2016 | Cohen | |
| 9,357,966 | B1 * | 6/2016 | Cohen | A61B 5/4845 |
| 9,380,958 | B2 | 7/2016 | Harris et al. | |
| 9,475,387 | B2 * | 10/2016 | Wu | B60K 28/06 |
| 9,655,509 | B2 | 5/2017 | Rotenstreich et al. | |
| 9,916,844 | B2 * | 3/2018 | Bae | G10L 25/66 |
| 9,934,544 | B1 * | 4/2018 | Whitfield | G06Q 50/265 |
| 10,390,802 | B1 * | 8/2019 | Picard | A61B 3/113 |
| 10,470,657 | B1 | 11/2019 | Lister | |
| 10,761,084 | B1 * | 9/2020 | Lantz | G01N 33/4972 |
| 10,880,241 | B2 * | 12/2020 | Nigam | H04M 1/72424 |
| 11,013,441 | B2 | 5/2021 | Samadani | |
| 11,406,262 | B2 * | 8/2022 | Zahrt | A61B 5/4863 |
| 11,426,107 | B2 * | 8/2022 | Gibbons | A61B 5/165 |
| 2006/0286969 | A1 * | 12/2006 | Talmor | G06F 21/32 379/142.01 |
| 2006/0293891 | A1 * | 12/2006 | Pathuel | G06F 21/32 704/E17.003 |
| 2007/0236662 | A1 * | 10/2007 | Waldorf | A61B 3/14 351/206 |
| 2007/0236663 | A1 * | 10/2007 | Waldorf | G16H 50/30 351/206 |
| 2008/0091425 | A1 * | 4/2008 | Kane | G10L 17/04 704/270.1 |
| 2008/0192202 | A1 | 8/2008 | Lewkowski | |
| 2009/0319274 | A1 * | 12/2009 | Gross | G10L 17/22 704/260 |
| 2010/0158207 | A1 * | 6/2010 | Dhawan | H04M 1/2478 379/88.02 |
| 2014/0276090 | A1 * | 9/2014 | Breed | A61B 5/1455 600/473 |
| 2015/0164416 | A1 * | 6/2015 | Nothacker | G01N 33/4972 340/573.1 |
| 2015/0326570 | A1 * | 11/2015 | Publicover | H04W 12/065 382/117 |
| 2016/0379669 | A1 * | 12/2016 | Bae | A61B 5/4845 704/232 |
| 2017/0301353 | A1 * | 10/2017 | Mozer | G10L 17/02 |
| 2018/0047397 | A1 * | 2/2018 | Grover | G10L 17/06 |
| 2018/0333092 | A1 | 11/2018 | Roshan et al. | |
| 2019/0189132 | A1 * | 6/2019 | Viswanathan | G10L 15/22 |
| 2020/0058086 | A1 * | 2/2020 | Carmichael | G06Q 50/18 |
| 2020/0184979 | A1 * | 6/2020 | Keret | G10L 25/51 |
| 2020/0193857 | A1 * | 6/2020 | Stephens | G06F 3/013 |
| 2020/0213253 | A1 * | 7/2020 | Nigam | H04L 51/222 |
| 2020/0351095 | A1 * | 11/2020 | Yadav | H04L 9/3239 |
| 2021/0125619 | A1 * | 4/2021 | López Espejo | H04L 63/0861 |
| 2021/0141896 | A1 * | 5/2021 | Streit | G06V 40/16 |
| 2021/0156864 | A1 | 5/2021 | Osman et al. | |
| 2021/0173915 | A1 * | 6/2021 | Keith, Jr. | G06F 21/32 |
| 2021/0193151 | A1 * | 6/2021 | Song | G10L 17/00 |
| 2021/0286866 | A1 * | 9/2021 | Jin | G06V 40/1329 |
| 2021/0390962 | A1 * | 12/2021 | Berkeland | G10L 17/24 |
| 2021/0393180 | A1 * | 12/2021 | Vallejo | A61B 3/113 |
| 2022/0029981 | A1 * | 1/2022 | Mavani | G06F 9/453 |
| 2022/0073079 | A1 * | 3/2022 | Nilsson | G06V 10/764 |
| 2022/0115023 | A1 * | 4/2022 | Cora | G06F 21/32 |
| 2022/0156864 | A1 * | 5/2022 | Furman | G06Q 50/265 |
| 2022/0211266 | A1 * | 7/2022 | Brewer | G06V 40/18 |
| 2022/0211310 | A1 * | 7/2022 | Zakariaie | A61B 3/145 |
| 2022/0354364 | A1 | 11/2022 | Zahrt | |
| 2023/0107624 | A1 * | 4/2023 | Keith, Jr. | G06F 21/32 704/249 |
| 2023/0233120 | A1 * | 7/2023 | Fichtler | A61B 5/7264 600/301 |
| 2023/0294514 | A1 * | 9/2023 | Mohanty | A61B 5/14546 180/272 |

FOREIGN PATENT DOCUMENTS

| | | |
|---|---|---|
| WO | WO 2022084076 | 4/2022 |
| WO | WO 2022212259 | 10/2022 |
| WO | WO 2022256943 A1 | 12/2022 |
| WO | WO 2023121929 | 6/2023 |

OTHER PUBLICATIONS

PCT Search Report regarding International Application No. PCT/US2024/015605, mailed Jul. 22, 2024, 16 pages.

Romano et al., "Gaze-evoked nystagmus induced by alcohol intoxication," 26 pages, Jan. 17, 2017.

Simsek et al., "The Early Effects of Alcohol Consumption on Functional Visual Acuity, Tear Functions, and the Ocular Surface," Eye & Contact Lens, vol. 47, No. 1, Jan. 2021, 7 pages.

Strand et al., "Nystagmus Among Suspected Amphetamine Impaired Drivers," Journal of Forensic and Legal Medicine, vol. 95, No. 102502, (date: 2023), https:/doi.org/10.1016/j.jlm.2023.102502, 3 pages.

Zielke et al., "Using Design-Based Research to Develop a Virtual Human Interface for Police Nystagmus Training," Aug. 5, 2010.

* cited by examiner

FIG. 4C
CLOSE
Collect Voice Sample
Record your sample
Record your voice sample when reading the following passage out loud.
TEXT PASSAGE
Eu eleifend massa egestas dictumst faucibus congue fringilla in.
Dolor aliquam est turpis ipsum faucibus bibendum fringilla.
Erat duis cursus quisque sapien vitae urna id.
5:00 / 0:10
Recording...
CONTINUE

The example profile user interface illustrated in Figure 5H may be presented (e.g., in response to all users in the consent process submitting the consent code discussed above).

METHODS AND SYSTEMS FOR IDENTITY VERIFICATION USING VOICE AUTHENTICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

An aspect of the present disclosure is related to identity verification and in particular to identity verification using biometrics.

Description of the Related Art

Certain conventional user verification techniques, that utilize documents such as credit cards or driver's license to perform verification, are often unsatisfactory, as such documents are easy to counterfeit. Certain other conventional verification techniques utilize biometrics, such as facial recognition and fingerprint recognition. However, such conventional biometric verification techniques often fail to determine whether a given face is a copy (e.g., a mask of the face of the person being verified) or a fingerprint is a copy (e.g., where a person's fingerprint is collected and copied using a 3D-printed mold). A further disadvantage of certain conventional authentication techniques is that they fail to determine whether the provision of the user's physical characteristic for biometric verification is coerced or provided while the user is intellectually incapacitated (e.g., as a result of drug or alcohol use).

Thus, what is needed are technical solutions that overcome some or all of the foregoing disadvantages of conventional verification techniques.

Figure 1:
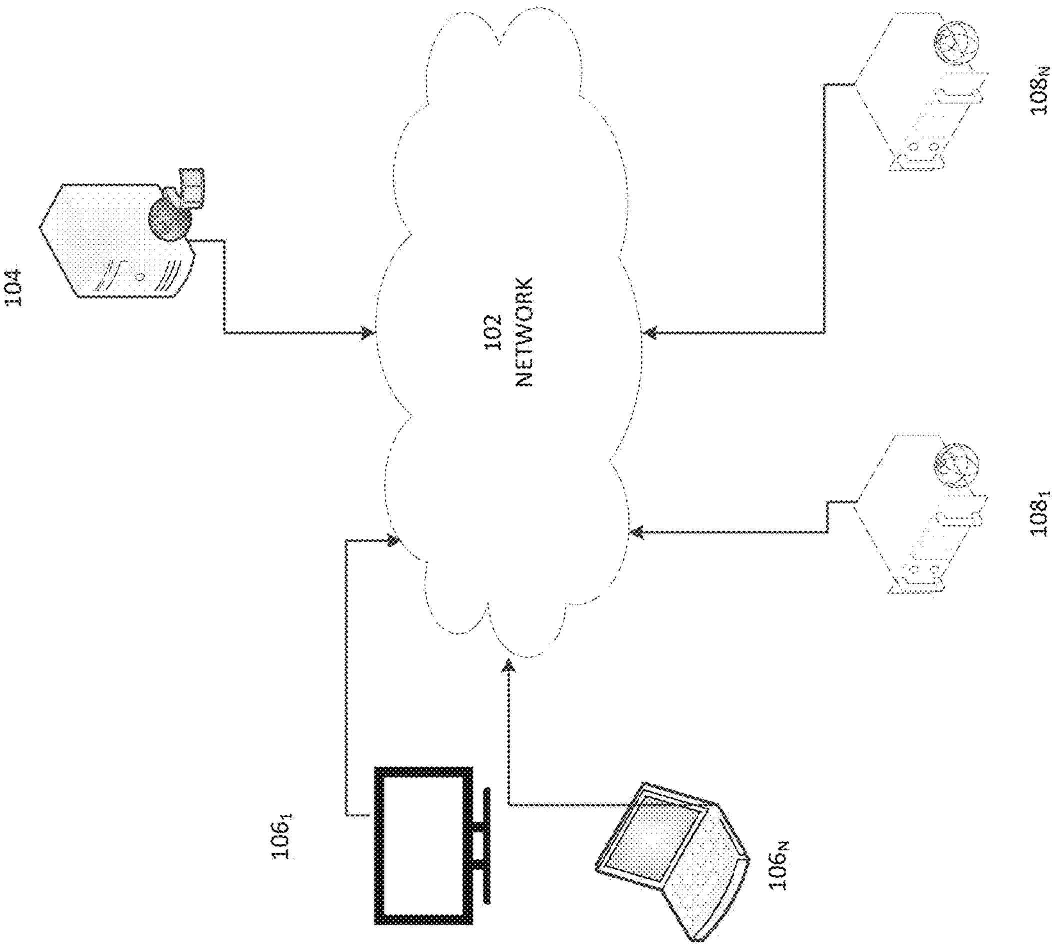
FIG. 1 illustrates an example environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Methods and systems are described that are configured to verify that an input from a person claiming a user identity is indeed the user. Such verification may optionally include multifactor authentication.

As previously discussed herein, certain conventional user verification techniques, that utilize documents such as credit cards or driver's license to perform verification, are often unsatisfactory, as such documents are easy to counterfeit. Certain other conventional verification techniques utilize biometrics, such as facial recognition and fingerprint recognition. However, such conventional biometric verification techniques often fail to determine whether a given face or fingerprint is merely a copy provided by someone that is trying to fool the verification process. A further disadvantage of certain conventional authentication techniques is that they fail to determine whether the provision of the user's physical characteristic for biometric verification is coerced or not, or provided while the user is intellectually incapacitated (e.g., as a result of drug or alcohol use).

Aspects of the present disclosure are related to verification techniques that overcome some or all of the foregoing disadvantages of conventional verification techniques. An aspect of the present disclosure relates to receiving consent from a user with respect to a future action, and verifying that the consent actually comes from the user.

It is understood that although certain examples described herein are related to using intoxication detection services in order to determine whether a subject has the intellectual ability to provide consent, one or more of the intoxication detection services may be utilized for other purposes. For example, the intoxication detection services may be utilized to detect whether a subject has the intellectual/mental/motor control capacity to operate a motor vehicle (e.g., a ground vehicle, an air vehicle, a water vehicle). In response to detecting that a subject's state of intoxication is at a certain level that indicates that the user is unable to safely operate the vehicle (or other device), the service may disable the ability of the vehicle to be driven, flown, or sailed as the case may be. Thus, the disclosed detection services may be utilized to advantageously keep vehicle operators, passengers, pedestrians and others safe and to generally inhibit the unsafe operation of devices.

For example, the disclosed systems and processes may be utilized to prevent an intoxicated subject from operating a vehicle by integrating the disclosed intoxication-detection services with a vehicle's onboard control, access, and/or ignition-management subsystems. In this aspect, the subject may use a mobile device or in-vehicle interface equipped with a camera and/or microphone to capture real-time biometric data, optionally including voice recordings, eye-tracking imagery, pupillary response data, blink-rate information, ptosis measurements, redness measurements, wetness measurements, and/or scleral measurements. These inputs are analyzed by the system's voice analysis service, pupil analysis service, blink-rate analysis service, nystagmus analysis service, sclera redness detection service, sclera surface area determination service, light refraction measurement service, and/or tear meniscus layer analysis service, to determine whether the subject exhibits characteristics consistent with intoxication, cognitive impairment, and/or diminished motor control.

If one or more intoxication indicators exceed a predetermined threshold, the system may generate an intoxication determination signal and transmit it (e.g., directly or via a connected mobile device) to the vehicle's electronic control system. In response, the vehicle may automatically disable ignition, restrict engine start functions, and/or place the vehicle into an immobilized or limited-operation mode. Optionally, the system may require periodic reassessment during operation (e.g., every 10 minutes, 30 minutes, 60 minutes, 120 minutes, other time frame, which the vehicle is turned off and then on again, and/or the like), ensuring that an individual who becomes impaired while driving is detected and the vehicle can be safely slowed, stopped, or prevented from continuing operation. By linking biometric intoxication assessment to real-time vehicle access and control decisions, the disclosed system advantageously enhances public safety and helps prevent impaired operation of cars, boats, aircraft, other motorized vehicles, and/or devices.

An aspect of the present disclosure relates to receiving consent from two (or more) users from respective user devices with respect to a future action between the two users, verifying that the consent actually came from each of the two (or more) users, and determining a likelihood that the consent was voluntarily given and/or was given while the user lacked the intellectual capacity (e.g., as a result of intoxication resulting from drug or alcohol user) to provide such consent. Such consent may be recorded and such recordation may be encrypted to enhance security and privacy.

Certain example aspects will now be discussed with reference to the figures. FIG. 1 illustrates an example environment. A verification system 104 (which may include a consent verification component, a voice analysis component, a geolocation component, a content distribution component, a test component, and/or a communication component) is connected to a network 102 (e.g., a wide area network, the Internet, a local area network, or other network). The verification system 104 is configured to communicate with client devices $\mathbf{106}_1 \ldots \mathbf{106}_n$ (e.g., smartphones, laptops, desktops, game consoles, connected televisions, streaming devices that connect to televisions or computers, networked wearables, etc. Associated with respective users). A client device 106 (which may be referred to herein as a user device) may host a browser (which may be used to access, from a remote server, and render user interfaces and data described herein, and to enable a user to provide data and instructions) and/or a consent application (e.g., an "app" downloaded from an application ("app") store that provides functionality described herein). The verification system 104 may provide and/or populate user interfaces, such as those described herein.

The system 104 may store user records, where a given user record (e.g., an account record) may include some or all of the following data: a user name, age, email address, physical address, phone number, texting address, educational institution the user is currently attending, profile data (e.g., gender, sexuality, sexual partner preferences, age, educational institution the user is currently attending, and/or other user information, which may be provided by the user), records of consent processes successfully conducted with other users (optionally including consent video recordings, as described herein), records of consent processes unsuccessfully conducted with other users, indications to whether the user is currently prohibited from using the system 104 and/or certain system functionality (e.g., the consent functionality), a record of consent related courses the user has consumed (e.g., viewed and/or heard), a record of consent related tests the user has completed and related scores, and/or other user-related data described herein). Some or all of the user record may be encrypted and access may be limited to certain authorized administrators to enhance security and privacy.

The system 104 may be configured to stream and/or download educational video content to devices 106 as described herein. As described herein, the verification system 104 may enable users, via client devices 106, to record mutual consent to various activities with each other, and to perform voice analysis to ensure that consent is voluntary and that a user is not intellectually or mentally incapacitated. The verification system 104 may optionally be configured to provide educational content regarding such activities, test users on their comprehension of the educational content, and/or enable users to quickly access resources, such as security and counseling services by way of example.

The verification system 104 may receive recordings (e.g., video recordings with an audio track, or audio track only) from client devices 106. For example, as will be described herein, a user may, via a consent application hosted on a client device 106, make a recording of the user reading a predefined script (which may include locations where the user is to insert non-scripted language, such as the user's name), wherein the script corresponds to the type of consent the user is giving. The verification system 104 may also receive geolocation data from the client device 106 (e.g., satellite positioning data, such as GPS data, that may indicate the user's latitude, longitude, and optionally, altitude; Wi-Fi geolocation data, cell tower triangulation geolocation data and/or the like). Such geolocation data may optionally be utilized by the consent process as described elsewhere herein, and in providing emergency and/or other services to the user at the client device location.

Optionally, the verification system 104 may transmit information or route communications to one or more institutional systems $\mathbf{108}_1 \ldots \mathbf{108}_n$. The verification system 104 may also receive information or communications from one or more institutional systems $\mathbf{108}_1 \ldots \mathbf{108}_n$. For example, the institutional systems $\mathbf{108}_1 \ldots \mathbf{108}_n$ may optionally include educational institution servers, servers of police or other security institutions, and/or the like. Where the institutional systems $\mathbf{108}_1 \ldots \mathbf{108}_n$ are associated with an educational institution, the institutional systems $\mathbf{108}_1 \ldots \mathbf{108}_n$ may transmit student related information to the verification system 104 (e.g., student names, student ID number, student email address, and/or the like). The verification system 104 may transmit a notification of a student-related emergency event to a corresponding institutional system 108. For example, if during a consent process the verification system 104 determines that a user that is providing consent appears to lack the intellectual capacity to provide such consent (e.g., by performing a voice analysis on a voice input from the user and determining a threshold likelihood of an estimated state of intoxication to the extent that the user lacks the intellectual capacity to provide such consent), the verification system 104 may transmit a corresponding notification to an educational institution and/or to an electronic campus security address (e.g., phone number, email address, and/or the like) or system.

Thus, certain aspects of the present disclosure, including processes described herein, may be performed in varying degree, by the verification system 104, a given client device 106, and/or a given institutional system 108.

Figure 2A:
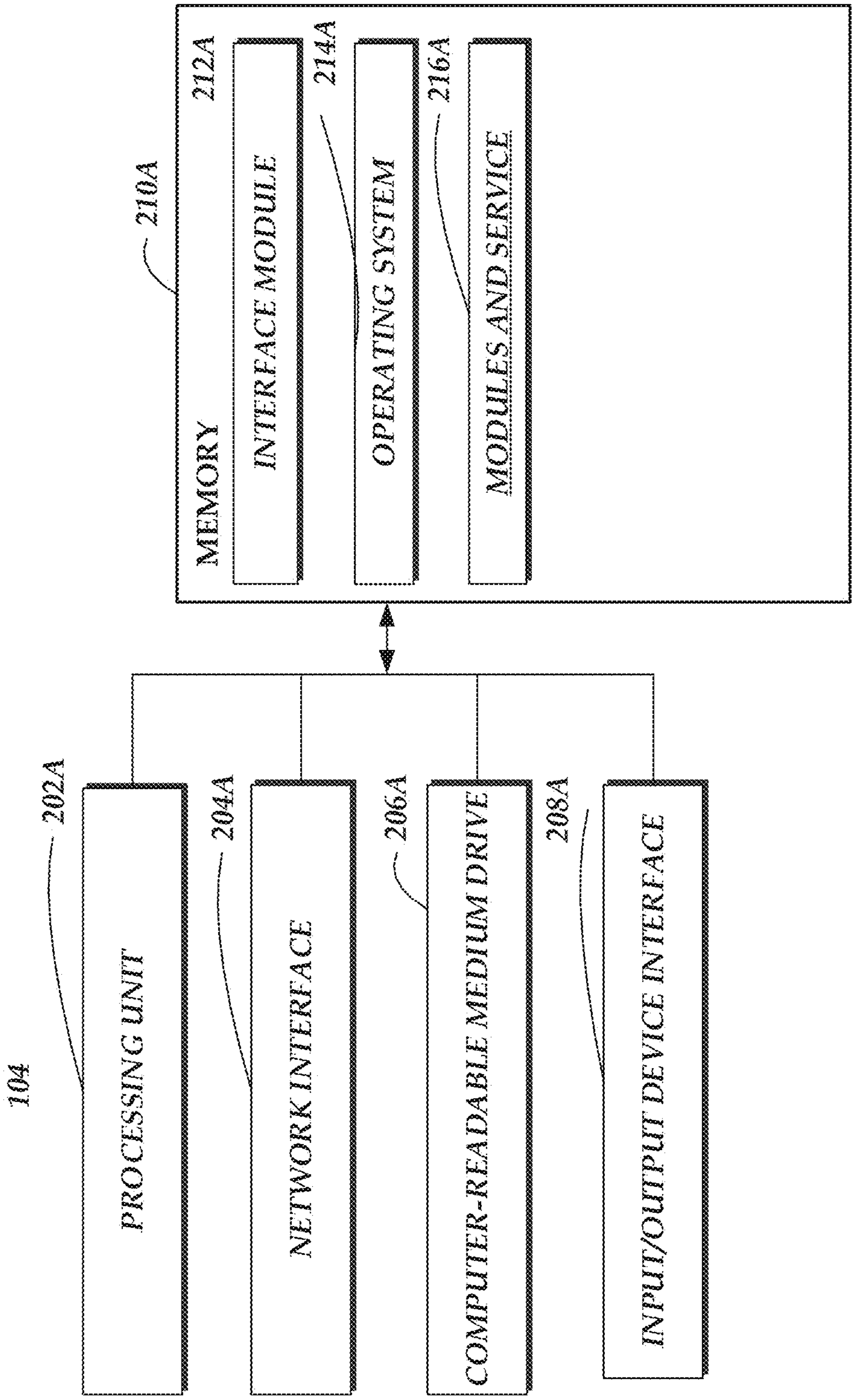
FIG. 2A is a block diagram illustrating example components of a verification system.

FIG. 2A is a block diagram illustrating example components of a verification system 104. The example verification system 104 includes an arrangement of computer hardware and software components that may be used to implement aspects of the present disclosure. Those skilled in the art will appreciate that the example components may include more (or fewer) components than those depicted in FIG. 2A. The verification system 104 may optionally be a cloud-based system including a hosted computing environment that includes a collection of physical computing resources that may be remotely accessible and may be rapidly provisioned as needed. Further, the verification system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and/or content described herein.

The verification system 104 may include one or more processing units 202A (e.g., a general-purpose processor, an encryption processor, a video transcoder, and/or a high-speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., institutional systems, client devices, etc.). The processing unit 202A may thus receive information, content, and/or instructions (such as described herein) from other computing devices, systems, or services via a network, and may provide information, content (e.g., streaming video content, content item previews, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute in order to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

Figure 2B:
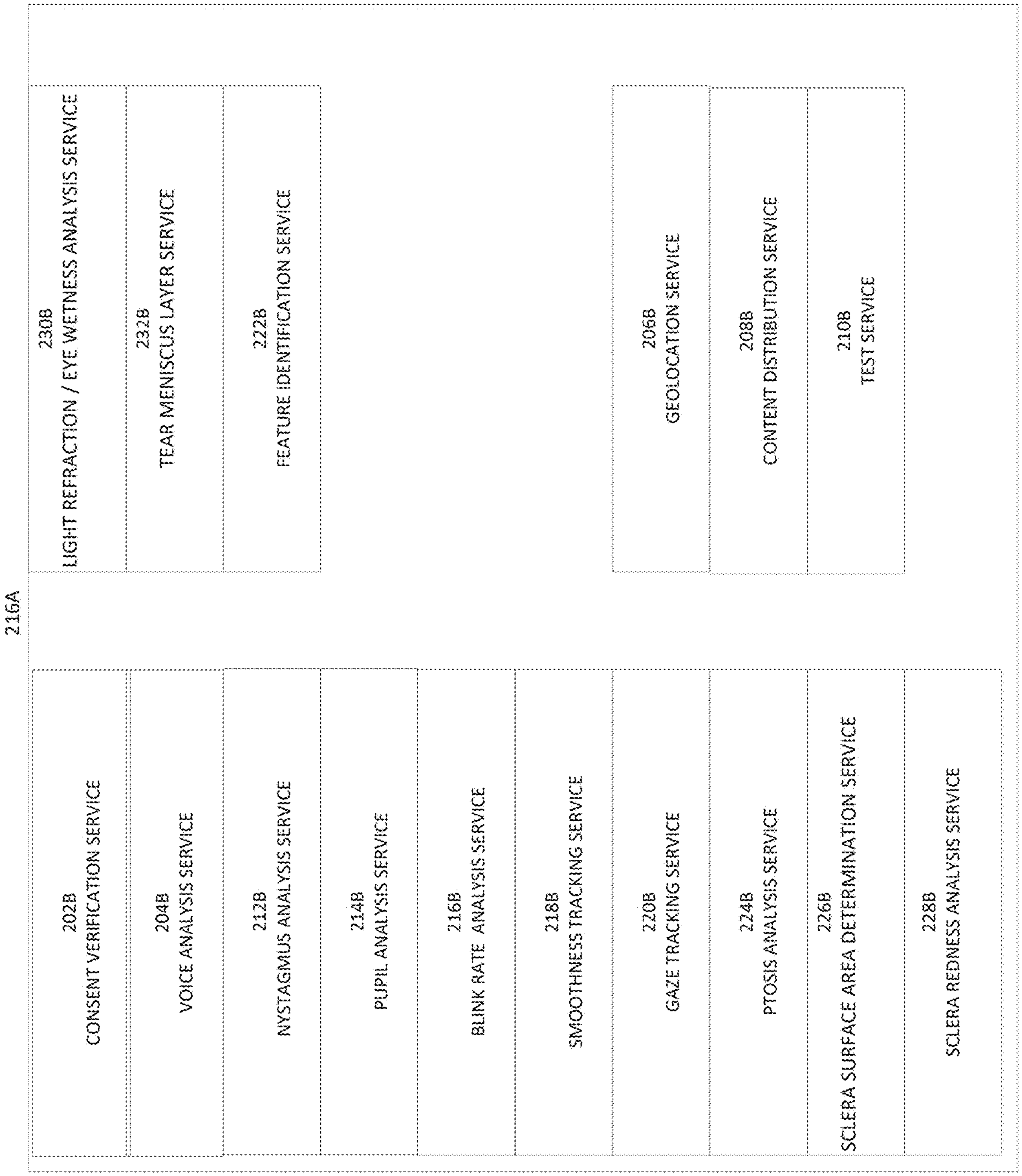
FIG. 2B illustrates example modules and services of the verification system.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general-purpose processor and may optionally include a video codec.

The system 104 may offload certain compute-intensive portions of the modules and services 216A (e.g., Fast Fourier Transforms (FFTS) as may be used to generate power spectrums for the voice analysis processes described herein, encryption, decryption, and/or the like) to one or more dedicated devices, such as a signal processing device, while other code may run on a general-purpose processor. The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals, and third-party systems via one or more networks. Accordingly, the depictions of the modules are illustrative in nature.

The modules and services 216A may include modules and components that provide a consent verification service 202B, a voice analysis service 204B, a nystagmus analysis service 212B, a pupil analysis service 214B, a blink rate analysis service 216B, a smoothness tracking service 218B, a gaze tracking service 220B, a feature identification service 222B, a ptosis (lid lag/drop) analysis service 224B, a sclera surface area determination service 226B, a sclera redness analysis service 228B, a light refraction/eye wetness analysis service 230B, a tear meniscus layer service, 232B, a geolocation service 206B, a content distribution service 208B, a test service 210B, and/or a communication service 212B.

The consent verification service 202B may receive and process requests for consent verification, as described herein. The voice analysis service 204B may be utilized by the consent verification service 202B to verify, via voice analysis, that a user is who the user claims to be. For example, in response to a consent verification voice recording from a user that purports to be a certain specific user, the consent verification service 202B may utilize the voice analysis service 204B to compare, using respective voice templates, a voice sample previously recorded by the certain specific user with a new voice sample from the user to determine if both voice samples are from the same person. If the voice samples are not from the same person, the consent verification service 202B may terminate the consent process. The consent verification service 202B may optionally utilize the voice analysis service 204B to determine if the user is intellectually capable of providing consent. For example, the voice analysis service 204B may analyze a voice recording of the user reading a consent script to determine if there is, and the degree of word slurring, mumbling and/or other characteristics of intoxication. The degree of word slurring, mumbling and/or other characteristics of intoxication may be scored, and if the score exceeds a specified threshold, a determination may be made that the user is not intellectually capable of providing consent.

The nystagmus analysis service 212B may optionally also be utilized by the consent verification service 202B to determine if the user is intellectually capable of providing consent. For example, as described elsewhere herein, nystagmus refers to an inability to adequately control eye movements, which may be evidence of intoxication. The nystagmus analysis service 212B may be utilized to determine if a person is suffering from nystagmus, and hence may be under the influence of an intoxicating substance and is intellectually incapable of providing consent.

The pupil analysis service 214B may optionally also be utilized by the consent verification service 202B to determine if the user is intellectually capable of providing consent. For example, alcohol can influence the size of a person's pupils due to its impact on the nervous system. As described elsewhere herein, the pupil size may be analyzed to determine if the user is under the influence of an intoxicating substance and is intellectually incapable of providing consent.

The blink rate analysis service 216B may optionally also be utilized by the consent verification service 202B to determine if the user is intellectually capable of providing consent. For example, alcohol can influence a person's blink rate as described elsewhere herein. As described elsewhere herein, the person's blink rate may be analyzed to determine if the user is under the influence of an intoxicating substance and is intellectually incapable of providing consent.

The smoothness tracking service 218B may be utilized to detect if the person is smoothly moving a camera equipped device while using the device to capture images of the person's face (and the eyes in particular) in order to perform certain analysis described herein. In response to detecting that the device is not being smoothly moved (which may result in a degraded and possibly erroneous analysis), a notification may be provided to the person to move the device more smoothly. In addition, optionally, the determined smoothness of the movement may be utilized to determine if the user is under the influence of an intoxicating substance and is intellectually incapable of providing consent.

The gaze tracking service 220B may be utilized to detect if the person's eyes (gaze) are tracking a camera equipped device while using the device to capture images of the person's face (and the eyes in particular) in order to perform certain analysis described herein. In response to detecting that the person is not tracking the device with their gaze, a notification may be provided to the person to track the device with their gaze. In addition, optionally, the determined gaze tracking may be utilized to determine if the user is under the influence of an intoxicating substance and is intellectually incapable of providing consent.

The ptosis (lid lag/drop) analysis service 224B may be configured to evaluate whether a subject exhibits eyelid drooping indicative of intoxication or diminished cognitive capacity. During image capture (e.g., performed while the subject follows device-guided head positioning and gaze-tracking instructions) the service 224B isolates the peri-ocular region using previously detected facial landmarks and eye-region localization modules as described elsewhere herein. Once the upper and lower eyelid boundaries are identified, the ptosis analysis service 224B computes geometric measurements such as eyelid aperture height, relative eyelid position, and/or temporal variations in eyelid opening across sequential frames. These measurements may optionally be normalized using demographic or user-specific baseline values stored in the subject's enrollment record. The service 224B may also employ machine-learning models trained to detect characteristic patterns of eyelid drooping associated with alcohol intoxication, drug impairment, neurological slowdown, or fatigue. By comparing frame-to-frame eyelid mobility and sustained reductions in aperture size against predetermined threshold criteria, the service 224B determines whether the subject exhibits ptosis of sufficient magnitude or duration to indicate impaired intellectual capacity. The ptosis (lid-lag/drop) analysis service 224B may generate a corresponding intoxication indicator that can be weighted in combination with other indicators (e.g., voice analysis, nystagmus detection, pupil dilation analysis, sclera surface area determination, sclera redness analysis, light refraction/eye wetness analysis, blink-rate evaluation, and/or other analysis described herein) to determine whether the subject is competent to provide valid consent.

The sclera surface area determination service 226B may be configured to analyze images of a subject's eyes to quantify the visible scleral region and detect deviations indicative of intoxication, impairment, or diminished cognitive capacity. Using facial detection and eye-region localization modules, the service 226B isolates the peri-ocular region and identifies anatomical boundaries of the sclera by segmenting the eye into pupil, iris, and surrounding white scleral zones. The service 226B applies computer-vision techniques (e.g., edge detection, contour analysis, thresholding, and/or deep-learning-based semantic segmentation) to determine the pixel area of the exposed sclera in one or both eyes across sequential frames. The measured sclera surface area may optionally be normalized using user-specific baseline data obtained during enrollment or demographic models stored in the system. Excessive scleral exposure, asymmetric scleral visibility between eyes, or abrupt fluctuations in sclera area during gaze-tracking tasks may indicate impaired ocular control associated with alcohol intoxication, drug influence, neurological slowdown, or stress responses. The sclera surface area determination service 226B may output an intoxication indicator based on these measurements, which may be weighted in combination with other biometric indicators (e.g., voice analysis, nystagmus detection, pupil dilation analysis, sclera surface area determination, sclera redness analysis, light refraction/eye wetness analysis, blink-rate evaluation, ptosis detection, and/or other analysis described herein) to assess whether the subject possesses the intellectual capacity to provide valid consent.

The analysis performed by sclera redness analysis service 228B may be based on the fact that scleral redness (hyperemia) is characterized by increased visible blood vessels in the conjunctiva and sclera. The sclera redness analysis service 228B may perform a workflow comprising performing segmentation to locate the sclera using a segmentation model (e.g., U-Net) to isolate scleral pixels from the iris, eyelids and reflections. The workflow may optionally further comprise performing color normalization to correct for lighting and device variation by referencing white regions of the sclera, adjacent skin patches and/or device metadata. Various redness metrics may be computed. For example, indices such as normalized red dominance, hue/saturation values, vesselness or vascular density, and/or spatial distribution of redness may be calculated. Mitigation of confounders may be performed to compensate for non-specific redness due to allergies, dry eye, fatigue or smoke exposure, effects of makeup, colored contact lenses and lighting color casts, and/or camera glare and specular highlights. Mitigation may comprise quality gating, glare suppression and subject instructions on illumination.

For example, a quality-gating module may be configured to evaluate whether captured images satisfy minimum criteria for performing reliable sclera-redness analysis. The sclera redness analysis service 228B may assess overall image luminance by analyzing the distribution of pixel intensity values to determine whether the frame is underexposed or overexposed, and may adjust brightness or discard the frame when the intensity distribution indicates inadequate illumination. The sclera redness analysis service 228B may further apply contrast-enhancement techniques, such as histogram equalization, to ensure that vascular structures and scleral boundaries are sufficiently distinguishable and frames exhibiting contrast outside acceptable thresholds may be rejected. Additionally, sharpness may optionally be evaluated by measuring edge strength or applying high-pass filters, and images exhibiting excessive blur may be gated out to prevent erroneous redness determinations. Noise-reduction operations (e.g., Gaussian blurring, temporal smoothing, Non-Local Means filtering, and/or other such techniques), may be applied to suppress sensor noise or compression artifacts, and frames demonstrating noise above a defined threshold may be excluded from subsequent analysis.

To further enhance accuracy, the sclera redness analysis service 228B may perform glare suppression to mitigate the effects of specular highlights reflecting from the corneal or scleral surfaces, which can artificially inflate redness metrics. Optionally, the sclera redness analysis service 228B detects glare regions by identifying corneal highlight areas using eye-landmark localization and determining highlight intensity, sharpness, and geometric characteristics that distinguish specular reflections from physiological scleral redness patterns. The sclera redness analysis service 228B may compensate for illumination variability by normalizing brightness and color values across the scleral region, and by applying glare-mitigation strategies such as exposure locking, standardized gaze orientation, and/or detection of eyewear-related reflections that may distort vascular-density measurements. During segmentation, deep-learning-based sclera-identification models may exclude pixel regions corresponding to intense highlight zones, allowing redness indices such as red-channel dominance, vascular density, and/or hue/saturation metrics to be computed only from physiologically meaningful scleral areas.

The light refraction/eye wetness analysis service 230B may detect and analyze wetness or the "glassy-eye" appearance that results from a smooth tear film producing strong specular reflections. The light refraction/eye wetness analysis service 230B may utilize controlled illumination and analysis of corneal highlights. Controlled illumination may be accomplished via the use of a computer (e.g., smartphone) screen or monitor flash, LED flash or ring light to create a consistent reflection on the cornea. Highlight detection may be performed by identifying specular highlights on the cornea using eye landmarks, measuring highlight area, intensity, and/or sharpness. Wetness metrics may be determined. For example, ratios such as highlight area over corneal area, a specular sharpness index and coherence may be calculated. Optionally, blinks may be detected, and post-blink changes may be analyzed to assess tear film stability.

The light-refraction and eye-wetness analysis service 230B is configured to detect and quantify the "glassy-eye" appearance that results from an abnormally smooth or thickened tear film, which produces strong specular reflections across the corneal surface. To accomplish this, the system may optionally employ controlled illumination to generate consistent and repeatable highlight patterns on the cornea. Such controlled illumination may be provided by a device display (e.g., a smartphone or tablet screen emitting a known white or colored intensity pattern), a monitor flash, a built-in LED flash, or a ring-light emitter, thereby standardizing the geometry and brightness of corneal reflections independent of ambient lighting conditions.

Using eye-landmark detection, the eye-wetness analysis service 230B may localize the corneal region with sub-pixel accuracy and then segment specular highlights by identifying pixels or pixel clusters whose intensities exceed a defined threshold relative to adjacent corneal tissue. Once segmented, the service may compute wetness-related metrics by analyzing the spatial and temporal characteristics of these reflections. For example, the eye-wetness analysis service 230B may calculate a highlight-area-over-corneal-area ratio, which normalizes the size of the detected highlight to the segmented corneal region to quantify the extent of tear-film reflectivity. Optionally, the system may compute a specular sharpness index by measuring gradient magnitudes and/or high-frequency edge energy within the highlight boundary, where sharper, more coherent reflections indicate a smoother and more reflective tear film. A highlight-coherence metric may optionally be computed by evaluating the uniformity or spatial alignment of highlight contours across successive frames, enabling the system to differentiate physiologic tear-film reflectivity from spurious reflections caused by device motion or environmental lighting.

Optionally, the eye-wetness analysis service 230B may incorporate blink detection to enhance wetness-related determinations. As similarly discussed elsewhere herein, blinks may be detected using changes in eyelid landmark positions or characteristic reductions in visible ocular area. After detecting a blink event, the system may analyze post-blink highlight evolution by measuring how highlight area, intensity, sharpness, and/or coherence change overtime. Because a freshly redistributed tear film tends to produce larger and more uniform specular reflections that gradually diminish as the tear layer thins and stabilizes, these temporal patterns provide insight into tear-film stability and overall ocular wetness. Accordingly, by integrating controlled illumination, precise highlight detection, multimetric reflectivity analysis, and/or post-blink tear-film dynamics, the eye-wetness analysis service 230B may generate a wetness-based intoxication indicator that distinguishes physiologically expected tear-film behavior from impairment-related abnormalities.

Mitigation of confounders may be performed for auto-exposure and lighting variations affecting highlight intensity, variations in eye orientation and gaze affecting highlight geometry, and/or occlusions or reflections from eyeglasses and contact lenses. Mitigation may comprise locking exposure during capture, standardizing gaze direction and/or detecting eyewear.

The tear meniscus is the thin crescent of tear fluid along the lower eyelid margin. The tear meniscus layer analysis service, 232B may infer the tear meniscus height (TMH) from images. A detection workflow may comprise a capture protocol, wherein the subject is instructed to look slightly upward, while high-resolution images or short videos of the subject are captured with satisfactory lighting and stable focus. Segmentation may be performed using a segmentation model to identify the lower eyelid margin and the meniscus boundaries (tear-air and tear-lid interfaces). TMH may be measured in pixels and converted to millimeters using device-specific scaling methods such as iris diameter or radius, camera intrinsics and/or fixed accessory distance.

Mitigation of confounders may be performed for makeup, lid inflammation, and/or eyelashes obstructing the meniscus. Mitigation may be performed for dry eye variability over time. In addition, mitigation may be to address insufficient resolution or focus leading to unreliable measurements.

Mitigation may comprise, respectively, occlusion detection, averaging across frames, and/or enforcing minimum resolution thresholds.

Individually, redness, wetness and tear meniscus metrics are not specific to intoxication, however, they can serve as indicators when combined with other ocular and behavioral signals. Optionally, a model may be configured to incorporate these metrics along with eye movement control, blink rate, eyelid droop, pupillary response and contextual data to estimate likelihood of impairment. Model calibration may be performed wherein data collection is performed across devices, lighting conditions, eye colors and confounders, with ground-truth intoxication labels for training.

The feature identification service 222B may be utilized to detect facial features (e.g., facial landmarks, such as eyes) that may be utilized to perform certain analysis and make certain determinations described herein.

If a determination is made that that the user is not intellectually capable of providing consent, a consent failure process may be performed, and optionally a corresponding notification may be provided to the user and/or to the prospective partner, and/or to one or more other destinations (e.g., a security entity, a counseling center, an education institution, etc.). Optionally, a user may need to opt-in (e.g., during an account creation process or thereafter) to have such notifications provided to prospective partners and/or other destinations.

The geolocation service 206B may be utilized to route security and/or other services to a user's geolocation (as reported by a user device or otherwise) and described herein.

Optionally, the content distribution service 208B may select items of content, such as educational content (e.g., video, audio, text content) related to providing and receiving consent for sexual activities from a library of such content to be presented via a user interface on a user device 106. As similarly discussed elsewhere herein, such content may be selected based on what educational content the user has already viewed, what scores a user received on corresponding tests, and/or the like. Optionally, a user interface may be populated with representations of educational content from which a user may select, and the educational content may be streamed, downloaded, or otherwise transmitted to the user device.

The content library navigation service 206B may receive and process user content library navigation commands, such as drill-up, drill-down, scroll left, scroll right, go back to a preview user interface, go to home screen, play, add to watchlist, and/or other navigation commands provided via corresponding user interface controls. The content library navigation service 206B may communicate with the content library selection service 204B (e.g., communicate user navigation commands), enabling the content library selection service 204B to accordingly populate a library navigation user interface (e.g., such as that illustrated in FIGS. 3A and 3B) with corresponding representations of content items.

The test service 210B may be utilized to select, provide, and score the tests described herein (e.g., providing a measure as to how successfully the user consumed/comprehended certain educational material). The communication service 212B may be utilized to route communications to or from a user (e.g., to another user, to a security service, to a counseling service, to an educational institution, and/or other destination), such as described herein.

Figure 2C:
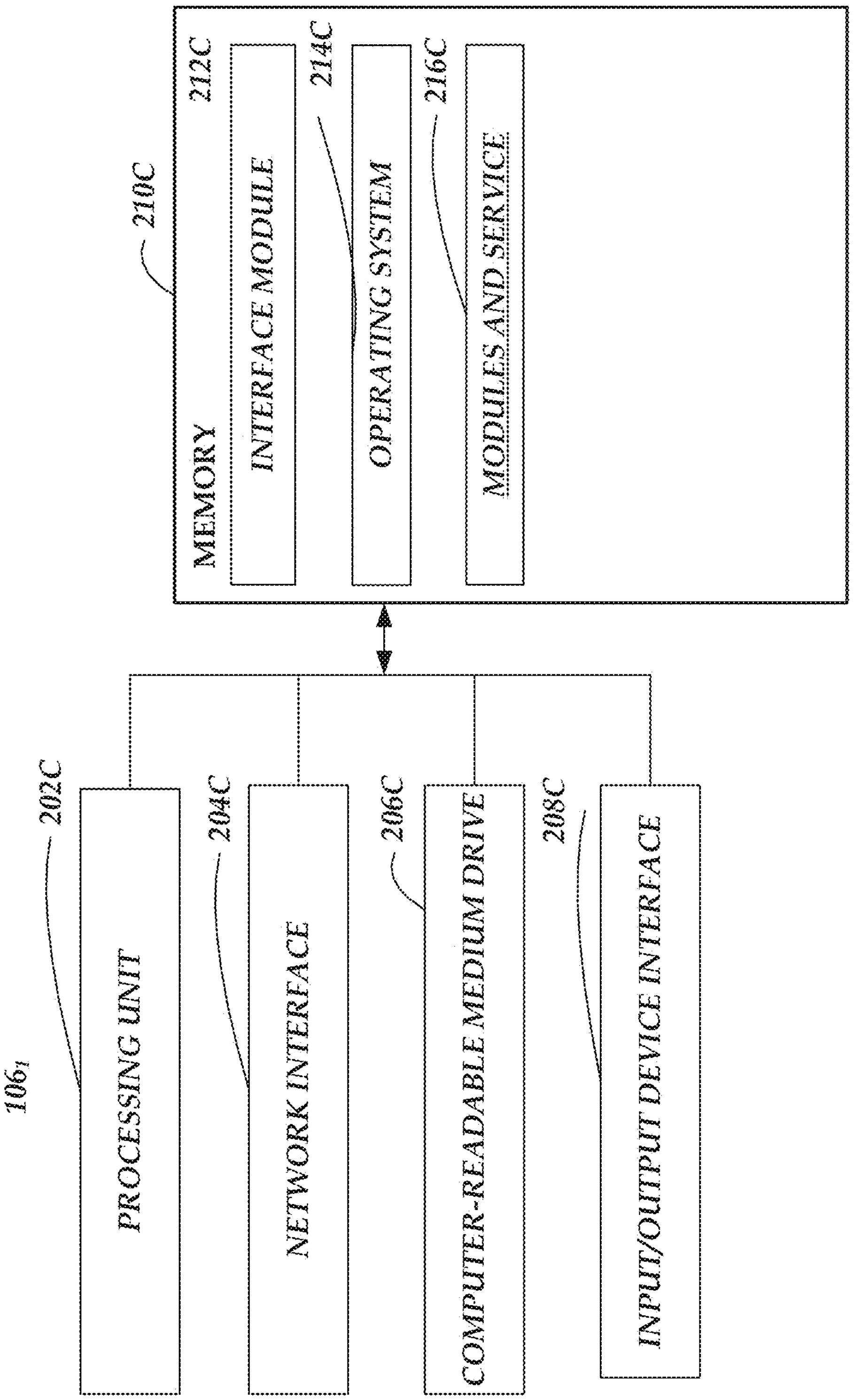
FIG. 2C is a block diagram illustrating example components of a user device.

FIG. 2C is a block diagram illustrating example components of a user device 106 e.g., smartphone, laptop computer, desktop computer, game console, connected television, networked wearable, or other networkable computing device). The example user device 106 includes an arrangement of computer hardware and software components that may be used to implement aspects of the present disclosure. Those skilled in the art will appreciate that the example components may include more (or fewer) components than those depicted in FIG. 2C.

The user device 106 may include one or more processing units 202C (e.g., a general-purpose processor, an encryption processor, a video transcoder, and/or a high-speed graphics processor), one or more network interfaces 204C, a non-transitory computer-readable medium drive 206C, and an input/output device interface 208C, all of which may communicate with one another by way of one or more communication buses. The network interface 204C may provide the various services described herein with connectivity to one or more networks or computing systems, such as the verification system 104, the institutional systems $\mathbf{108}_1 \ldots \mathbf{108}_n$, and/or other systems. The processing unit 202C may thus receive information, content, and instructions from other computing devices, systems, or services via a network and may transmit information, content, and instructions to other computing devices, systems, or services via a network. The processing unit 202C may also communicate to and from non-transitory computer-readable medium drive 206C and memory 210C and further provide output information via the input/output device interface 208C. The input/output device interface 208C may also accept input from various input devices (which may be integral to the user device 106 or remote from the user device 106), such as a keyboard, buttons, knobs, sliders, remote control, mouse, digital pen, touch screen, microphone (e.g., to receive voice commands, a reading of a script, etc.), cameras, light intensity sensors, etc.

The memory 210C may contain computer program instructions that the processing unit 202C may execute in order to implement one or more aspects of the present disclosure. The memory 210C generally includes RAM, ROM and/or other persistent or non-transitory computer-readable storage media. The memory 210C may store an operating system 214C that provides computer program instructions for use by the processing unit 202C in the general administration and operation of the modules and services 216C, including its components. The memory 210C may comprise local memory and cloud storage. The memory 210C may further include other information for implementing aspects of the present disclosure.

The memory 210C may include an interface module 212C. The interface module 212C can be configured to facilitate generating and/or populating one or more interfaces through which a compatible computing device may send to, or receive from, the modules and services 216C. The user device 106 may optionally host a browser and/or a consent application downloaded from an app store or otherwise loaded, which may be used to render user interfaces described herein, receive user inputs (e.g., instructions, text, menu selections, video/audio recordings, such as voice samples for identity verification and/or for a consent process), and provide other services and functionality described herein.

Certain aspects will now be further discussed.

As previously discussed, an aspect of the present disclosure relates to receiving consent from two (or more) users from respective user devices with respect to a future action (e.g., a sexual interaction) between the two users, verifying that the consent actually came from each of the two (or more) users, and determining a likelihood that the consent was voluntarily given and/or competently given (e.g., given by someone with the intellectual capacity to provide consent). Such consent may be recorded (e.g., where the consent may comprise activation of a consent control, providing textual consent, and/or a video/audio or audio-only recording of a user reading a consent script as described herein), and such recordation may be encrypted to enhance security.

Optionally, in order for a user to access and utilize the disclosed verification system, a user may need to be associated with an entity, such as an educational institution (e.g., a college or university). For example, optionally a key (e.g., a unique alphanumeric code or other token) may be provided to the entity which may in turn provide the key to a given user (e.g., a student). The key may be a time limited key, where the key is valid for a specified amount of time (e.g., 20 minutes, 60 minutes, 1 day, 2 days, or other time frame). Optionally, in addition or instead, the time limited key may be transmitted directly by the verification system to a user address (e.g., an email address, a telephone/SMS address) provided to the verification system by the institution (e.g., via an institution system), or provided by the user via a user interface presented via a browser or a dedicated application (e.g., a consent application providing some or all of the functionality described herein) hosted on a user device (e.g., a smartphone, tablet computer, a laptop computer, a desktop computer, a connected television, a wearable, or other networked electronic device, where a user device may include a display, touch screen, microphone, speaker, keyboard, other user input devices, other output devices, and/or the like).

The user may then submit the key to the verification system via a user interface presented via a web browser or a dedicated application (e.g., a consent application) hosted on the user device. Upon receipt of the key, the verification system may determine whether or not the key is a valid key, and if so, whether or not the key has expired. Optionally, if it is determined that the key has expired, the user may be prompted to request a new key by activating a link or other control. A control may optionally be provided via which the user can edit or provide a new address to which a new key is to be sent.

If the verification system determines that the key is valid and has not expired, the verification system may cause a user interface to be presented via which the user can establish a user account. For example, the user interface may enable the user to specify a password for the account, where the user may be requested to enter the password twice to verify that the user has entered the intended password. Optionally, the password may need to meet certain criteria (e.g., may need to be a minimum length, may need to have both lowercase and uppercase letters, may need to include special characters (e.g., punctuation marks), may need to have one or more numbers, and/or the like). If the user has correctly entered the password and the password has been determined to satisfy the password criteria, the password may be associated with the user account. The user may then use the password (optionally in combination with other authentication data, such as an email, phone number, fingerprint authentication data, faceprint authentication data, voiceprint authentication data, and/or the like) to access the user account (e.g., via a sign-in user interface). Optionally, in addition to or instead of a password, a passkey, made up of a cryptographic key pair, may be used to gain access to a user account and/or to utilize services described herein.

Optionally, in order to set up a user account, a user interface may be provided via the user device, prompting the user to enter and/or confirm certain user data. Such user data may include an email address, a phone number (e.g., a cellular phone number associated with a messaging application, such as an SMS or other chat application), a new password, an institutional (e.g., college) name, and/or one or more physical addresses (e.g., the user's residential address while at college, the user's home address when not at college, and/or the like).

The user may also be prompted to view and/or agree to certain terms of use and privacy policies. By way of further example, the user may be prompted to provide the user's first and last names, date of birth, gender (e.g., male, female, non-binary), and/or sexuality (e.g., gay, lesbian, heterosexual, bisexual, pansexual, asexual, etc.). Optionally, the user may indicate, via the user interface, what user information (e.g., gender, sexuality, etc.) is to be posted on a user profile viewable by other users. The user interface may also enable the user to enter freeform profile data, such as a description of the user that may be shown to another user engaging in a consent process with the user.

Once the user's account is established, the user may be prompted to consume certain course material (e.g., relating to the importance of obtaining express consent from a person prior to engaging in sexual relations with that person, and/or other related matters). Optionally, the user needs to complete the course material (e.g., presented by the verification system via a user device browser and/or presented by consent application user interface), as determined by the system, in order to access and utilize certain verification services, such as the consent verification services described herein. Optionally, a user may be required to take a test on such course material and achieve a minimum score (e.g., answer a certain number or percentages of questions correctly) as determined by the verification system before the verification system grants the user access to certain verification services. If the user score failed to satisfy the minimum score, the user may be prompted to review the course and/or take the test again. Optionally, the process may be repeated until and unless the user passes the course test.

In addition, optionally in order for the user to gain access to and/or utilize the verification system consent functionality, the user may be prompted, via a corresponding user interface, to provide reference physical characteristic data (e.g., voice data) to be used in biometric verification. As will be described, the use of voice biometric data may advantageously consume less network bandwidth, less processing resources, and provide enhanced insight to the user willingness or capability of providing consent to certain actions as compared to other forms of biometric verification, such as facial recognition and image processing of images of the user.

Figure 3A:
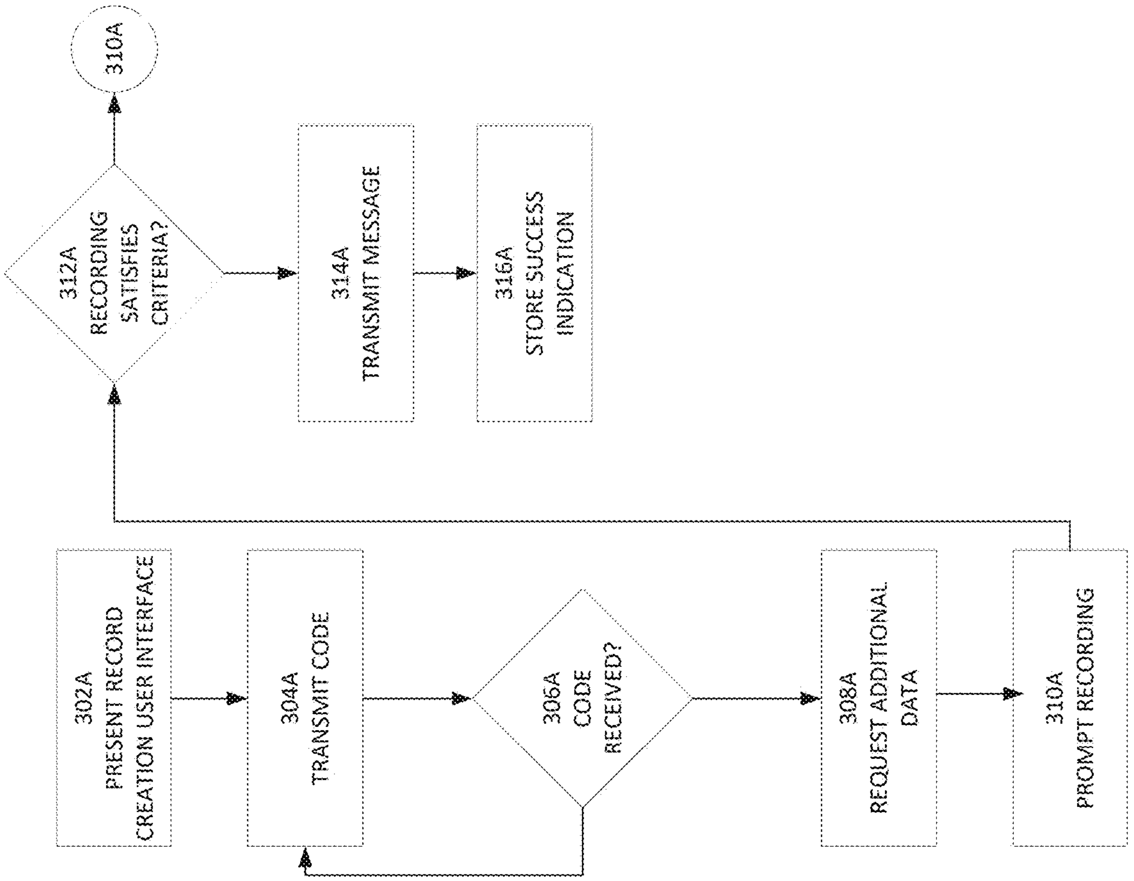
FIGS. 3A-3B illustrate processes.

FIG. 3A illustrates an example user account record generation process configured to generate an account record for use in conjunction with the consent process and other functions described herein.

At block 302A, an account record creation user interface may be provided via a user device (e.g., via a consent application hosted on the user device or via a browser accessing the user interface from a remote server, such as a server associated with the verification system described herein). The user interface (which may comprise one or more screens) may prompt the user to provide certain user related information, such as name, email address, mobile phone/messaging number/address, and/or an identification of an institution (e.g., an education institution). The user information may be received by the verification system from the user device.

At block 304A, a verification code may then be transmitted to the user (e.g., to the phone number/messaging address or email provided by the user). The verification code may be utilized to verify that the user owns/has control over the phone number/messaging address or email provided by the user. The code may optionally be time limited to a certain time period and optionally, a countdown timer may be displayed via the user interface to the user, where the user is instructed to enter the verification code into a verification code field once the user receives the verification code.

At block 306A, a determination is made as to whether the verification code was received by the user within the permitted time period. If not, the user may be inhibited from continuing in the account creation process and the user may be prompted to request a new verification code. If the user requests a new verification code, the process may repeat block 304A. Optionally, to avoid hacking or other improper action, the user may only be permitted to request a verification code a specified number of times. If a verification code is not successfully received from the user within a threshold time period, the process may terminate.

If a determination is made, at block 306A, that the verification code was received within the permitted term period, additional user information or other data may be requested via a corresponding user interface. For example, if not already provided at block 302A, some or all of the following information may be requested: a username, age, email address, physical address, phone number, texting address, educational institution the user is currently attending, and/or other profile data (e.g., gender, sexuality, sexual partner preferences, age, educational institution the user is currently attending, and/or other user information).

At block 308A, a user interface may be provided via the user device prompting the user to record (e.g., a video recording with an audio track or an audio only recording) the user to read a script (e.g., a script providing consent to a sexual engagement with potential partner) that will be used as a baseline for modeling the user's voice and speech patterns. The recording of the user reading the script may be used in the future for authenticating the user and/or to determine whether the user is mentally/intellectually competent to provide consent to engage with certain acts (e.g., sexual acts) with another user. The recording may be performed, by way of example, by a front-facing camera and a microphone of the user device. At block 310A, the recording may be received (via an uploaded file or via streaming) from the user device. At block 312A, a determination may be made (e.g., by the verification system) as to whether the recording meets certain criteria. For example, the process may determine whether the loudness or power spectrum of the audio is above a certain threshold for a minimum threshold of time. By way of further example, the process may determine the length of the recording as a whole, without analyzing loudness or the audio power spectrum, to thereby reduce the amount of computer resources that would otherwise be needed to perform such analysis.

If a determination is made that the sound recording does not meet the specified criteria, at block 314A, the verification system may transmit a message to the user device prompting the user (e.g., via the consent application or webpage) to re-record the user reading the script, and the process may repeat. Optionally, a user may be given a limited number of attempts to provide the sound recording, and if the user's unsuccessful attempts reach the limited number, the user may be prevented from making further attempts without contacting support services (and may be prevented from utilizing the consent and/or other services described herein, and/or the user may be prevented from further attempts for a specified period of time.

If a determination is made that the sound recording does meet the specified criteria, at block 316A, a corresponding indication may be stored in the user's record, and the user may be enabled to access certain features described herein, such as the consent verification process.

Figure 3B:
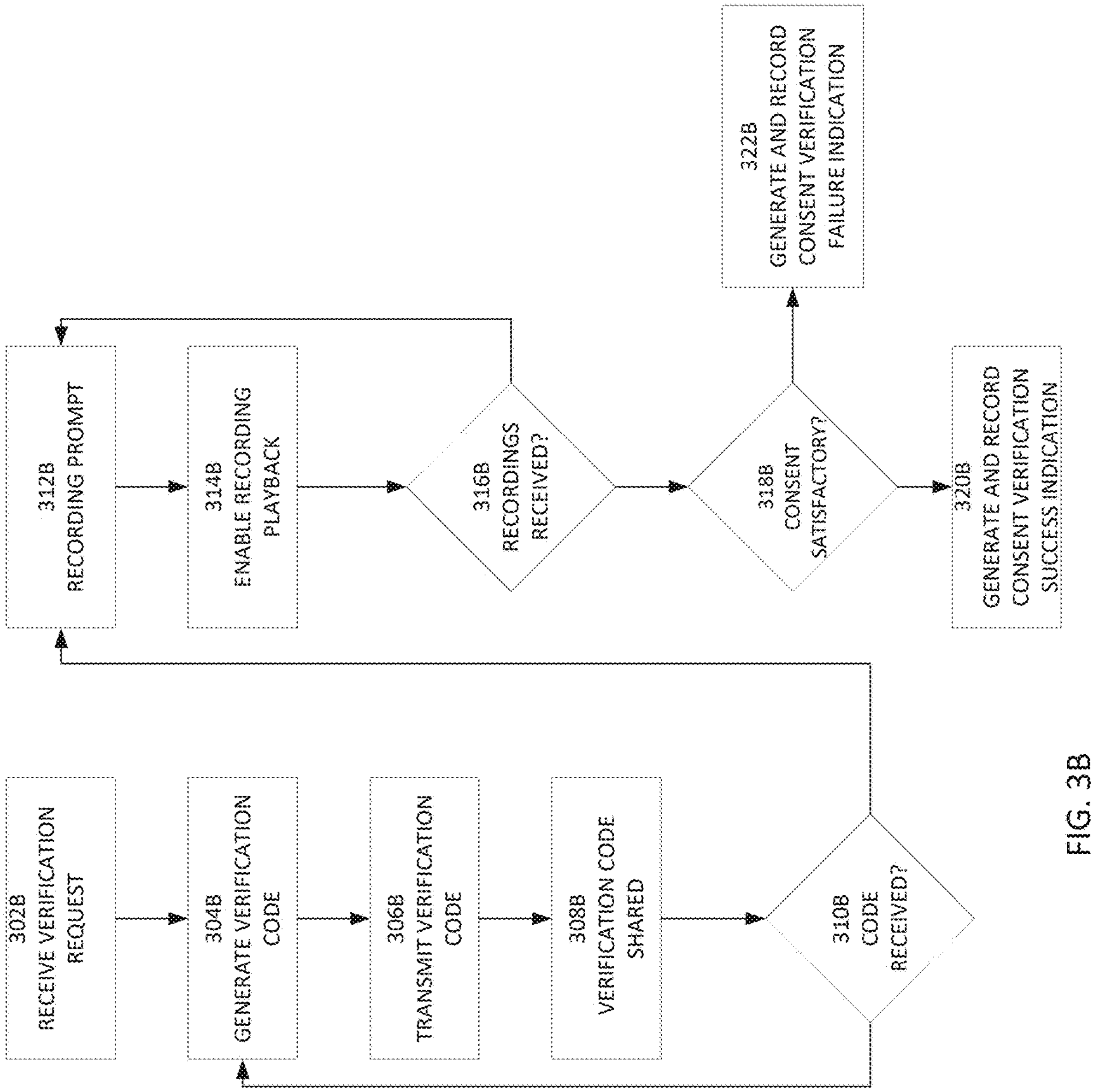

Referring to FIG. 3B, an example consent process is illustrated. At block 302B, a user consent verification request is received from a user device associated with a first user. At block 304B, a unique verification code is generated. At block 306B, the unique verification code is transmitted to the user device and presented to the user (e.g., via a consent verification consent application or a webpage). At block 308B, the first user may share the verification code with a second user, where the second user is a potential partner (e.g., sexual partner) for the first user. By way of example, the first user may share the verification code with the second user via email, a messaging service, the consent verification application, and/or otherwise.

At block 310B, a determination is made as to whether the consent verification code has been received from both the first user and the second user within a specified period of time. For example, the first user and the second user may submit the consent verification code via a verification code receiving field presented on the first user device or the second user device, where the verification code receiving field may be presented via a consent verification application hosted on the first user device and/or the second user device, or the verification code receiving field may be presented via a webpage rendered via a web browser hosted on the first user device and/or the second user device. If the consent verification code is not received from the first user and the second user within the specified time period, the process may prompt the first user to request and share a new consent verification code, and the sharing process may repeat.

If the consent verification code is received from the first user and the second user within the specified time period, at block 312B, the first user and the second user may be individually prompted to record themselves reading a script (e.g., a script providing consent to a sexual engagement with potential partner) while recording themselves (e.g., via a front-facing camera of a smartphone or via a webcam). Optionally, the script may be presented over the video image of a given user while the given user is recording themselves reading the script. Optionally, the same script may be provided to both the first user and the second user, where the first user may insert the first user's name at a specified point in the script, and the second user may insert the second user's name at a specified point in the script. Optionally, the script of the first user and the script of the second user may be materially different.

Optionally, in addition, the geolocations of the first user and the second user (e.g., as determined from geolocation information received from respective device of the first user and the second user) may be used to determine whether the distance between the first user and the second user is within a specified threshold distance, and if the distance is not within the specified threshold distance, a process exception notification may be generated (e.g., a consent verification failure notification), which may be transmitted to the first user and the second user, and a corresponding indication may be stored in memory. The foregoing use of geolocation data may be a further check on a user spoofing another user, where if the distance between two users is too great it is unlikely that there will be sexual activity between the two in the immediate future.

At block 314B, a given user may be enabled to review their recording (playback their recording) of reading the script, and the given user may be prompted to upload the video. If the given user is not satisfied with the recording, the given user may re-record the reading of the script by activating a record control.

At block 316B, a determination is made as to whether an upload of the script-reading video has been received from the first user device and from the second user device. Optionally, the uploads from both the first user and the second user need to be received within a corresponding threshold period of time. If the uploads from both the first user and the second user are not received within a corresponding threshold period of time, one or both of the users may be prompted to record the script-reading video, or some or all of the entire process may repeat.

If the uploads from both the first user and the second user are received within a corresponding threshold period of time, at block 318B the recordings may be analyzed to determine if they are from the purported users and a determination may be made as to whether each of the users is intellectually capable of providing consent. For example, as similarly discussed elsewhere herein, a given recording of a purported user (e.g., a template generated from the given recording) may be compared to an enrollment recording of the user (e.g., a template generated from the enrollment recording) to determine if they match. If they do not match, at block 322B, an exception action may be triggered. The exception action may include generating a notification to the first user, the second user, and/or an administrator, and generating a consent process failure indication that may be stored in memory.

By way of illustration, the voice sample may be digitized by the user device and transmitted over a network to the verification system. The verification system may convert the digitized voice sample (e.g., as a waveform) into a unique digital voiceprint or an enrollment template associated with the user.

This digital voiceprint may include relatively small units of each of the spoken words and the word segments of the voice sample. The digital voiceprint may also include tone variations, tenor, and other parameters, such as physiological components. The voiceprint may be utilized by a voice recognition process to authenticate the user (e.g., by comparing a template generated from the enrollment voice recording with a template generated from the voice recording of the purported user reading the consent script). Advantageously, the use of a voiceprint for verification and other purposes described herein, consumes relatively less computer and network resources while performing enhanced functionality as compared to conventional face recognition systems. The voice authentication process may be text independent or text dependent (where the user may be requested to use certain of the same phrases in both the enrollment process and the voice authentication process.

With respect to the physiological components, the voiceprint may be utilized by the verification system in recreating the shape of the user's vocal tract. As no two persons have the same vocal tract shape, a unique voice imprint for every individual can be created.

Optionally, in addition, the unique voice imprint includes the pace of the speech, mannerism, and pronunciation associated with the voice sample, and such data may optionally be utilized to identify the user's voice in the future and/or to detect whether the user is inebriated or otherwise incapable of providing informed consent.

In addition, if the identity of the first user has been verified, optionally a determination may be made as to whether each user is intellectually competent to provide consent to the proposed action. For example, a voice analysis service may analyze a voice recording of the user reading a consent script to determine if there is, and the degree of, word slurring, mumbling, certain guttural utterances, and/or other characteristics of intoxication.

Optionally, a waveform of glottal pulses estimated from speech may be generated by applying Iterative Adaptive Inverse Filtering (IAIF) to the voice recording. Using the waveform, certain glottal excitations may be detected that indicate evidence of alcohol intoxication over a certain threshold. By way of further example, the voice analysis service may extract low-level acoustic features (e.g. Mel-frequency cepstrum) from the voice recording, and n-way direct classification or regression using maximum margin classifiers may be applied to determine a state of intoxication. By way of further example, speed, pitch, tone and emphasis on certain syllables may be detected and may then be compared to known features that present emotions, depression or alcohol intoxication. Optionally, machine learning algorithms such as HMM (Hidden Markov Model), GMM (Gaussian Mixture Model), SVM (Support Vector Machines), or k-NN (k-nearest neighbors algorithm) and deep learning models such as CNN (Convolutional Neural Network) and RNN (Recurrent Neural Network) may be utilized in performing voice analysis. If a determination is made that the user is not competent to provide consent (e.g., the user is too intoxicated to give consent or is too depressed), or a determination is made that the consent was provided under coercion, at block 322B, an exception action may be triggered. The exception action may include generating a notification to the first user, the second user, a security person, and/or an administrator (e.g., indicating that the user is attempting to consent to a sexual act, but appears to be coerced, intoxicated, and/or depressed), and generating a consent process failure indication that may be stored in memory.

At block 320B, if the identities of the first and second users were successfully verified, and if a determination was made that the user had the intellectual capacity to provide consent and/or that consent was not involuntarily provided, the consent may be verified, and such verification may be stored in a record of the first user and a record of the second user. Optionally, a notification of the successful consent verification may be transmitted to and presented by the first user device and the second user device. Optionally, the first user may be enabled to view the script-reading recording of the second user, and the second user may be enabled to view the script-reading recording of the first user.

Figure 4A:
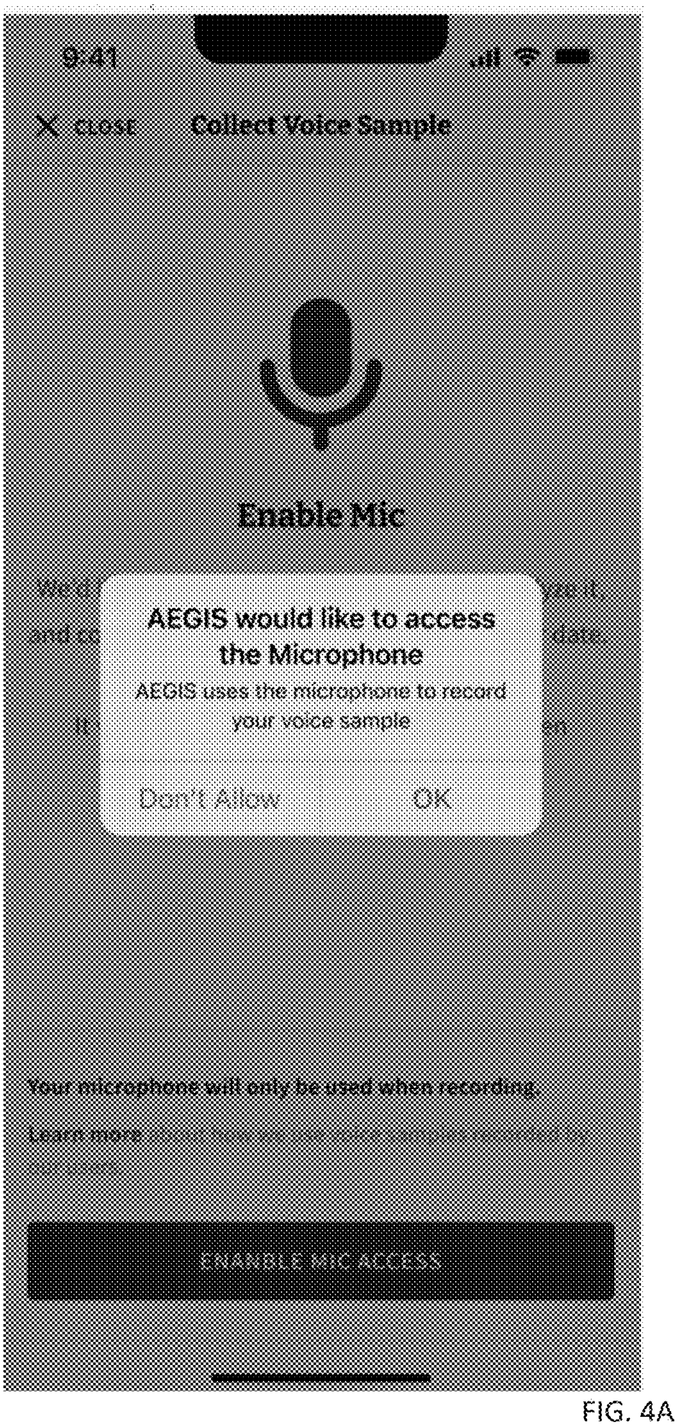
FIGS. 4A-5L illustrate example user interfaces.
Figure 4B:
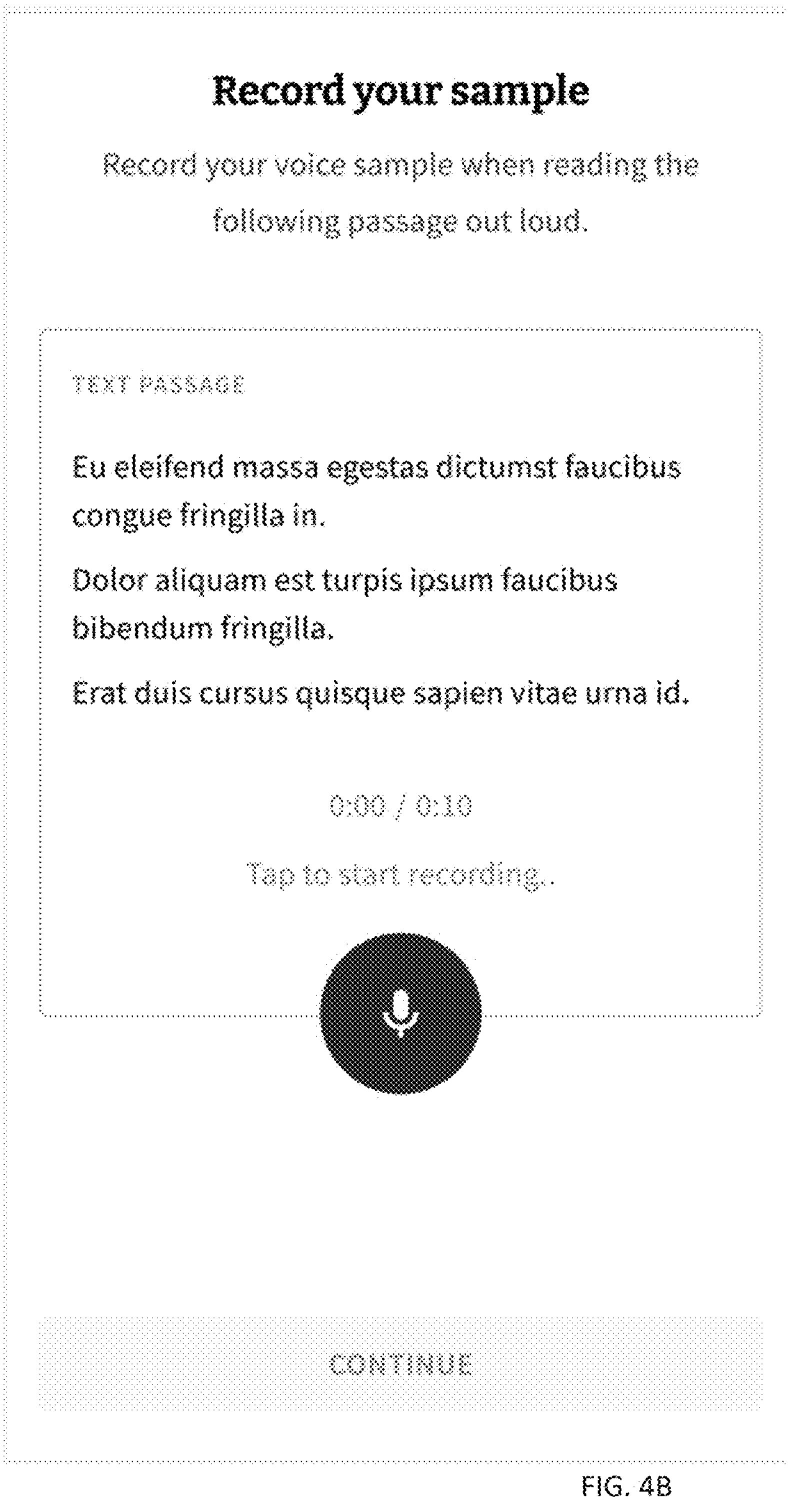

Certain example user interfaces will now be described. With reference to FIG. 4A, an example user interface may prompt the user to provide a voice sample of the user's voice as part of the enrollment process for voice authentication. By way of further example, the consent application may request the user device's operating system to request permission from the user to access input from the user device's microphone and optionally camera so that a voice sample (and optionally a video face sample) may be obtained from the user. Referring to FIG. 4B, a user interface may prompt the user to activate a record control and to read a script as part of the enrollment process. The enrollment script may be the same as the script later used during a voice authentication process (e.g., to enhance accuracy and reduce computer resource utilization), may include certain of the same phrases (e.g., one or more voice passphrases of 2-5 words in length), or may be completely different than the script later used during a voice authentication process (e.g., a text independent authentication process). The script may include example consent language. A countdown timer may be provided to help guide the user's pace in reading the script.

Figure 4C:

As illustrated in FIG. 4C, the record control may alter appearance during the actual recording process (e.g., a microphone symbol may be provided which when selected begins the reading process, at which point the microphone system may be changed to another symbol, such as a square or other symbol that denotes recording) so that the user is aware that the recording is in process. Optionally, a textual and/or graphical notification may be displayed and/or an alert lighting element illuminated indicating that the recording is underway. A progress bar may be displayed and constantly updated during the recording, depicting how much of the recording time has been utilized (where a maximum recording time may be specified to reduce network utilization and video/audio processing resource utilization). The recording may be paused or completed in response to one or more events, such as the user selecting the recording indicator, in response to the countdown timer reaching a threshold (e.g., zero), detecting more than a threshold period of silence, and/or otherwise. A preview control may be provided, which, when activated, causes the consent application to playback the recording. A control may be provided that enables the user to re-record the same. Once the user is satisfied, the user may activate a submit voice recording control.

The verification system may analyze the voice sample to make sure it is long enough (e.g., meets a threshold length, such as 15 seconds, 20 seconds, 30 seconds, or other amount of time) and/or clear enough (e.g., has at least a specified threshold loudness level and/or power spectrum, was capable of being converted to text, etc.). If the voice sample is not long enough or clear enough, the verification system may cause a user interface to be presented to the user that prompts the user to re-record the voice sample.

The verification may perform liveness detection to ensure that the voice is not simply a playback of a recorded voice. For example, a liveness detection may detect a spectral power of the voice that is indicative of a voice replayed through a speaker (comprising a transducer).

The user may also be requested via a user interface for permission to track the user's geolocation (e.g., track the user's device's geolocation via GPS or other location provided by the user's device to the verification system) and/or to share such geolocation data with one or more specified entities (e.g., security services, counseling services, education institution of the user, and/or other entity). If the user grants permission to track (and optionally share) the user's geo-location, the verification system may use the geolocation as part of the verification process. For example, if the user indicates that the user would like to submit a request for recording of consent, the system may determine whether the requesting user and the potential partner user are within a threshold physical distance (e.g., within 25 miles, 100 miles, 300 miles, or other threshold distance) and if not, the verification system may infer that the requesting user is a bad actor and the verification system may inhibit the verification and consent process.

Figure 4D:
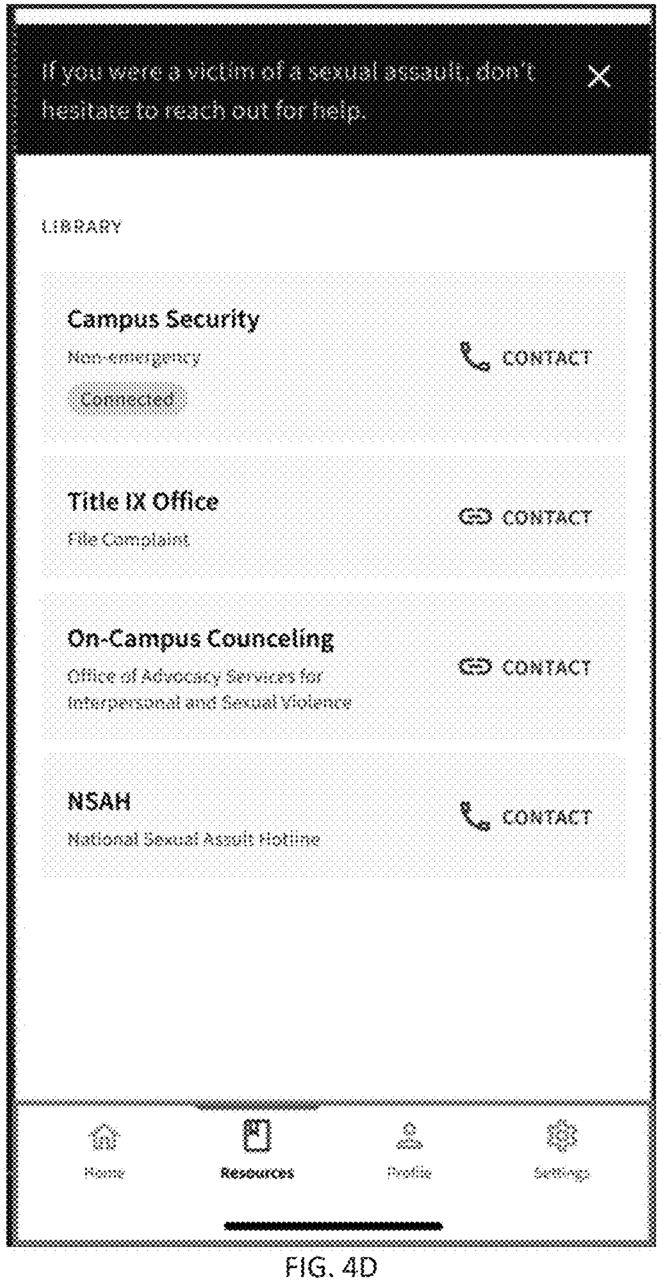

In addition, if a user initiates a security request via the security contact control illustrated in FIG. 4D (e.g., for a campus police officer or other person to escort the user home or other location to enhance user safety), the system may generate instructions to route the security person closest to the user to the user's location or may transmit the user's location to a security system which will dispatch a security person to the user's location. The user interface illustrated may enable the user to access other resources, such as counseling resources, Title IX resources, a sexual assault hotline, and the like by activating a corresponding control which may initiate a corresponding communication (e.g., a phone call, a text message, an email, and/or the like).

Figure 5A:
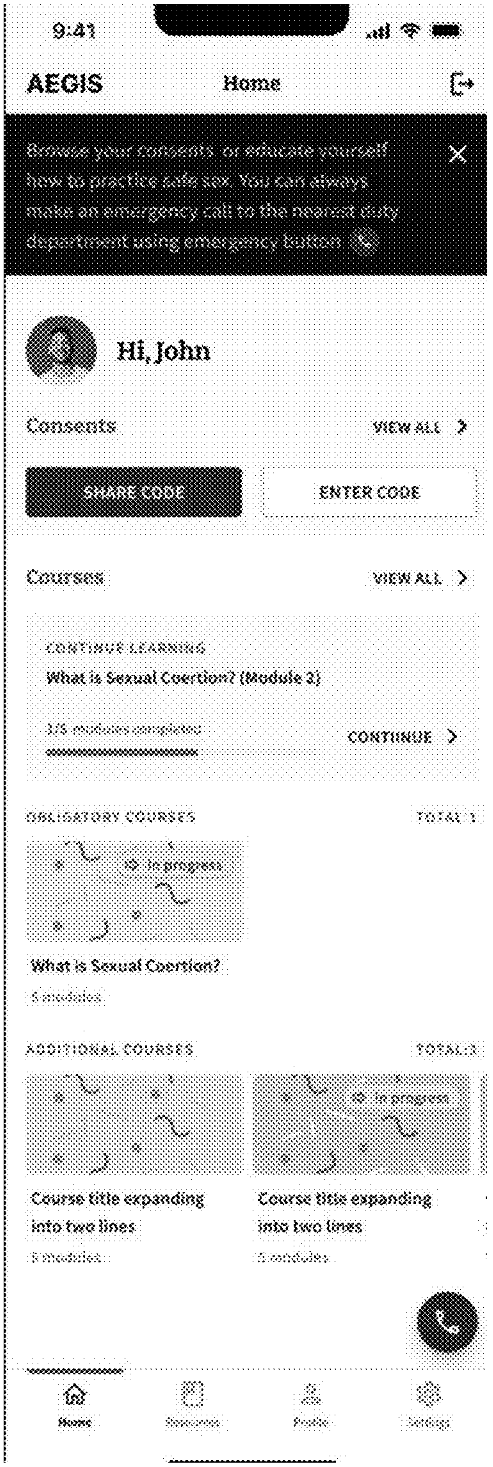

Once the user account has been set up and the voice sample has been recorded, the user may access other user interfaces via a home screen used in FIG. 5A and utilize a consent process executed via the verification system. The home screen may be accessed from a consent application hosted on the user device or from a website via a browser hosted on the user device. The home screen may include the user's name.

For example, and with reference to the example home screen illustrated in FIG. 5A, when two (or more) users want to establish that they are providing consent to an interaction involving the users (e.g., a sexual interaction), one of the users may activate a send code control. In response to activation of the send code control, a unique code may be sent to all the users that are going to be involved in the interaction. Optionally instead, the code may be sent to the requesting user who in turn may send the code to the prospective sexual partner. The users may then enter the code (which may be referred to as a pairing code) to be paired or joined as a group. Optionally, the pairing code is only valid for a specified period of time and if the pairing code is not entered within the specified time period it will no longer be valid and the user will need to request and enter a new pairing code.

Figure 5B:
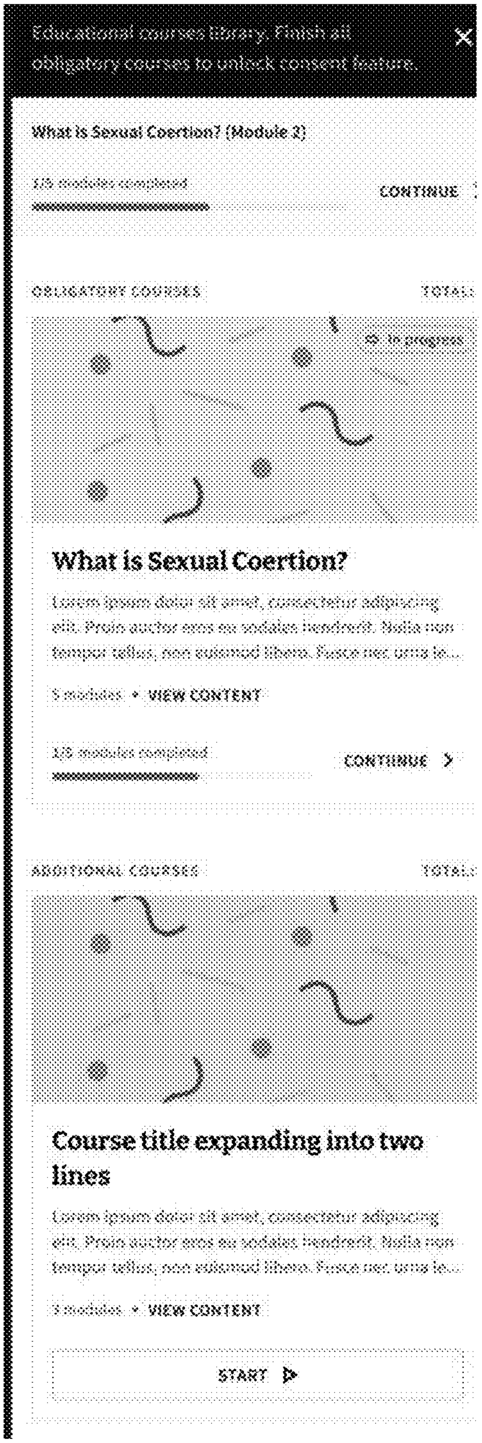

FIG. 5B illustrates an example home screen display which may be accessed from a consent application hosted on the user device or from a website via a browser hosted on the user device. The home screen may include the user's name, a list of available courses (where the courses may comprise video (including an audio track), audio only, text, and/or graphics), an estimated time to complete the course, and optionally an indication as to which courses the user has or has not completed. If a course includes multiple modules, the user interface may indicate how many modules of the course the user has completed and how many modules the user still needs to complete.

Figure 5C:
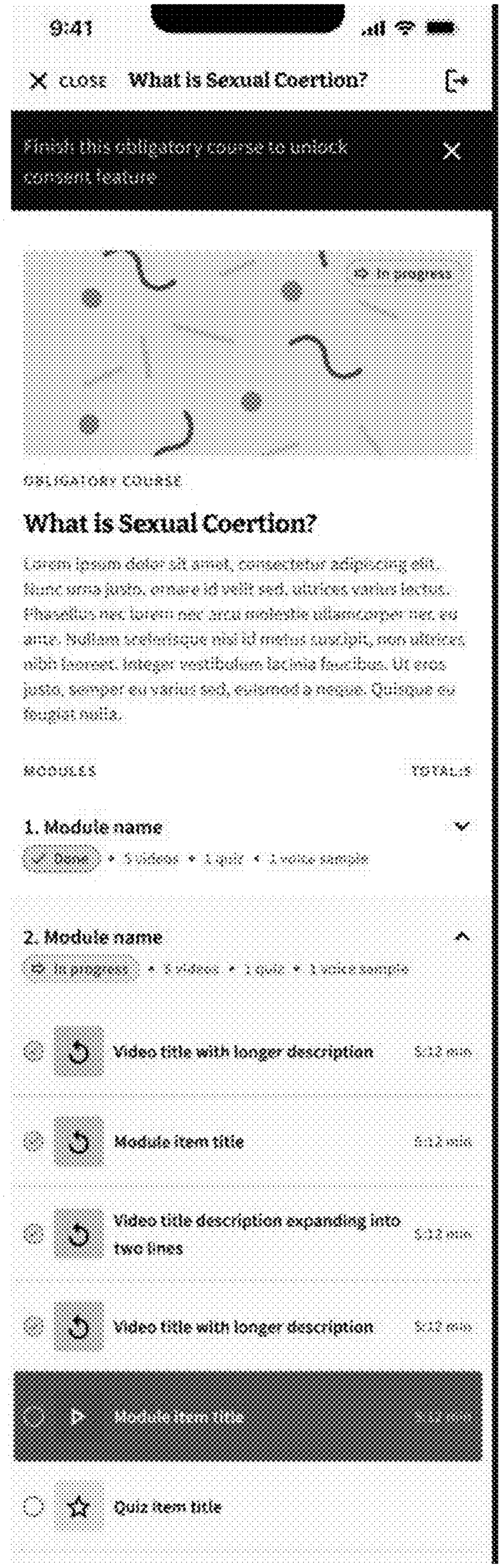

If the user selects a course a course, a user interface may be displayed (see, e.g., FIG. 5C), providing additional detail recording the course and listing the current course module that the user is to complete and additional course modules (e.g., including respective module names, descriptions, and time lengths) from which the user may select. The user interface may indicate which course modules the user has completed and which course modules the user has not completed. For a module that the user has completed, a control may be provided via which the user can repeat (e.g., replay) the course. A voice recording control may be provided in order to receive a voice sample. In addition, a test control may be provided via which the user may access a test (e.g., a quiz) for the current module.

Figure 5D:
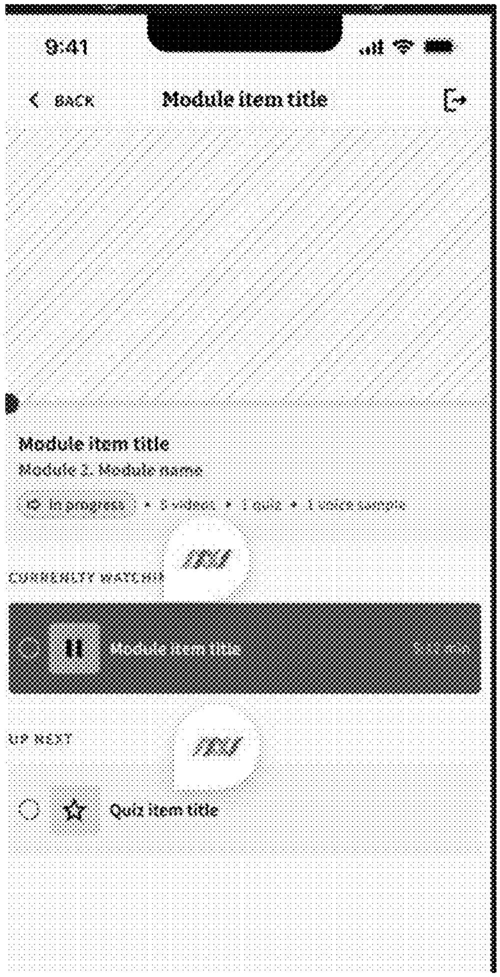

In response to the user selecting a course module, the example user interface illustrated in FIG. 5D may be presented. The example user interface includes a video/presentation playback area with an associated progress bar (indicating how much of the module video has been played, a title, a course time length, the number of videos in the module, the number of voice samples in the modules, and the number of module quizzes. A control may be provided via which the user may access a module quiz.

Figure 5E:
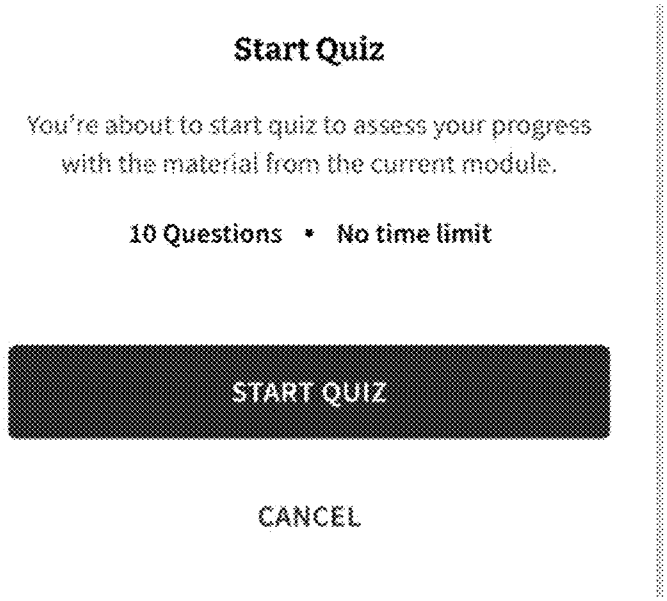
Figure 5F:
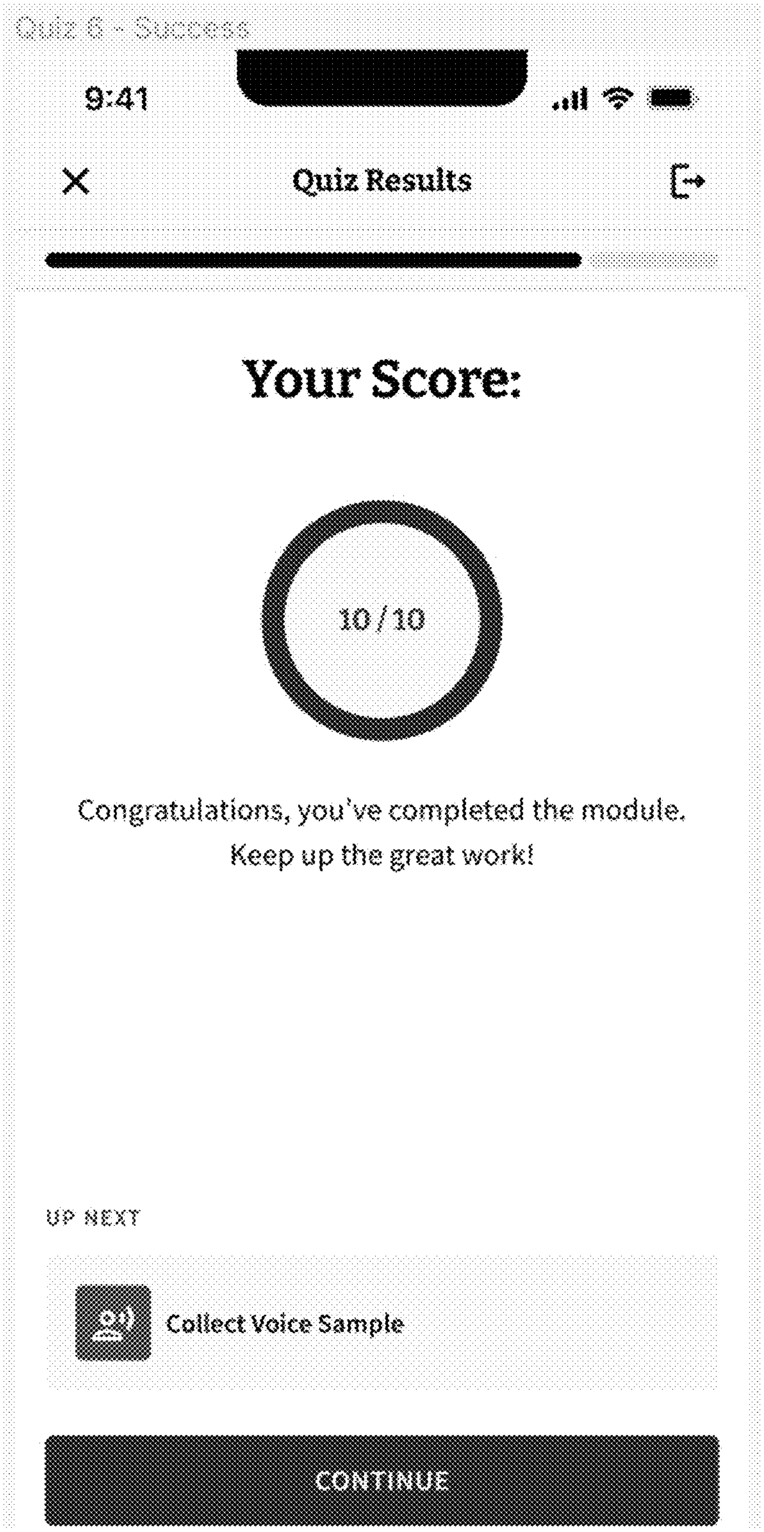

FIG. 5E illustrates an example module quiz user interface that may indicate the quiz subject matter, the number of questions in the quiz, and the time limit (if any) to complete the quiz. A start quiz control is provided which, when activated, initiates the quiz. The quiz user interface may provide multiple choice questions, fill-in-the-blank questions, true-or-false questions, free text questions, and/or other questions types. Optionally a control may be provided via which the user may exit the quiz without completing the quiz so that the quiz results are not recorded. If the user completes the quiz, the user's answers may be recorded in association with the user's record, the quiz may be graded, and the grade may be presented to the user (see, e.g., the example user interface illustrated in FIG. 5F) and recorded in the user's record. If the user has successfully completed (e.g., achieved the minimum threshold score) each course module, a course completion certificate may be recorded in the user record, sent to the user, and/or sent to the institution.

Figure 5G:
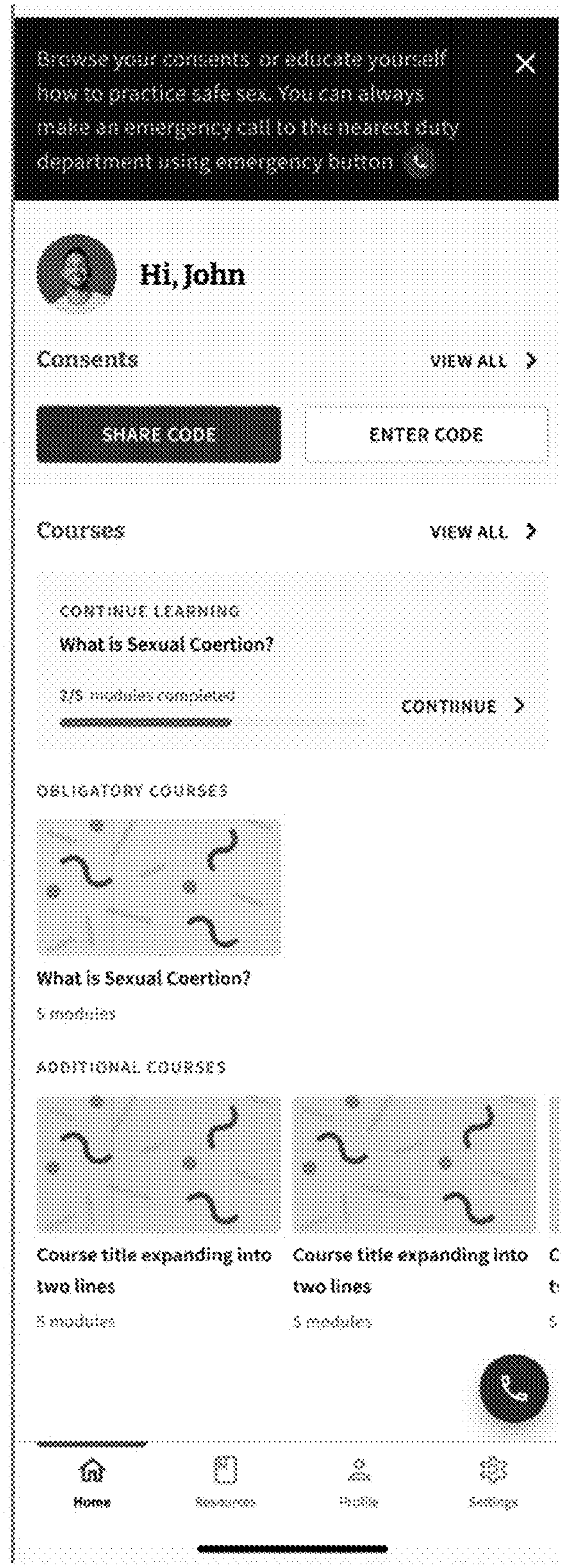

Referring to FIG. 5G, as similarly discussed above, when two (or more) users want to establish that they want to provide recorded consent prior to an interaction involving the users (e.g., a sexual interaction), one of the users may activate a send code control. In response to activation of the send code control, a unique code may be sent to all the users that are going to be involved in the interaction. Optionally instead, the code may be sent to the requesting user who in turn may send the code to the prospective sexual partner (e.g., via text messaging, email, the consent application, or otherwise). The users may then enter the code (which may be referred to as a pairing code) to be paired or joined as a group. A user may select another user to whom the code is to be sent to from the user's contact database, by entering the other user's phone number or email address, by accessing an institution contact database, or otherwise.

FIG. 5G-1 illustrates an example code presentation user interface that presents the code to a user (who may then share it with a prospective partner via the consent application, a messaging service, email, or otherwise). A countdown timer may be presented indicating that time remaining in which the code will be valid for use in the consent process. FIG. 5G-2 illustrates an example code entry user interface with a code entry field configured to receive the code from the user.

Figure 5H:
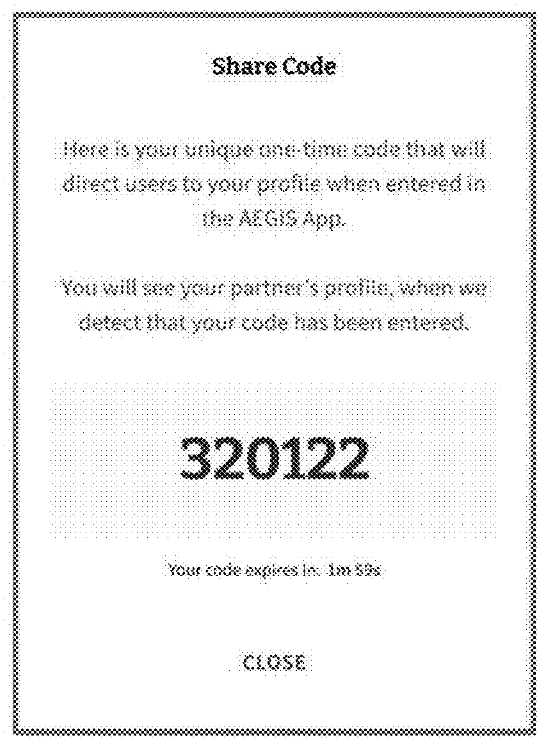
Figure 5I:
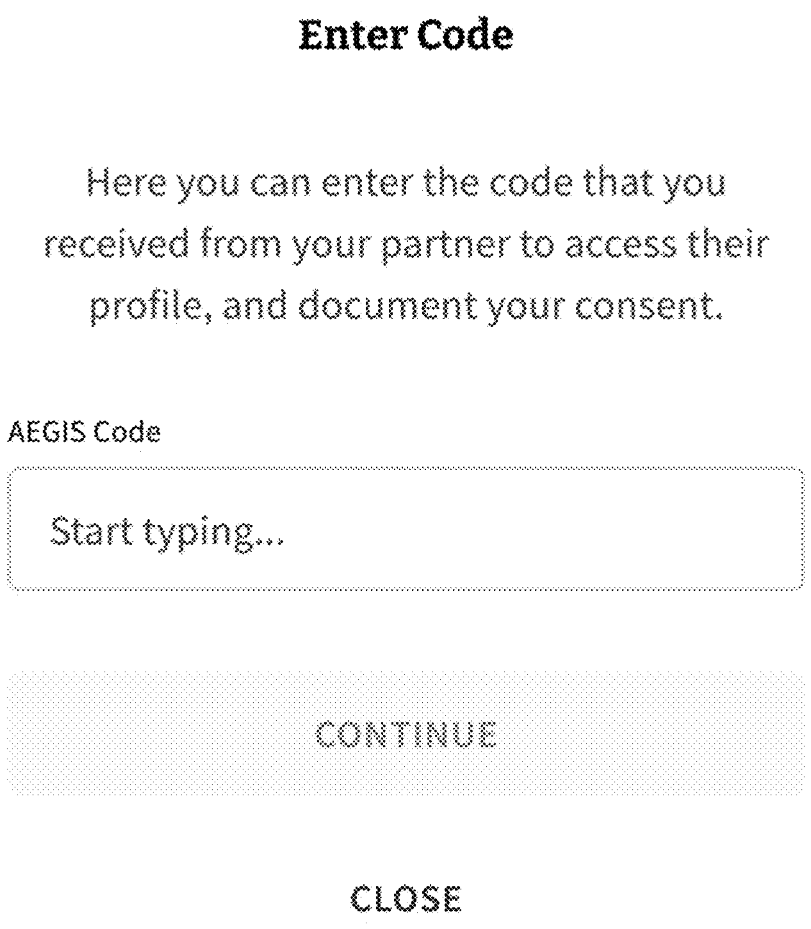

The example profile user interface illustrated in FIG. 5H may be presented (e.g., in response to a consent request and/or to all users in the consent process submitting the consent code discussed above). The profile of the other user is presented to the user. The profile may include an image of the other user, the other user's defined gender, the other user's defined sexuality, a textual self-description by the other user, and/or other profile information. A record consent control (which may be a circle or other shape) may be provided. In response to the user activating the record consent control, the example user interface illustrated in FIG. 5I may be presented. The user interface may include a photograph of the other user, the name of the other user, an image of the user being recorded by a front-facing camera on the user's device, a consent script that the user is to read as part of the consent process (which may optionally overlay the image of the user being recorded by a front-facing camera or which may be displayed under, over, or to one side of the image), and a record control.

Figure 5J:
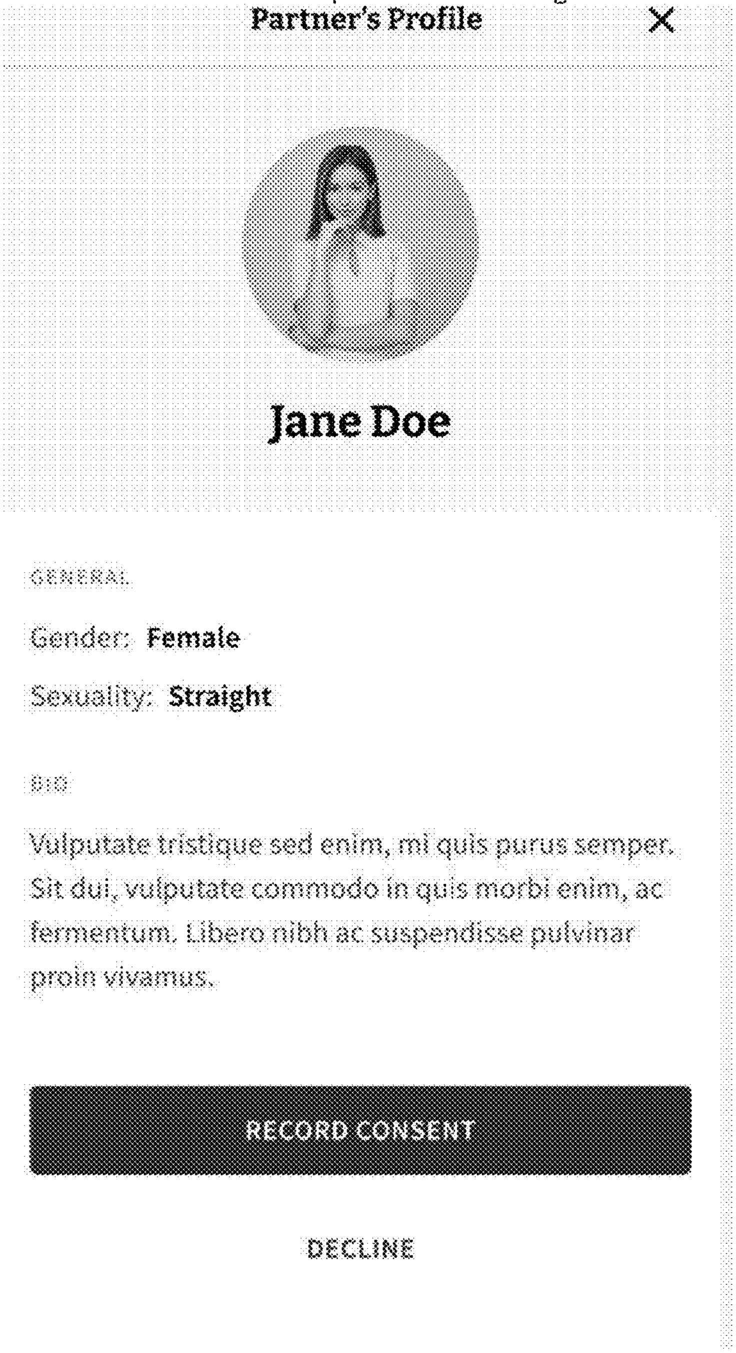
Figure 5K:
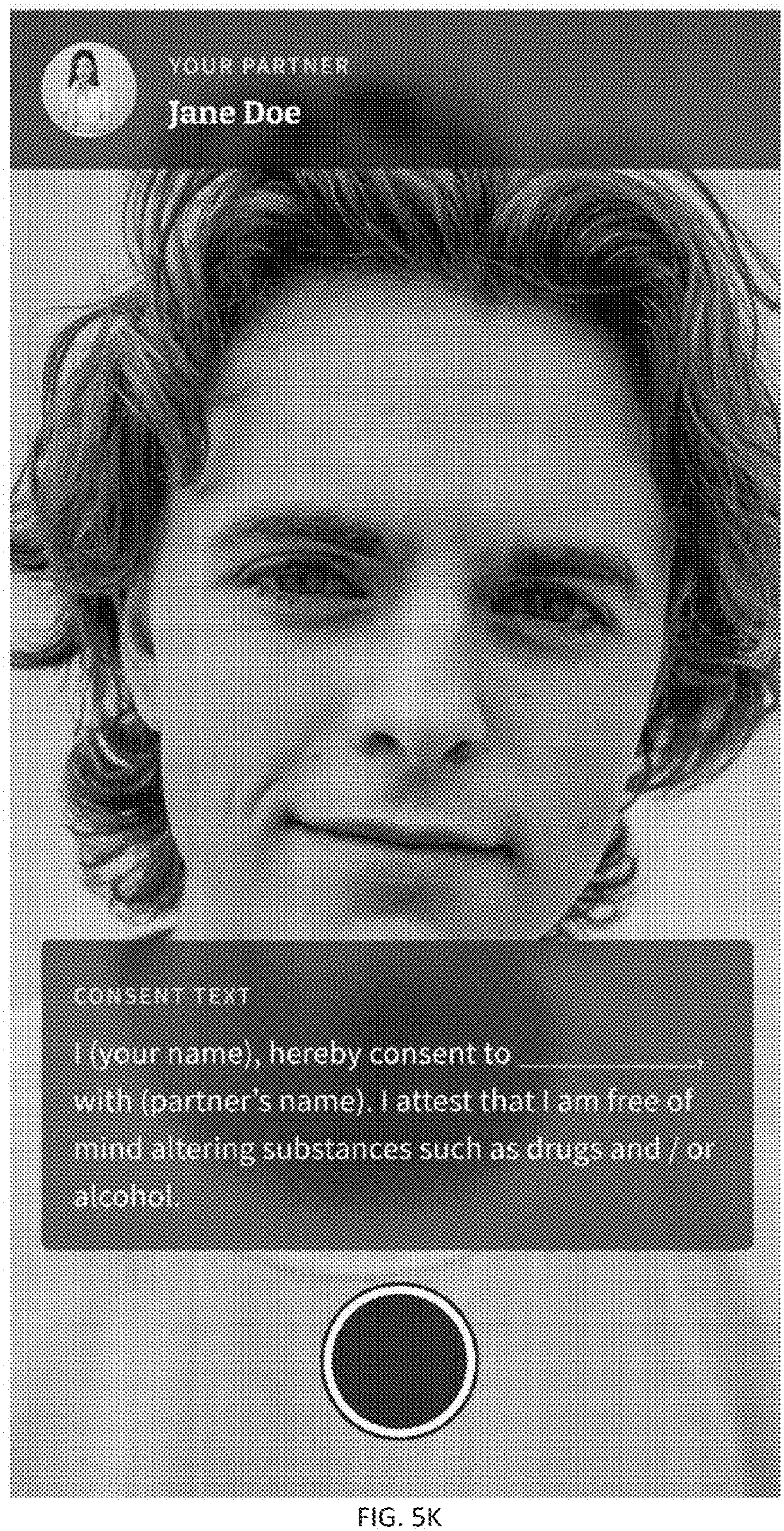

In response to the user activating the record control, a video of the user reading the consent script captured by the front-facing camera of the user device is recorded, as illustrated in FIG. 5J. In addition, as illustrated in FIG. 5J, the record control may be changed (e.g., from a circle to a square) to indicate the recording is in process. In addition, a timer and/or a progress bar may be depicted indicating the recording time length. Once the user has completed recording the user reading of the consent language, the example user interface illustrated in FIG. 5K may be presented. The user interface illustrated in FIG. 5K enables the user to playback and view the recording of the user reading the consent script. In addition, a re-record control is provided, which when activated enables the user to repeat the recording process. Optionally, the recording may be at least temporarily stored on the user's device. An upload control is provided which when activated causes the recorded consent video to be uploaded over the network to the remote verification system. Optionally, the consent application may delete the video recording from the user's device after the upload has taken place in order to conserve memory resources of the user device.

Figure 5L:
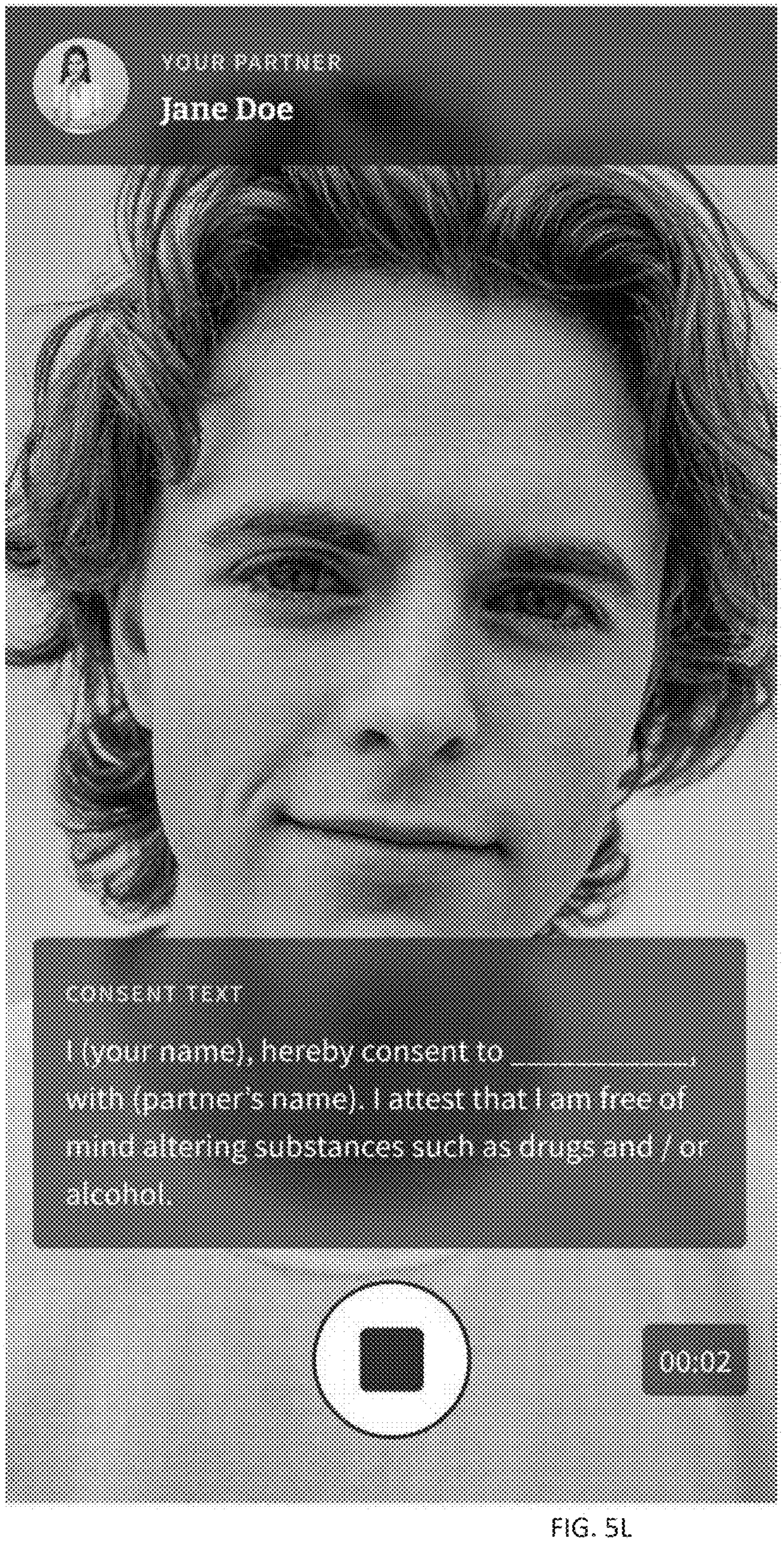

The prospective partner may then be prompted to enter the pairing code, as illustrated via the interface depicted in FIG. 5L. If the prospective partner correctly enters the code within the specified time period (if any), the prospective partner may be prompted to record a consent script as similarly described above with respect to the requesting user.

As described herein, a determination may be made as to whether a user (who may be referred to as a subject) lacks the intellectual capacity to provide a valid consent (e.g., to a sexual act) via user device. For example, as described elsewhere herein, such a determination may be made by performing a voice analysis on a voice input from the subject and determining a threshold likelihood of an estimated state of intoxication (e.g., alcohol or drug intoxication) to the extent that the user lacks the intellectual capacity to provide such valid consent. In addition or instead, an analysis of a subject's eye motions and/or pupils may be performed to determine an estimated state of intoxication to thereby determine the extent to which the subject lacks the intellectual capacity to provide such valid consent. In addition or instead, a subject's blink rate may be performed to determine an estimated state of intoxication to the extent that the user lacks the intellectual capacity to provide such valid consent.

Optionally, eye tracking may be performed by a mobile device of the subject using an infrared camera, a flood illuminator, a depth sensor, and/or a dot projector to create a detailed 3D depth map of the subject's face, which enables the device to recognize facial features, including the eyes. As discussed herein, such data may be used to track the movement and orientation of the user's eyes. By analyzing changes in the position and orientation of the eyes, the mobile device can determine where the user is looking. The mobile device and/or the application installed thereon may utilize machine learning and computer vision algorithms to process the data from sensors and cameras, detect and analyze facial features, including the eyes, and track eye movement in real-time.

Different weightings may be applied to a determination based on a voice analysis, an eye motion analysis, a pupil analysis, and/or a blink rate analysis in determining whether or not a person has or lacks the intellectual capacity to provide such consent to certain activities (e.g., sexual activities). By optionally using two or more techniques disclosed herein in determining whether or not a person has or lacks the intellectual capacity to provide such valid consent, a more accurate and reliable determination may be made, thereby enhancing safety and reducing false positive determinations.

For example, an optional intoxication formula that may be used to calculate the likelihood that the subject is unable to provide informed, legal, valid consent is as follows:

$$\text{Likelihood subject is intoxicated (LSI)} = 1/N(W_1D_1 + W_2D_2 + W_3D_3 + W_4D_4 \ldots W_nD_n)$$

where:

N=Normalization factor

W=Weight $D_1$=intoxication determination based on voice analysis $D_2$=intoxication determination based on eye motion analysis (e.g., horizontal nystagmus, smooth tracking)

$D_3$=intoxication determination based on pupil size/diameter/radius analysis $D_4$=intoxication determination based on eye blink rate analysis $D_n$=intoxication determination based on other determinations (e.g., smoothness of movement of the subject's device during testing, ability to focus gaze on the subject's device during testing, and/or other determinations)

Certain determinations will now be discussed in greater detail.

Eye movements are controlled by the brain. For example, when a person rotates their head while looking at an object, the brain causes the eyes to automatically move to stabilize the viewed object and to thereby provide a sharper image of the object. When a person is intoxicated (e.g., acute alcohol intoxication, or intoxication caused by certain drugs, such as phencyclidine, opiates, *cannabis*, or barbiturates), the cerebellar function is affected so that the brain cannot control eye movements properly. For example, a person may exhibit involuntary and rhythmic movement of the eyes. Such failure to adequately control eye movements is referred to as nystagmus. The failure to adequately control horizontal eye movements is referred to as horizontal nystagmus.

For example, horizontal gaze nystagmus detection of a subject may be performed by having the subject hold a mobile device (e.g., a smart phone) at eye level while stationary. The subject may be instructed (e.g., via an audible instruction and/or textual generated via application on the mobile device) to fully extend the arm of the hand holding the mobile device and to position the mobile device at the edge of the subject's vision (e.g., to the far left or far right of the subject's head at eye level). The screen of the mobile device may be brightly illuminated or may have an image displayed thereon by the application that the subject is instructed to track with their eyes. The subject may be instructed to gradually and smoothly move the mobile device towards the center of the subject's gaze (e.g., directly in front of and centered on the subject' face), repeating this process for both sides of the subject's head (e.g., so that the movement process takes about 2-4 seconds on each side), with the mobile device held in one hand for one side, and the other hand for the other side.

For example, the subject may first move the mobile device, while holding the device in the left hand, from the far left of the subject's head toward and to the center of the subject's gaze, while tracking the mobile device display with their eyes. The subject may then be instructed to move the mobile device, while holding the device in the right hand, gradually and smoothly from the far right of the subject's head toward and to the center of the subject's gaze, while tracking the mobile device display with their eyes. The forward facing camera (on the same side of the device as the display) may capture images of the subject's eyes during the foregoing movements. The application, hosted on the mobile device (such as the application discussed herein) and/or mobile device hardware may analyze the images of the eye movements of the subject's eyes (e.g., by tracking the movement of the subject's pupils), and based on the analysis of the eye movements, determine whether the subject is or the likelihood that the subject is under the influence of a substance that prevents the subject from having sufficient intellectual capacity to consent to certain acts.

With respect to determining whether the subject's eyes are tracking the subject's device, face detection, facial landmark detection, and tracking of eye movements may be performed in real time. For example, as similarly discussed elsewhere herein, a face detection algorithm (e.g., Haar cascades, Histogram of Oriented Gradients (HOG), and/or deep learning-based models) may be utilized to identify and locate the subject's face in the camera frame. Such techniques are described in greater detail herein. For example, facial landmark detection may be utilized to identify certain landmarks on the face, such as the corner of eyes. Optionally, a region-based convolutional neural network (R-CNN) may be utilized to detect eyes in the image. The movement of the identified eyes may be tracked over time by analyzing the positions of the detected facial landmarks corresponding to the eyes in consecutive frames. Optionally, optical flow techniques can be employed to estimate the motion (direction and speed) of pixels between frames, allowing the tracking of eye movements.

By way of example, differential methods (e.g., the Lucas-Kanade method) may be used to compute optical flow by analyzing intensity gradients in the image. In addition or instead, correlation-based methods may be utilized that identify the best matching region in the next frame for each pixel in the current frame. In addition or instead, deep learning, convolutional neural networks (CNNs) may be utilized to directly learn optical flow from image sequences.

Optionally, gaze estimation models may be utilized to predict the direction in which the subject is looking. A gaze estimation model may take into account the position of the eyes, head orientation, and/or other factors. Deep learning-based models, such as CNNs and/or recurrent neural networks (RNNs), may be trained for and used for gaze determination.

Optionally, in response to detecting that the subject's eyes are not adequately tracking the subject's device, an audible and/or textual notification may be generated by the application instructing the user to better track the device with their eyes, and/or repeat the process.

The application may determine (e.g., using images and/or eye tracking data accessed from the mobile device using an application programming interface) if there is a lack of smooth pursuit of the mobile device by the subject's eyes. For example, the application may determine whether the eyes cannot smoothly track the moving mobile device and whether the eyes exhibit jerky movements. Such detected inability of the subject's eyes to perform "smooth pursuit" may indicate that the subject's brain (and decision making ability) is impaired as a result of an intoxicating substance, such as alcohol or certain drugs.

The application may determine via an analysis of eye position and orientation data from the mobile device an analysis of the data indicating the movement, position, and/or orientation of the subject's eyes whether the subject exhibits distinct nystagmus at maximum deviation, where when the eyes are moved to the side and held for a certain period of time (e.g., 2, 3, 4, or 5 seconds), nystagmus becomes more pronounced. Such detected distinct nystagmus at maximum deviation may indicate that the subject's brain (and decision making ability) is impaired because of an intoxicating substance, such as alcohol or certain drugs.

The subject may be instructed to smoothly move the mobile device to one side until the subject's eye has gone as far to the side as possible (where no white may be showing in the corner of the eye at maximum deviation). Thus subject may be audibly and/or textually instructed by the application to hold the eye at that position for a period of time (e.g., four or more seconds), and the data indicating the movement, position, and/or orientation of the subject's eyes (e.g., the pupils) may be examined to detect distinct and sustained eye nystagmus. For example, a person may exhibit a minor amount of jerking of the eye (and hence the pupil) at maximum deviation even when not under the influence of an intoxicating substance, but such jerking will only result in small perturbations and will typically not be sustained for more than 1-3 seconds. When a person is under the influence of an intoxicating substance, the eye jerking will have greater perturbations, and may be sustained for relatively longer periods of time (e.g., greater than four seconds). The application may detect the eye jerking, measure the distance of pupil movement during eye jerking, and measure how long (e.g., how many seconds) the jerking persisted.

The application may determine via an analysis of the position, movement, and/or orientation data of the subject's eyes (e.g., the pupils) whether the subject exhibits onset of nystagmus prior to 45 degrees, wherein nystagmus occurs when the eyes are still looking forward but are within 45 degrees of center. Such detected onset of nystagmus prior to 45 degrees may indicate that the subject's brain (and decision making ability) is impaired because of an intoxicating substance, such as alcohol or certain drugs. When a person is under the influence of an intoxicating substance, the eye jerking will have greater perturbations, and may be sustained for relatively longer periods of time (e.g., greater than four seconds), than when sober. The application may detect the eye jerking, measure the distance of pupil movement during eye jerking, and measure how long (e.g., how many seconds) the jerking persisted.

Optionally, each foregoing determination regarding smooth pursuit of the mobile device by the subject's eyes, distinct nystagmus at maximum deviation, and/or onset of nystagmus prior to 45 degrees, may be weighted differently and used to generate a score (e.g., a nystagmus score) indicative of the likelihood that the subject is (or is not) under the influence of an intoxicating substance such that the subject is considered unable to provide a legitimate, valid consent to certain activities, such as sex. For example, a determination may be made as to whether the nystagmus score exceeds a predefined threshold, and if so, a determination may be made that the subject is likely under the influence of an intoxicating substance such that the subject is considered unable to provide a legitimate consent to certain activities.

Optionally, the subject's movement of the device (and hence the movement of the built in device camera) may be tracked in real time using on board device sensors to verify that the subject is moving the device smoothly and that the subject is tracking the device with the subject's eyes (as opposed to gazing elsewhere). For example, detecting smooth motion of the device while capturing images of the subject's gaze may be performed by analyzing three axis accelerometer and gyroscope readings from the subject's device. The smoothness of motion may be determined by examining the patterns and characteristics of these sensor signals. For example, the readings from the three axes of the accelerometer may be utilized to compute the magnitude of the overall acceleration experienced by the device. The gyroscope readings may be used to calculate the angular velocity, which indicates the rate of rotation around each axis. Optionally, low-pass filters may be applied to the acceleration and angular velocity signals to remove or reduce high-frequency noise. This helps analyze the smooth components of the motion.

If the monitored acceleration varies during the movement by more than a threshold amount (optionally for more than a threshold period of time), indicating that the acceleration is not stable, a determination may be made that the subject is not smoothly moving the device. If the detected angular velocity is determined not consistent (e.g., varies by more than a threshold amount, optionally for more than a threshold period of time), indicating that there are abrupt changes in in rotation speed, a determination may be made that the subject is not smoothly moving the device.

Optionally, in response to detecting that the subject is not smoothly moving the subject's computer-equipped device, an audible and/or textual notification may be generated by the application to move the device more smoothly, slowly, and/or to repeat the process. Optionally, the smoothness of the movement of the device may be utilized in determining whether the subject is under the influence of an intoxicating system and is unable to provide a valid consent.

Additionally, a pupillary response examination is optionally conducted. During this test, the device's front-facing camera captures the subject's eye reactions to the illuminated screen of the subject's device. The cumulative results from these tests may then optionally be compared against the subject's pre-recorded baseline (e.g., accessed from a database of records comprising a record for the subject), datasets used to train the artificial intelligence system, or a combination of both. This comparison enhances the accuracy in determining the likelihood of the subject being under the influence.

For example, alcohol can influence the size of a person's pupils due to its impact on the nervous system. The pupils are the black circular openings at the center of the eye, and their size is controlled by the muscles of the iris. The iris can reflexively dilate the pupil (making the pupil larger) or constrict the pupil (making the pupil smaller) to control the amount of light let through. Alcohol consumption causes the iris muscles to relax, resulting in a dilated pupil and may slow pupil reflexes, delaying the pupils' ability to constrict in the presence of increased light.

In particular, alcohol has a depressant effect on the central nervous system, slowing down the activity of neurons in the brain. Alcohol enhances the inhibitory effects of the neurotransmitter gamma-aminobutyric acid (GABA) and inhibits the excitatory effects of neurotransmitters, such as glutamate. The central nervous system controls the size of the pupil through a balance between the sympathetic and parasympathetic nervous systems.

As discussed above, the size of the pupil is regulated by the iris muscles (the sphincter pupillae and dilator pupillae muscles). The parasympathetic nervous system, through the release of acetylcholine, initially causes the sphincter pupillae muscle to contract, leading to miosis (constriction of the pupil). The sympathetic nervous system, on the other hand, causes the dilator pupillae muscle to contract, leading to mydriasis (dilation of the pupil).

Alcohol enhances the parasympathetic nervous system's activity, increasing the release of acetylcholine and subsequent miosis.

As the alcohol is metabolized in the body and alcohol's depressant system effects on the nervous take hold, the pupils may dilate, which is sometimes referred to as mydriasis.

Certain drugs, such as opioids may also affect the size of the pupil. For example, opioids cause miosis (pupillary constriction). The constriction occurs because opioids, such as heroin, oxycodone, and other painkillers act on the brainstem, resulting in a decrease in the release of neurotransmitters that regulate pupil size.

Computer vision may be utilized to detect pupil size, optionally in real time. A subject may be instructed (e.g., via audible and/or text instructions) to view a front facing camera on the subject's mobile device. Optionally, an image may be displayed by the application via the device display that the subject is instructed to focus on.

Still and/or video images of the subject's eyes may be captured by one or more of the device's cameras (e.g., an RGB camera and/or an infrared camera, or a combination of different sensors). The images may be preprocessed to enhance the subsequent analysis. The preprocessing may include adjusting image brightness/luminescence, contrast, and/or sharpness. Optionally, image noise may be filtered out using a low pass filter. Brightness/luminescence adjustment may include changing the overall intensity of pixel values in an image.

Brightness/luminescence adjustment may be used to control the overall luminance of an image. Brightness/luminescence adjustment may be used to correct underexposed or overexposed images, making details more visible, and improving overall visibility for analysis. For example, brightness/luminescence adjustment may be performed by adding or subtracting a constant value for some or all pixels in the image.

Contrast refers to the difference in intensity between the darkest and lightest parts of an image. The contrast adjustment may be performed by redistributing pixel values to increase or decrease this difference. Histogram equalization may be utilized for contrast enhancement. Contrast adjustment may be used to enhance the visibility of details in an image. Increasing contrast makes the features more distinguishable, while decreasing contrast can help in cases where details are overly emphasized.

Sharpness adjustment may be performed using image filtering techniques. For example, convolution with a high-pass filter may be utilized to enhance high-frequency components in an image, making edges and details appear more pronounced, assisting in edge detection for identifying the pupil.

Face detection algorithms may be utilized to locate and isolate the face within the images. This helps narrow down the region of interest for pupil detection.

Face detection may optionally be performed using one or more of the following techniques. Optionally, some or all of the following techniques may be applied to a grayscale version of the image.

Haar cascades, a type of classifier that uses Haar-like features (e.g., edge features, line features, four rectangle features) to detect objects may be utilized. For example, a pre-trained Haar cascade classifier for faces may be utilized, and it scans the image at different scales and positions to identify regions that likely contain faces.

Histogram of Oriented Gradients (HOG), a feature descriptor technique that captures information about the local gradients in an image, may be utilized. HOG may be utilized in combination with a support vector machine (SVM) classifier for face detection by identifying patterns associated with faces.

A Viola-Jones framework may be utilized that combines Haar cascades with machine learning. It may use integral images for rapid feature evaluation and may employ a classifier to determine whether a particular region contains a face.

Optionally, in addition or instead, deep learning techniques may be utilized in performing face detection.

For example, a region-based convolutional neural network (R-CNN) may learn hierarchical features directly from the data. By way of illustration, a set of region proposals may be generated that are likely to contain objects. In the case of face detection, these proposals represent candidate regions in the input image where a face might be located. The proposed regions may then be warped to a fixed size (e.g., using Region of Interest (RoI) pooling) to ensure that no matter the size or aspect ratio of the proposed region, it can be fed into subsequent layers of the neural network. The warped regions may be input into a convolutional neural network (CNN) for feature extraction. The CNN may be pre-trained on a large dataset of faces and can capture hierarchical features from the input image. The CNN may comprise an input layer, an output layer, one or more hidden convolutional layers comprising nodes, a pooling layer, and an error function. During training, the CNN computes label predictions for the input data, the error function is used to calculate the loss between predictions and actual labels, gradients of the loss with respect to the model parameters (e.g., node weights) are computed and the model parameters are updated (e.g., using backpropagation).

The extracted features are then fed into different branches of the network: classification branch and a regression branch. The classification branch determines the probability of each proposed region containing a face, and the regression branch refines the coordinates of the bounding box around the detected face. After classification and regression, a post-processing step (e.g., Non-Maximum Suppression (NMS)) may be applied. NMS may be utilized to reduce or eliminate redundant and overlapping bounding boxes, keeping only the most confident predictions (e.g., having a confidence level above a specified threshold).

By way of further example, a Multi-task Cascaded Convolutional Network (MTCNN) algorithm may be utilized to identify a face in an image. MTCNN may propose candidate regions using a CNN in a stage, and then refine and filter the candidates in subsequent stages. Haar cascades are a type of classifier that uses Haar-like features to detect objects. A pre-trained Haar cascade classifier for faces may be employed to scan the image at different scales and positions and to identify regions that likely contain faces.

Once the face is identified, the region around the eyes may be extracted using the information obtained from face detection. This step may focus the analysis on the eyes, reducing computational complexity and computer resource utilization.

A pupil detection algorithm may then be used to identify and locate the pupil within each eye. One or more computer vision techniques, such as edge detection, image thresholding, and contour analysis, may be used to identify and locate the pupil.

Edge detection (e.g., performed using Canny, Sobel, and/or Prewitt operators) identifies boundaries within an image, highlighting areas where there are significant changes in intensity, which often correspond to object boundaries. The edge detection algorithm is applied to the input image (which may be limited to the eyes), thereby highlighting the edges and contours in the image, including the boundary of the pupil.:

After edge detection, image thresholding may be applied to convert the grayscale image into a binary image, where pixels belonging to the pupil are set to one value (e.g., white) and the background to another value (e.g., black). Adaptive thresholding may be utilized. Contour analysis may be utilized to identify and analyze the contours, or boundaries, of objects in an image, and so may be used to locate and extract the boundary of the pupil. For example, the contours in the binary image may be obtained after thresholding. The contours corresponding to the pupil may be identified based on characteristics such as size, circularity, or area. The contour that best represents the pupil is identified and the corresponding coordinates or region are extracted.

Pupil size measurement may then be performed on the identified pupil. The diameter, radius, or area of each pupil in the image may be determined. For example, the number of pixels in a line defining the diameter of the pupil may be counted, and the pixel measurements may be converted to a distance using a standard of measurement (e.g., millimeters).

As discussed elsewhere herein, a user's blink rate may optionally be utilized in determining whether a subject is under the influence of a substance which may impair the subject's ability to provide informed, legal consent to certain activities, such as sexual activities. With respect to intoxicating substances (e.g., alcohol, opioids, and the like), certain intoxicating substances act as a central nervous system depressant, and they may slow down neural activity. This may lead to a decrease in overall motor functions, including the rate of eye blinking. For example, slowed neural responses can affect the coordination of muscles, including those responsible for blinking. In addition, the consumption of intoxicating substances may cause delayed reflexes and impaired reaction time. This delay may be reflected in slower eye movements, including blinking.

As discussed elsewhere herein, certain described techniques may be used to identify a subject's eyes in images. A blink detection algorithm may then be utilized that analyzes the changes in the appearance of the eyes over time, such as that caused by blinking. This information may be utilized to determine a blink rate. A determination may be made that the subject is under the influence of a substance such that the subject is incapable of providing a valid consent to certain acts (e.g., sexual activities) when the blink rate falls below a specified threshold.

For example, the Eye Aspect Ratio (EAR), a measure of the eye's openness and closure may be determined. The EAR may be calculated based on the positions of certain landmarks on the eyes. A significant decrease in EAR (e.g., a decrease above a predefined threshold) indicates a blink.

By way of further example, eye closure detection may be performed to detect a blink. Changes in pixel intensities (in the pixels corresponding to the location of the eye(s)) over time may be tracked to determine a blink (e.g., where the change from relatively higher intensity to relatively lower intensity that is greater than a specified threshold within a threshold period of time may indicate a blink).

A temporal analysis may be performed, wherein the blink detection determinations may be monitored over time (e.g., 15-30 seconds) to calculate the blink rate (e.g., blinks per second and/or blinks per minute).

If the blink rate is below a specified threshold, indicating intoxication, a determination may be made that the user is not intellectually capable of providing a valid consent to certain actions (e.g., sexual activity).

The thresholds may be set based on the chosen blink detection algorithm, image lighting conditions, the subject's weight and/or height, and/or other factors.

The images (e.g., video frames or still images) comprising the subject's eyes may be continuously analyzed in real-time to monitor blink events and update the blink rate in a dynamic manner. Images used to detect one indication of intoxication may be used to detect other indications of intoxication. For example, the same images used to detect nystagmus may be used to detect pupil size. By way of further example, the same images used to detect pupil size may be used to detect blinking.

Figure 6:
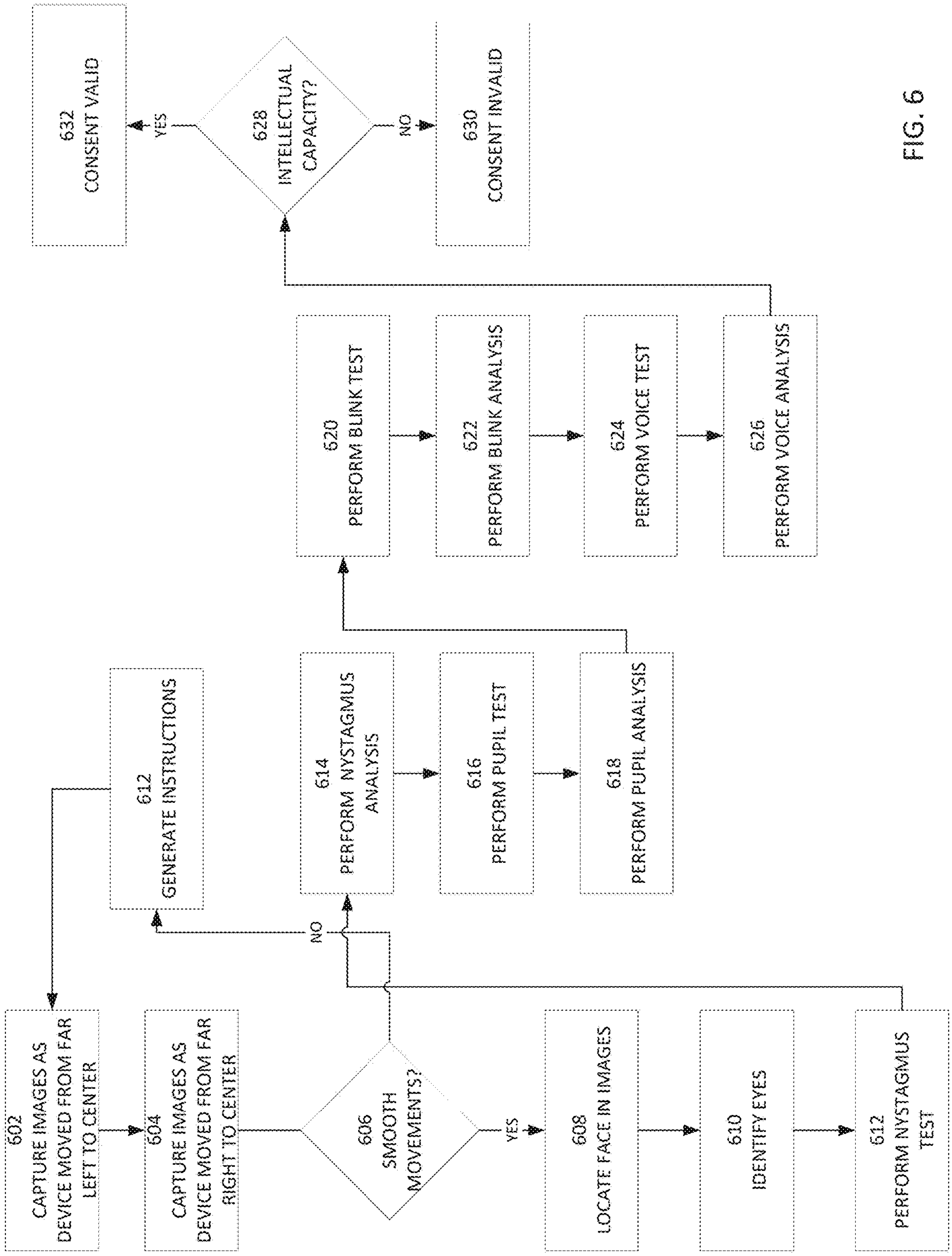
FIG. 6 illustrates an example process.

Certain example figures will now be described. Referring now to FIG. 6, an example process of determining whether a subject is intoxicated and has the intellectual capacity to provide consent to certain activities (e.g., sexual activities). It is understood that some or all of the techniques described above may be utilized at corresponding blocks of the example process. For example, the process illustrated in FIG. 6 may be used in conjunction with some or all of the states, actions, and techniques of the processes illustrated in FIGS. 3A and 3B. By way of illustration, the nystagmus determinations, the pupil dilation determinations, the blink rate determinations, and/or the voice determinations may be used to determine whether consent is satisfactory in FIG. 3B. Some or all of the various determinations and identifications discussed may be stored in memory (e.g., in a database user record of the subject) and accessed from memory to perform the various analyses, reporting, and/or actions described herein.

An image capture of the subject's face may be performed to be used to conduct certain tests and analysis. For example, at block 602, an application on a subject's device (e.g., a smart phone or other camera equipped mobile computer device) may provide voice and/or text instructions to hold the device in their left hand at arm's length and move the device slowly from the far left, at eye level, to in front of the subject's face, and to track the device (e.g., an illuminated display of the device) with their eyes. This movement may take 3-8 seconds. In addition, the subject may be instructed to pause the movement and to hold their gaze for a certain period of time (e.g., 3, 4, 5, 6, or 7 seconds), such as when the device is at the far left and/or at some intermediate point prior to 45 degrees between the leftmost position and the subject's face. Images (e.g., still and/or video images) of the subject's face may be captured by the front facing camera of the device during such movement and pauses.

At block 604, the application on the subject's device may provide voice and/or text instructions to hold the device in their right hand at arm's length and move the device slowly from the far right, at eye level, to in front of the subject's face, and to track the device (e.g., an illuminated display of the device) with their eyes. Images (e.g., still and/or video images) of the subject's face may be captured by the front facing camera of the device. In addition, the subject may be instructed to hold their gaze for a certain period of time (e.g., 3, 4, 5, 6, or 7 seconds), such as when the device is at the far right and/or at some intermediate point prior to 45 degrees between the rightmost position and the subject's face.

Figure 7A:
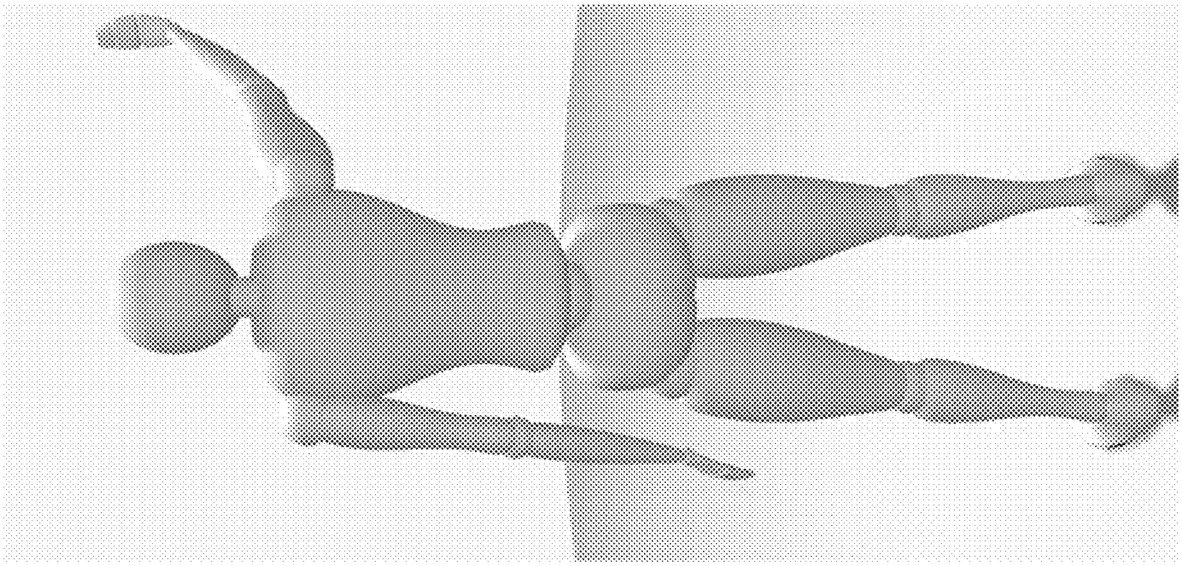
FIGS. 7A-7H illustrate example positioning of a camera device about a subject's face.
Figure 7B:
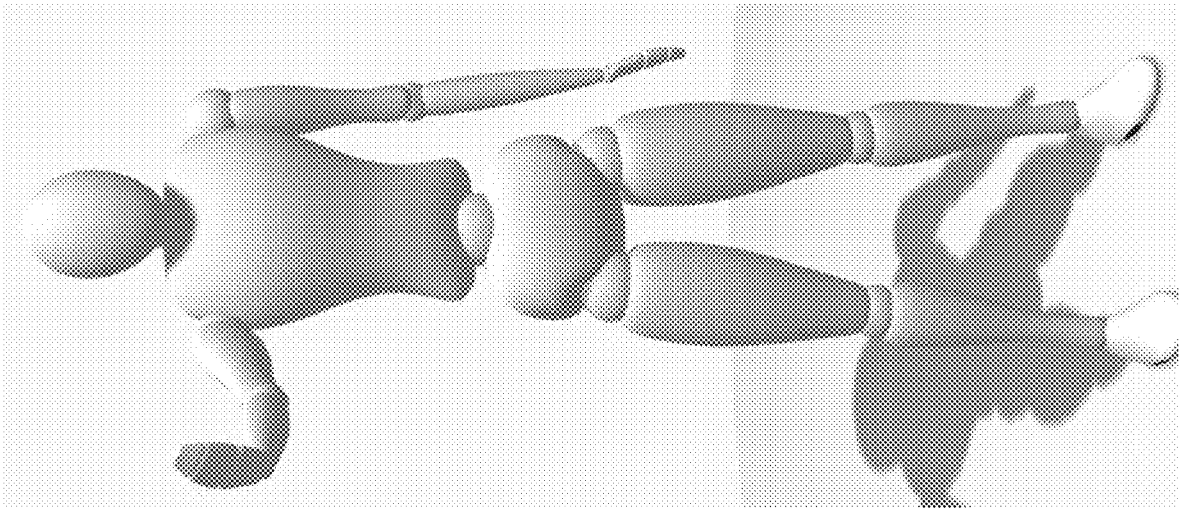
Figure 7C:
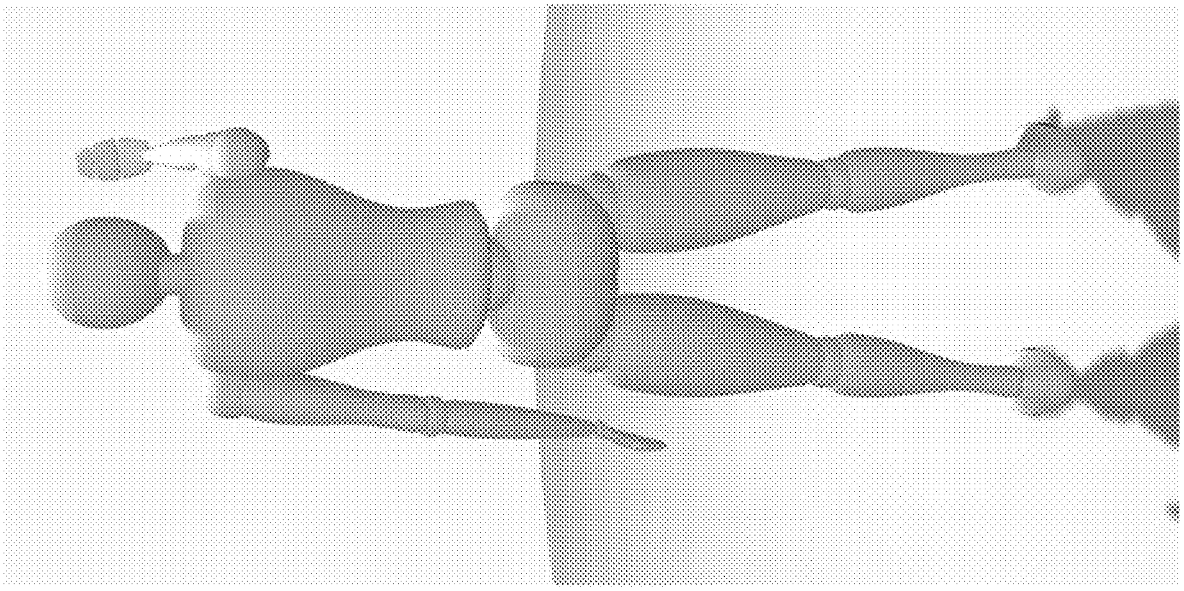
Figure 7D:
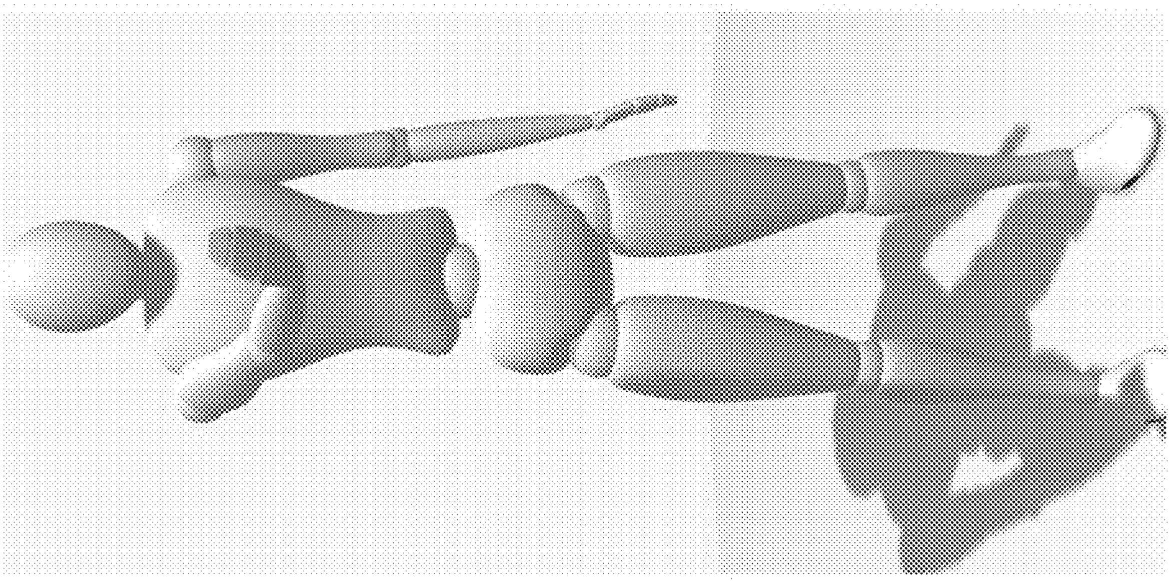

For example, with reference to FIGS. 7A-7H, example positionings of the front facing camera-equipped device relative to a subject's face are depicted. FIG. 7A illustrates the back of the subject, with the subject's right hand holding a front facing mobile device, outstretched towards the right of the subject's face and eyes, while images are being captured of at least a portion of the subject's face by the subject's device. FIG. 7B illustrates the front of the subject with the subject's right hand, holding the front facing mobile device, outstretched towards the right of the subject's face and eyes, while images of at least a portion of the subject's face are being captured by the subject's device. FIG. 7C illustrates the back of the subject with the subject's right hand holding the front facing mobile device, outstretched in front of the subject's face and eyes, while images of at least a portion of the subject's face are being captured by the subject's device. FIG. 7D illustrates the front of the subject with the subject's right hand, holding the front facing mobile device, outstretched in front of the subject's face and eyes, while images of at least a portion of the subject's face are being captured by the subject's device.

Figure 7E:
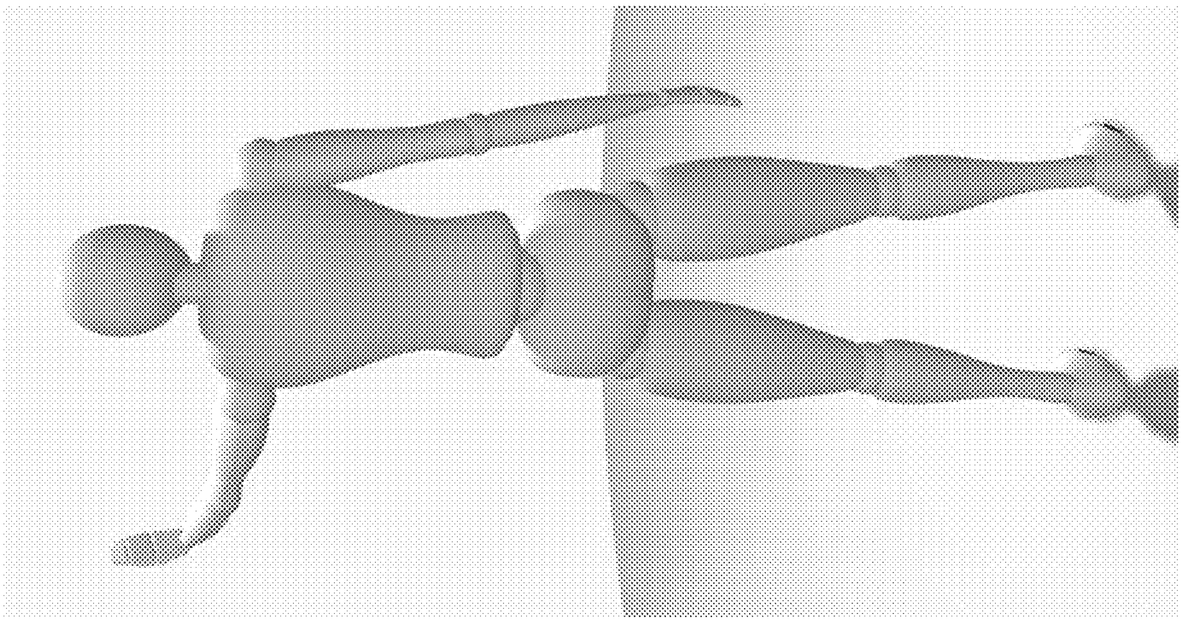
Figure 7F:
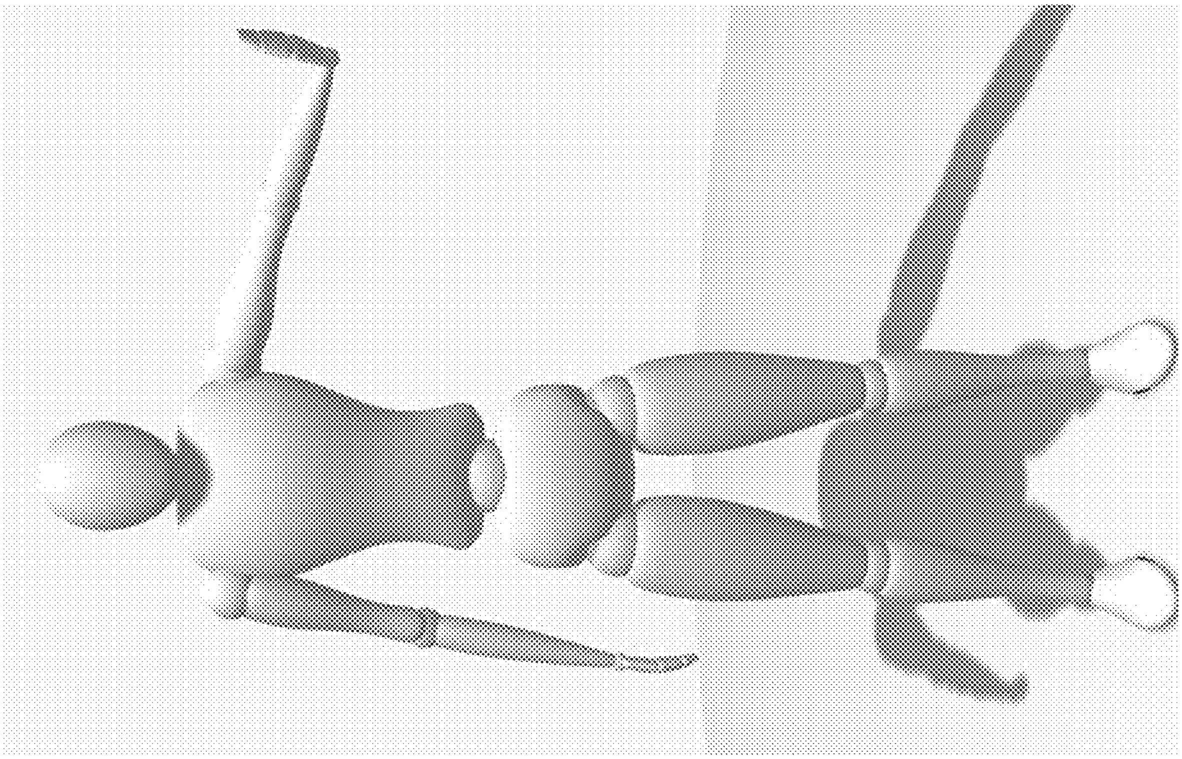
Figure 7G:
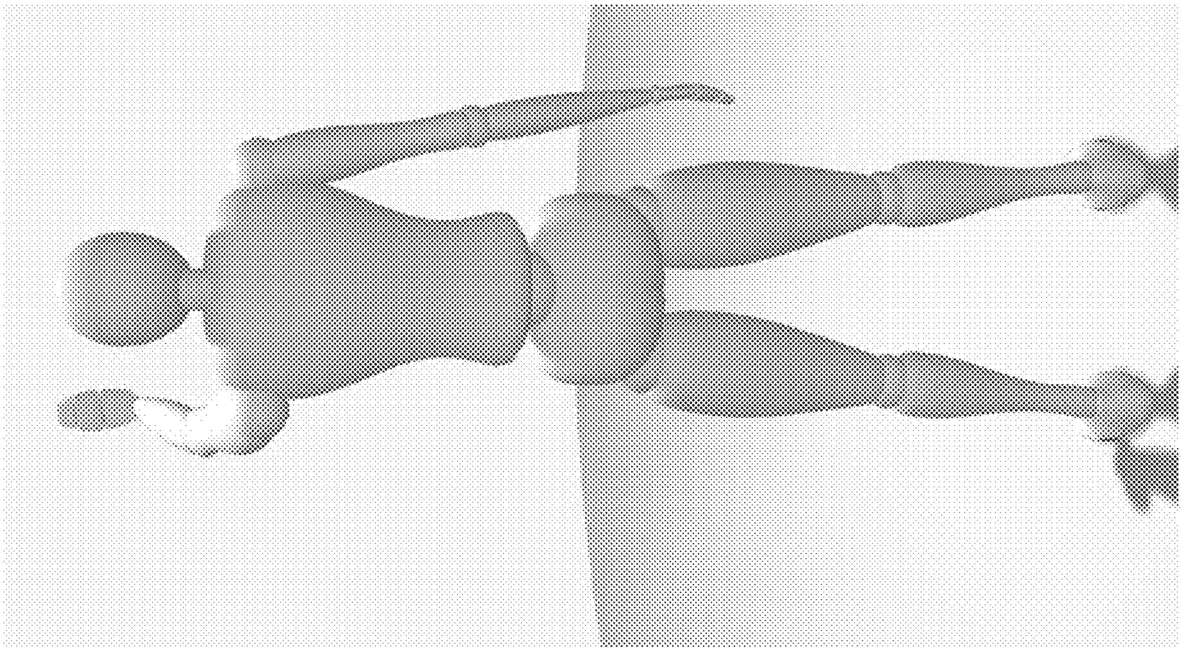
Figure 7H:
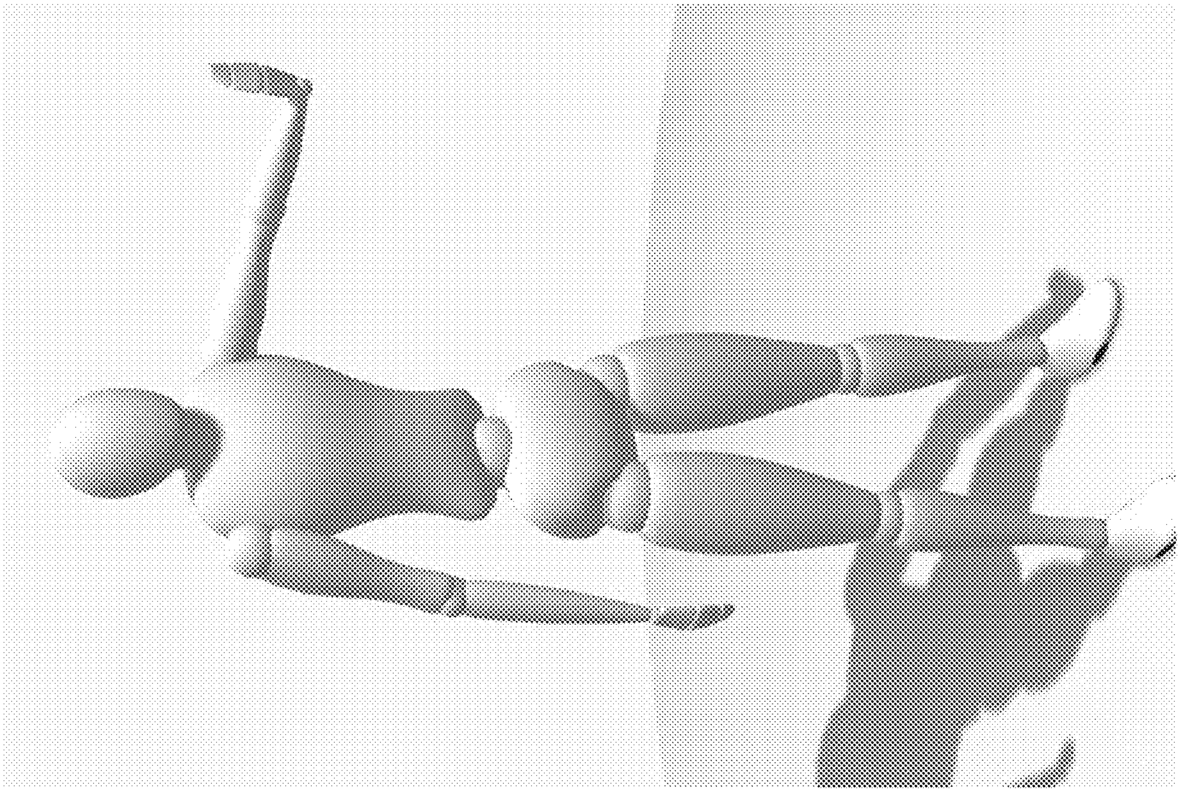

FIG. 7E illustrates the back of the subject with the subject's left hand, holding the front facing mobile device, outstretched towards the left of the subject's face and eyes, while images of at least a portion of the subject's face are being captured by the subject's device. FIG. 7F illustrates the front of the subject with the subject's left hand, holding the front facing mobile device, outstretched towards the left of the subject's face and eyes, while images of at least a portion of the subject's face are being captured by the subject's device. FIG. 7G illustrates the back of the subject with the subject's left hand, holding the front facing mobile device, outstretched in front of the subject's face and eyes, while images of at least a portion of the subject's face are being captured by the subject's device. FIG. 7H illustrates the front of the subject with the subject's left hand, holding the front facing mobile device, outstretched in front of the subject's face and eyes, while images of at least a portion of the subject's face are being captured by the subject's device.

At block 606, a determination may be made as to whether the subject moved the device smoothly when moving the device as discussed above. For example, as discussed elsewhere herein, a smoothness tracking service may be utilized to detect if the subject is smoothly moving a camera equipped device while using the device to capture images of the subject's face (and the eyes in particular) in order to perform certain analysis described herein. In response to detecting that the device is not being smoothly moved (which may result in a degraded and possibly erroneous analysis), at block 612, an audible and/or visual notification may be provided to the subject to move the device more smoothly. Optionally, such analysis may be performed in real time during the image capture process of block 602 and 604, and the notification may be generated while the subject is in the process of moving the device during the image capture process.

At block 608, the subject's face in the images may be located and labeled, optionally in real time. Face detection algorithms may be utilized to locate and isolate the face within the images. This helps narrow down the region of interest for pupil detection. Certain examples of face detection algorithms and techniques (e.g., Haar cascades, Histogram of Oriented Gradients, Viola-Jones framework, and deep learning techniques (e.g., R-CNN, Multi-task Cascaded Convolutional Network, and/or the like) that may be used are described herein. At block 610, the eyes in the located face may be identified and their movement (the movement of the pupil in each eye) from frame-to-frame and/or gaze may be determined. For example, the region around the eyes may be extracted using the information obtained from face detection. This block may focus the analysis on the eyes, reducing computational complexity and computer resource utilization.

For example as similarly discussed elsewhere herein, facial landmark detection may be utilized to identify certain landmarks on the face, such as the corner of eyes. Optionally, an R-CNN may be utilized to detect eyes in the image. The movement of the identified eyes may be tracked over time by analyzing the positions of the detected facial landmarks corresponding to the eyes in consecutive frames. Optionally, optical flow techniques (e.g., differential techniques) can be employed to estimate the motion (direction and speed) of pixels between frames, allowing the tracking of eye movements.

By way of example, differential methods (e.g., the Lucas-Kanade method) may be used to compute optical flow by analyzing intensity gradients in the images. In addition or instead, correlation-based methods may be utilized that identify the best matching region in the next frame for each pixel in the current frame. In addition or instead, deep learning, convolutional neural networks (CNNs) may be utilized to directly learn optical flow from image sequences.

Optionally, the pupils may be detected and tracked in order to determine their position and orientation for the various analyses described below. The images may be preprocessed to enhance the subsequent analysis (e.g., to track the movement of the pupil and hence the eye). The preprocessing may include adjusting image luminescence/brightness (e.g., by adding or subtracting a constant value for some or all pixels in the image), contrast (e.g., using histogram equalization), and/or sharpness (e.g., using a high-pass filter), optionally utilizing techniques described herein. Optionally, image noise may be filtered out using a low pass filter.

A pupil detection algorithm may then be used to identify and locate the pupil within each eye. One or more computer vision techniques, such as edge detection (e.g., to identify boundaries in a given image), image thresholding (e.g., to convert the grayscale image into a binary image, where pixels belonging to the pupil are set to one value and the background to another value), and contour analysis (e.g., to identify and analyze the contours, or boundaries, of objects in an image, and to identify and locate the pupil) as discussed elsewhere herein. The movement and orientation of the pupil, and hence the eye may then be tracked.

Optionally, as similarly discussed elsewhere herein, contour analysis may be utilized to identify and analyze the contours, or boundaries, of objects in an image, and so may be used to locate and extract the boundary of the pupil. For example, the contours in the binary image may be obtained after thresholding. The contours corresponding to the pupil may be identified based on characteristics such as size, circularity, or area. The contour that best represents the pupil is identified and the corresponding coordinates or region are extracted.

Optionally, gaze estimation models may be utilized to predict the direction in which the subject is looking. A gaze estimation model may take into account the position of the eyes (e.g., the pupils), head orientation, and/or other factors. Deep learning-based models, such as CNNs and/or recurrent neural networks (RNNs), may be trained for and used for gaze determination.

At block 612, the subject's eye positions and/or gaze in the captured images may optionally be determined using one or more of the foregoing techniques. At block 614, a determination may optionally be made as to whether the subject is suffering from nystagmus and/or an inability to perform smooth pursuit. For example, the application may detect eye jerking over two or more images, measure the distance of pupil movement during eye jerking, and measure how long (e.g., how many seconds) the jerking persisted. The process may determine via an analysis of the position, movement, and/or orientation data of the subject's eyes (e.g., via detection of the pupil position and movement) whether the subject exhibits a failure to execute smooth pursuit of the device by the subject's eyes, distinct nystagmus at maximum deviation, and/or onset of nystagmus prior to 45 degrees.

When a person is under the influence of an intoxicating substance, the eye jerking will have greater perturbations, and may be sustained for relatively longer periods of time (e.g., greater than four seconds), than when sober. The process may detect the eye jerking, measure the distance of pupil movement during eye jerking, and measure how long (e.g., how many seconds) the jerking persisted.

Optionally, each foregoing determination regarding smooth pursuit of the mobile device by the subject's eyes, distinct nystagmus at maximum deviation, and/or onset of nystagmus prior to 45 degrees, may be weighted differently and used to generate a score (e.g., a nystagmus score) indicative of the likelihood that the subject is (or is not) under the influence of an intoxicating substance such that the subject is considered unable to provide a legitimate, valid consent to certain activities, such as sex. Optionally, a determination may be made as to whether the nystagmus score exceeds a predefined threshold, and if so, a determination may be made that the subject is likely under the influence of an intoxicating substance such that the subject is considered unable to provide a legitimate consent to certain activities.

Optionally, at block 616, a determination may optionally be made as to the size of the subject's pupil. As similarly discussed elsewhere herein, computer vision may be utilized to detect pupil size, optionally in real time. A subject may be instructed (e.g., via audible and/or text instructions) to view a front facing camera on the subject's mobile device. Optionally, an image may be displayed by the application via the device display that the subject is instructed to focus on. Still and/or video images of the subject's eyes may be captured by one or more of the device's cameras (e.g., an RGB camera and/or an infrared camera, or a combination of different sensors).

As similarly discussed elsewhere, the images may be preprocessed to enhance the subsequent analysis (e.g., to determine the size of the pupil). The preprocessing may include adjusting image brightness/luminescence (e.g., by adding or subtracting a constant value for some or all pixels in the image), contrast (e.g., using histogram equalization), and/or sharpness (e.g., using a high-pass filter), optionally utilizing techniques described herein. Optionally, image noise may be filtered out using a low pass filter.

A pupil detection algorithm may then be used to identify and locate the pupil within each eye. One or more computer vision techniques, such as edge detection (e.g., to identify boundaries in a given image), image thresholding (e.g., to convert the grayscale image into a binary image, where pixels belonging to the pupil are set to one value and the background to another value), and contour analysis (e.g., to identify and analyze the contours, or boundaries, of objects in an image, and to identify and locate the pupil) as discussed elsewhere herein. Pupil size measurement may then be performed on the identified pupil. The diameter, radius, or area of each pupil in the image may be determined. For example, the number of pixels in a line defining the diameter or radius of the pupil may be counted, and the pixel measurements may be converted to a distance using a standard of measurement.

At block 618, an analysis may optionally be performed using the pupil size determination of block 616. As discussed elsewhere herein, consumption of alcohol, opioid, and other drugs may affect the pupil size and diameter of the pupil. Alcohol enhances the parasympathetic nervous system's activity, increasing the release of acetylcholine and subsequent miosis (pupillary constriction). As the alcohol is metabolized in the body and alcohol's depressant effects on the nervous system occur, the pupils may dilate (referred to as mydriasis). Opioids cause miosis (pupillary constriction). The constriction occurs because opioids act on the brainstem, resulting in a decrease in the release of neurotransmitters that regulate pupil size. The determined diameter or size of the pupil may be compared against a threshold upper diameter limit (wherein above that limit it is likely that the subject is experiencing alcohol intoxication) and/or a threshold lower diameter limit (wherein below that limit it is likely the subject is experiencing opioid intoxication). Optionally, the threshold(s) may be based on a baseline pupil diameter or size previously determined from images taken when it is known or represented that the subject was not under the influence of an intoxicating substance. Thus, if a determination is made that the pupil diameter or size is larger than or otherwise satisfies the upper level threshold, a determination may be made that it is likely the user is experiencing alcohol intoxication. If a determination is made that the pupil diameter or size is smaller than or otherwise satisfies the lower level threshold, a determination may be made that it is likely the user is experiencing opioid or the initial stages of alcohol intoxication. A score may be generated indicating the likelihood of intoxication based on the determined pupil size. Optionally, two scores may be generated, one score that indicates the likelihood of alcohol intoxication, and one score that indicates the likelihood of drug intoxication.

At block 620, a blink test may optionally be performed. The subject may be instructed (audibly and/or textually) to look at the camera for a specified period of time (e.g., 10 seconds, 20 seconds, 30 seconds, 1 minute), and images (e.g., still and/or video images) of the subject's face may be captured by the device's camera. The face and eyes may be located as similarly discussed elsewhere herein. A blink detection algorithm may be utilized that analyzes the changes in the appearance of the eyes over time, such as that caused by blinking. This information may be utilized to determine a blink rate.

A determination may be made that the subject is under the influence of a substance such that the subject is incapable of providing a valid consent to certain acts (e.g., sexual activities) when the blink rate falls below a specified threshold. For example, the Eye Aspect Ratio (EAR) may be calculated based on the positions of certain landmarks on the eyes. A significant decrease in EAR (e.g., a decrease above a predefined threshold) indicates a blink. By way of further example, eye closure detection may be performed to detect a blink. Changes in pixel intensities over time may be tracked to determine a blink (e.g., where the change from relatively higher intensity to relatively lower intensity that is greater than a specified threshold within a threshold period of time may indicate a blink). The blink detection determinations may be monitored over time to calculate the blink rate.

At block 622, a determination may be as to whether the blink rate is below a specified threshold, a determination may be made that the user is likely intoxicated. The threshold may be set based on the chosen blink detection algorithm, image lighting conditions, the subject's weight and/or height, and/or other factors.

At block 624, a voice recording of the subject may optionally be received. The voice recording may be received in a video recording of the subject reading a script as similarly described above with respect to FIG. 3B. At block 626, the voice recording may optionally be analyzed to determine if it is from the purported subject and a determination may be made as to whether the user is intoxicated and the degree of intoxication. For example, as similarly discussed elsewhere herein, a given recording of a purported subject may be compared to an enrollment voice recording of the subject to determine if they match. For example, as similarly discussed elsewhere herein, a digital voiceprint generated from the received voice recording may be compared to a voiceprint generated from an enrollment recording. If they do not match, an exception action may be triggered. The exception action may include generating a notification and transmitting the notification to a subject, another user, and/or an administrator, and generating a consent process failure indication that may be stored in memory.

Optionally, a waveform of glottal pulses estimated from speech may be generated by applying Iterative Adaptive Inverse Filtering (IAIF) to the voice recording. Using the waveform, certain glottal excitations may be detected that indicate evidence of alcohol intoxication over a certain threshold. By way of further example, the voice analysis service may extract low-level acoustic features (e.g. Mel-frequency cepstrum) from the voice recording, and n-way direct classification or regression using maximum margin classifiers may be applied to determine a state of intoxication. By way of further example, speed, pitch, tone and emphasis on certain syllables may be detected and may then be compared to known features that present emotions, depression or alcohol intoxication. Optionally, machine learning algorithms such as HMM (Hidden Markov Model), GMM (Gaussian Mixture Model), SVM (Support Vector Machines), or k-NN (k-nearest neighbors algorithm) and deep learning models such as CNN (Convolutional Neural Network) and RNN (Recurrent Neural Network) may be utilized in performing voice analysis. Some or all of the foregoing techniques may be utilized to determine a likelihood that the subject is intoxicated.

At block 628, based on the nystagmus analysis, the smooth tracking analysis, the pupil size/diameter analysis, the blinking analysis, and/or the voice analysis, (where the foregoing analysis may indicate a state and/or degree of alcohol and/or pharmaceutical/opioid intoxication) a determination may be made as to whether the subject has the intellectual capacity to provide consent. For example, the formula discussed elsewhere herein a reproduced below may be utilized in determining whether the subject is capable of providing a valid consent.

For example, an example, optional intoxication formula used to calculate the likelihood that the subject is unable to provide informed, legal consent is as follows:

$$\text{Likelihood subject is intoxicated (LSI)}=1/N(W_1D_1+W_2D_2+W_3D_3+W_4D_4\ldots W_nD_n)$$

where:

N=Normalization factor

W=Weight $D_1$=intoxication determination based on voice analysis $D_2$=intoxication determination based on eye motion analysis (e.g., horizontal nystagmus, smooth tracking)

$D_3$=intoxication determination based on pupil size/diameter analysis $D_4$=intoxication determination based on eye blink rate analysis $D_n$=intoxication determination based on other determinations (e.g., smoothness of movement of the subject's device during testing, ability to focus gaze on the subject's device during testing, and/or other determinations)

Wherein

Subject is unable to provide consent when LSI>Threshold

If a determination is made that the subject lacks sufficient intellectual capacity to provide a valid consent, the process may proceed to block 630. An indication that the subject provided an invalid consent may be stored in a record of the subject. In addition, the consent failure indication may be stored in a record associated with a second subject (e.g., a potential sexual partner whose consent is also being analyzed for validity). Optionally, a notification of the consent failure may be transmitted to and presented by the subject's device and a device of the second subject.

If a determination is made that the subject has sufficient intellectual capacity to provide a valid consent, the process may proceed to block 632. A verification that the subject provided a valid consent may be stored in a record of the subject. In addition, the consent may be stored in a record associated with a second subject (e.g., a potential sexual partner whose consent is also being analyzed for validity). Optionally, a notification of the successful consent verification may be transmitted to and presented by the subject's device and a device of the second subject.

As discussed herein, an aspect of the present disclosure relates to a computer-implemented system and method for determining whether an individual is too intoxicated to provide valid consent to acts of sexual intimacy or is not too intoxicated to provide valid consent to sexual intimacy. As similarly discussed above, intoxication induces measurable physiological and behavioral alterations, such as changes in pupil dilation, variations in blink rate, eyelid drooping (ptosis), fluctuations in the visible scleral area, unstable gaze, and irregular eye movement patterns, and/or the like which can be quantified through feature extraction and analysis of video of a subject's eyes and surrounding area.

Certain techniques are described herein to detect and measure various physiological and behavioral aspects of a subject, where such techniques may be used in combination or in the alternative. Thus, for example, several different techniques are described that may be used for spatial features and for temporal features. One or more of such techniques may be utilized by the described systems and processes.

The disclosed system may analyze visual data and identify distinctive patterns through computational and pattern recognition techniques. Optionally, as similarly discussed elsewhere herein, in order to enhance such a determination, the disclosed system utilizes AI algorithms, such as convolutional neural networks (CNNs) or statistical inference models (or both CNNs and statistical models in a hybrid configuration), to analyze visual data of the individual's eyes and classify the individual's consent capacity based on detected intoxication indicators. Thus, the disclosed system can classify a given individual as being too intoxicated to grant valid consent to sexual acts or not too intoxicated to grant valid consent.

As discussed herein, photographs and/or video recordings of the individual's eyes may be captured using a standalone digital camera, camera-equipped smartphone, or other imaging device. The application hosted on the user device may include visual and/or textual guidance for optimal lighting, camera positioning, and framing to ensure consistent data quality.

Prior to performing analysis, a preprocessing module may optionally perform normalization of images or video frames, including resizing, cropping, color correction, and/or noise reduction. The normalization process may initially perform resizing, where a given image or frame is adjusted to a predetermined resolution. Advantageously, this ensures compatibility with machine learning models or feature extraction algorithms (such as those disclosed herein), which may need or perform better with images of fixed dimensions. The resizing operation may use interpolation methods such as bilinear, bicubic, or nearest-neighbor interpolation, and may preserve the original aspect ratio (with padding as needed) or force a fixed size.

Following resizing, cropping is optionally performed to focus the analysis on regions of interest, the eyes in this instance. This may be performed in an automated process using face detection algorithms such as Haar cascades, Histogram of Oriented Gradients (HOG), the Viola-Jones framework, and/or deep learning-based models such as convolutional neural networks (CNNs) described herein. By accurately locating facial landmarks, the module can dynamically crop the image to ensure that the relevant features are centered and occupy the majority of the frame, thereby reducing computational load and improving the accuracy of subsequent analysis.

As discussed above, the normalization process may include color correction. The preprocessing module optionally adjusts brightness and/or luminescence by adding or subtracting a constant value to pixel intensities, which helps correct for underexposed or overexposed images. A determination as to whether an image is overexposed or underexposed may comprise analyzing the distribution of pixel intensity values across the image. If most pixel values are clustered toward the lower end of the intensity scale (darker values, such as those having less than a threshold intensity), the image may be determined to be underexposed, indicating insufficient lighting and/or shadow-dominated regions. Conversely, if the majority are more than a threshold value of pixel values are near the upper end of the scale (brighter values, such as those having greater than a threshold intensity), the image is determined to be likely overexposed, meaning it is too bright and may have lost detail in the highlights. Statistical measures, such as the mean or histogram of pixel intensities, may be calculated and utilized to detect such conditions. Using this analysis, the system can then apply corrective adjustments, such as increasing brightness for underexposed images or reducing it for overexposed ones, to bring the image into a preferred or optimal range for further processing and analysis.

For example, if an image is underexposed (too dark), the normalization module may increase the brightness by adding a constant value to pixel intensities, while overexposed images may have their intensity values reduced.

Similarly, contrast adjustments may be performed that comprise redistributing pixel values (e.g., using histogram equalization) to enhance the distinction between light and dark regions, making features that are useful in determining an intoxication state more distinguishable.

Additionally, image sharpness is optionally improved by applying high-pass filters to the image/frames, which accentuate edges and fine details, which is particularly helpful in performing pupil or landmark detection. The system may also convert images to grayscale or other color spaces (such as HSV or LAB) to facilitate analysis.

For example, converting an image to grayscale or alternative color spaces simplifies the data and enhances the effectiveness of subsequent algorithms applied to the converted images. Grayscale conversion reduces the image to a single intensity channel, eliminating color information that may not be relevant for tasks such as edge detection, contour analysis, or object localization, which are used for pupil and landmark detection. This reduction in complexity not only decreases computational requirements but also enhances that ability of algorithms to focus on certain structural features, such as shapes and textures, without being distracted by color variations. In addition, changes in pixel intensities over time are easier to track in grayscale, and such changes may be used to detect blinks and calculate blink rates, which are indicators of intoxication or impairment as discussed elsewhere herein.

Additionally, converting an image color space to other color spaces (e.g., HSV or LAB) separates luminance from chromatic information, making it easier to isolate features based on brightness or color contrast. Thus, such preprocessing improves the reliability and accuracy of feature extraction in facial landmark detection, pupil detection, and/or blink rate analysis, which enhances image analysis for determining a subject's intoxication state.

As indicated above, the normalization process may optionally include noise reduction. The module may employ low-pass filters, such as Gaussian blurring, to reduce high-frequency noise while preserving useful structures. In addition or instead, median filtering may be utilized to reduce noise, replacing a given pixel's value with the median of its neighbors to effectively remove "salt-and-pepper" noise. For video frames, temporal smoothing may optionally be applied by averaging pixel values across consecutive frames, reducing temporal noise. Optionally, denoising algorithms such as Non-Local Means and/or deep learning-based denoisers may be used to further enhance image quality.

Non-Local Means (NLM) and deep learning-based denoisers offer significant technical benefits for image denoising with respect to facial recognition or biometric analysis. NLM denoising averages similar patches across the entire image, rather than just neighboring pixels, which enables it to preserve fine details and textures while effectively reducing noise. NLM denoising is particularly useful for maintaining significant structural features that are needed for accurate sobriety analysis (e.g., pupil detection, facial feature detection, and/or the like). Deep learning-based denoisers may utilize neural networks trained on large datasets to learn complex noise patterns and distinguish them from true image content and then may perform noise reduction and detail preservation on frame images.

Such preprocessing techniques (e.g., resizing, cropping, color correction, and/or noise reduction) ensure that images and video frames are consistently formatted and of high quality, enabling reliable biometric analysis and feature extraction for the determination of a subject's ability to grant valid consent to sexual acts.

As explained in detail herein, features extraction may optionally comprise the extraction of low-level features, mid-level (spatio-temporal) features, and high-level (deep learning) features.

For example, low-level features may be extracted directly from pixel data, capturing motion, texture, or appearance information. Color histograms (e.g., RGB, HSV, and/or LAB histograms) may be utilized to describe object color distribution in a given frame. Histogram of Oriented Gradients (HOG) may be utilized to encode local shape and texture. Local Binary Patterns may be utilized to capture local texture information.

SURF(Speeded-Up Robust Features) may optionally be utilized to extract invariant local keypoint features from images and video frames. SURF is a computer vision algorithm configured to detect and describe distinctive local features in images. SURF works by quickly identifying keypoints (important, repeatable locations in an image) using a fast approximation of the Hessian matrix, and then constructing descriptors for these keypoints based on the distribution of intensity changes in their neighborhoods. Advantageously, SURF achieves high speed by utilizing integral images and box filters, making it much faster than less efficient techniques such as SIFT (Scale-Invariant Feature Transform), while still being able to handle changes in scale, rotation, and lighting or viewpoint.

SURF may be utilized for identifying and tracking distinctive regions of interest, such as the eyes or pupils, across varying lighting conditions and camera perspectives. By rapidly and reliably detecting these keypoints, SURF enables the system to measure features such as pupil dilation, blink rate, and/or gaze stability, which enable determining a user's capacity to provide informed consent as described herein.

For example, the pupil, being a dark, circular region surrounded by lighter iris and sclera, often produces distinctive keypoints at its boundary due to the sharp contrast. For a given detected keypoint, SURF computes a descriptor that encodes the local intensity pattern. Keypoints around the pupil will have descriptors characteristic of circular, dark regions. The set of keypoints may be filtered to retain those within the expected anatomical location of the pupil (e.g., using prior knowledge or facial landmark detection). Keypoints with descriptors matching the expected pattern of a pupil (dark, circular blob) are selected. The coordinates of the selected keypoints are used to fit a geometric shape (such as a circle or ellipse) to precisely localize the pupil's center and boundary.

Optical flow may be utilized to analyze the motion of pixels between frames in images or video sequences (e.g., in sequential frames), particularly those capturing the user's eyes and facial region. By estimating the direction and speed of pixel movement, optical flow enables the system to track eye movements which enables the detection of physiological indicators such as nystagmus, smooth pursuit, and gaze stability. The system may employ differential methods such as the Lucas-Kanade algorithm, correlation-based methods, and/or deep learning models such as convolutional neural networks (CNNs) to compute optical flow and extract motion features. By integrating optical flow data with other biometric signals disclosed herein, such as pupil size and blink rate, the system may evaluate the user's state and enhance the reliability of the consent assessment process.

Motion boundary histograms may be used to describe object motion boundaries within video sequences, such as those capturing the user's eyes and facial region. By analyzing the gradients of optical flow, motion boundary histograms may characterize the boundaries and transitions of movement, such as the rapid or involuntary motions of the eyes that may indicate nystagmus or other physiological signs of intoxication. These histograms may be used to distinguish between smooth, intentional eye movements and abrupt, irregular ones, which are useful in assessing a user's capacity to provide informed consent. Optionally, motion boundary histograms may be integrated with other motion and appearance features (e.g., derived from SURF, optical flow, and/or trajectory analysis), behavioral and physiological indicators to be evaluated. This enhances the reliability of consent assessment by providing an accurate understanding of eye movement patterns and their boundaries, even in dynamic or less controlled environments.

Trajectory analysis may be utilized in enhancing the reliability and accuracy of consent assessment. By tracking keypoints and/or bounding boxes, such as those corresponding to the eyes or pupils, across sequences of images or video frames, trajectory analysis enables the system to monitor the movement patterns of these features over time. This temporal tracking may be used for detecting physiological and behavioral indicators such as smooth pursuit, saccades, and nystagmus, which are associated with intoxication or impairment. Dense trajectory sampling may be utilized to permit the system to capture subtle changes in motion, enabling the system to distinguish between normal, intentional eye movements and those that are erratic and/or involuntary. By integrating trajectory features with other motion and appearance cues, the application can reliably evaluate a user's state, supporting the determination of whether or not the individual has the capacity to provide informed, valid consent. This approach ensures that the system can operate effectively even for recordings of a subject's face even in dynamic or less controlled environments that would pose challenges to conventional image analysis techniques.

With respect to extracting mid-level (spatio-temporal) features, spatial and temporal cues may be utilized to represent both object appearance and its motion. For example, a variety of spatio-temporal feature extraction techniques may be utilized to analyze video data of a user's eyes and facial region, enabling reliable consent assessment. 3D HOG (3D Histogram of Oriented Gradients) may optionally be utilized to capture gradient features across both spatial and temporal dimensions, enabling the system to detect subtle changes in appearance and motion that may indicate physiological states such as intoxication. The 3D HOG may optionally be utilized to provide a distribution of motion orientations enabling the direction and magnitude of eye movements to be determined, which may be utilized in identifying involuntary motions like nystagmus.

Space-Time Interest Points may optionally be used to identify key moments where significant motion changes occur, such as rapid blinks or saccades, offering precise markers for behavioral analysis. MoSIFT, which combines SIFT (Scale-Invariant Feature Transform) with motion (e.g., optical flow) features, may optionally be utilized to track and describe local patterns of movement and appearance (e.g., with respect to eye movement), even under varying lighting or camera conditions. Volume patches may optionally be utilized to extract features from three-dimensional regions in a video recording, providing a view of both spatial structure (the appearance and features within a given frame) and temporal dynamics (how those features change over time across multiple frames) within the eye region. Together, these techniques enable the system to accurately monitor and interpret complex eye and facial behaviors (e.g., blinks, gaze stability, nystagmus, and/or the like), supporting the determination of a user's capacity to provide informed, valid consent, optionally in real time. Advantageously, this approach enables the system to interpret not just static features, but also dynamic events and patterns that occur during the consent verification process, improving the accuracy and reliability of biometric analysis.

With respect to high-level feature extraction techniques, certain techniques may utilize deep learning models, such as those comprising neural networks. Such high-level feature extraction techniques may capture object appearance, motion, and/or contextual information from visual data streams.

CNN-based spatial feature extraction may optionally be utilized to extract per-frame appearance characteristics from input images or video frames. Convolutional Neural Networks (CNNs), configured to learn hierarchical representations of visual data, may optionally be utilized by the system to identify subtle patterns and features in a given frame, such as facial landmarks, eye regions, or other biometric cues relevant to intoxication assessment. A CNN comprises multiple layers of convolutional filters that progressively extract features from input images. The initial layers may capture low-level features such as edges, textures, and simple shapes. As data flows deeper into the network, subsequent layers combine these basic elements to recognize more complex patterns, such as corners, contours, and object parts. Still deeper layers may synthesize these intermediate representations to identify high-level concepts, such as faces, eyes, or other biometric features relevant to intoxication determinations. This hierarchical approach enables CNNs to learn increasingly abstract and meaningful representations at respective stages, enabling reliable recognition even in poor lighting conditions. The ability to automatically discover and organize features enables the appropriately trained CNN to perform facial landmark detection, pupil measurement, and blink rate analysis. By processing video frames independently, CNNs provide a detailed spatial understanding of the subject's appearance.

Region-based CNNs may optionally be utilized to focus on object-level spatial features within a given frame. Region-based CNNs may be trained to detect and analyze specific regions of interest (e.g., the eyes, mouth, and/or other facial features), enabling more precise localization and measurement of biometric indicators. This object-centric analysis is particularly advantageous for tasks such as pupil detection, blink rate estimation, and gaze tracking, which are useful in determining a user's capacity to provide informed consent as discussed herein.

In addition to, or instead of static analysis, the system optionally performs spatio-temporal deep feature detection to capture dynamic behaviors and temporal dependencies. Optionally, 3D CNNs may optionally be utilized to learn both motion and appearance (e.g., from short video clips) by applying three-dimensional convolutions across spatial and temporal dimensions. This enables the system to recognize patterns that occur over time, such as eye movements, blinks, and/or changes in facial expression, which may be utilized to determine intoxication levels or cognitive states.

Two-stream networks are optionally utilized to further enhance motion analysis by combining the outputs of two separate CNNs. A first CNN may process RGB frames to capture appearance, while the other CNN may process optical flow to capture motion. By integrating these two streams, the system can more reliably distinguish between voluntary and involuntary movements, such as smooth eye pursuit versus nystagmus, which further enables the determination of sobriety and consent capacity of a subject.

To model longer-term temporal dependencies, the system optionally employs CNN+LSTM architectures. Using this architecture, frame-level features extracted by a CNN are fed into a Long Short-Term Memory (LSTM) network, comprising a recurrent neural network (RNN) configured to capture sequential patterns and dependencies over time. This approach is particularly advantageous for detecting micro-events such as blinks, brief eyelid drooping, and/or subtle changes in pupil size, as the LSTM maintains context across multiple frames.

Transformer-based architectures are optionally used to advantageously capture long-range temporal dependencies and complex relationships within the data. Transformers utilize attention mechanisms to weigh the importance of different frames or features, enabling the system to identify meaningful patterns that may span hundreds of milliseconds to several seconds. This is especially advantageous for analyzing gaze stability, eye-movement patterns, and/or other temporal phenomena that are indicative of a user's cognitive and physiological state.

As similarly discussed above, feature extraction may be performed (e.g., using a feature extraction module) to extract physiological and behavioral features from the eye region, such as pupil dilation, blink rate, eyelid drooping, gaze stability, and eye movement patterns.

Thus as described herein, to extract physiological and behavioral features of a subject from the peri-ocular region, the normalization and region of interest (ROI) preparation process described above may be performed. For example, the frames may be resized to a fixed resolution, and cropping to the face/eyes, adjusting brightness, contrast, and sharpness, and application of noise reduction may be performed so that downstream feature detectors receive clean, consistently formatted inputs. This standardization improves reliability and reduces computational load for vision models used later in the pipeline.

The face is then located and the eye region isolated, optionally using computer vision detectors (e.g., Haar cascades, HOG, Viola-Jones) and/or CNN-based face/landmark models, thereby focusing computation on the peri-ocular area where pupils and eyelids are measured. Within this ROI, optionally a hybrid computer vision and CNN stage localizes the pupils; and performs edge detection, thresholding, and contour analysis to recover the pupil boundary, and the diameter is computed in pixels and mapped to physical units using the crop's scale factor, enabling pupil dilation estimation across different lighting conditions.

Because many eye features are temporal, as discussed above, the system may optionally batch frame sequences and feed them to sequence models (e.g., a long short-term memory (LSTM) recurrent neural network (RNN), a transformer encoder, or the like) while augmenting with optical-flow to capture motion cues. Gaze direction may optionally be regressed from eye pose/head orientation learned by the network and/or gaze-estimation models. Blinks may optionally be detected by landmark-derived signals (e.g., Eye Aspect Ratio) as described herein and/or directly via sequence classification, and blink events may be aggregated to compute a blink rate for a subject.

For example, after normalization and region-of-interest (ROI) preparation, optionally a given frame may be converted into compact feature vectors, such as learned embeddings from a CNN backbone focused on the eye crops, CV features (e.g., Eye Aspect Ratio, pupil diameter in pixels, eyelid geometry), and/or motion features from optical flow. These per-frame feature vectors form a temporal sequence that may be fed into an LSTM stack or a Transformer encoder; wherein both architectures model time-dependent behavior across windows of frames so that the system can reason about temporal phenomena such as blinks, smooth pursuit, saccades (rapid movement of the eye between fixation points), and/or nystagmus.

LSTMs (optionally stacked and optionally bidirectional) are optionally used to ingest the sequence $[x_1, \ldots, x_T]$ of per-frame embeddings and propagate hidden/cell states that capture temporal context (wherein gating mitigates vanishing/exploding gradients). This makes LSTMs effective for micro-events with short durations and characteristic dynamics, such as the determination of blink onsets/offsets, brief eyelid drooping, and/or small pupil changes, because the hidden state maintains short-term memory without requiring long receptive fields. Optical-flow features (e.g., dense or sparse flow magnitudes around the pupils/eyelids) may be concatenated to the per-frame input so the LSTM can learn motion cues tied to eye dynamics. Blinks can be detected by thresholding landmark-derived signals (e.g., the eye aspect ratio) and/or by a sequence classifier head on the LSTM output; blink events are then aggregated to estimate blink rate (blinks per minute) in sliding windows. For pupil dilation, an LSTM regression head may optionally be utilized to predict a smoothed diameter trajectory (in pixels or units of measure, such as millimeters, after scale conversion), filtering frame-level noise while preserving trend changes. Another regression head may be utilized to estimate a droop score from eyelid landmarks, enabling continuous monitoring of eyelid position over time.

As noted above, a transformer encoder may optionally be utilized to perform such feature detection. The transformer encoder operates on the same per-frame feature sequence augmented with positional encodings (e.g., vectors of the same dimension as the feature vector) to preserve temporal order. Multi-head self-attention enables the model to discover long-range dependencies (e.g., periodic jerk patterns that characterize nystagmus, or sustained intervals of smooth pursuit) and to weigh frames that are most predictive for stability indices (where attention can focus near maximum deviation or early onset angles). This is advantageous for gaze stability and eye-movement patterns, where meaningful signatures may span hundreds of milliseconds to seconds.

The transformer's attention may also integrate information from heterogeneous features (e.g., pupil diameter, eyelid geometry, eye aspect ratio (EAR), optical-flow vectors, and/or the like) and may be combined with learned gaze-estimation heads that regress gaze vectors from eye pose and head orientation, complementing gaze models. Architecturally, a shared convolutional/transformer backbone feeds task-specific heads: classification heads (e.g., blink/no-blink, stable/unstable gaze) and regression heads (e.g., pupil diameter, gaze vector, droop score), yielding per-feature probabilities and continuous values for downstream decisions.

As similarly discussed elsewhere herein, LSTM and transformers may be trained on labeled sequences with data augmentation performed frame-wise across images and frame sequence-wise temporal dimensions (e.g., cropping, resizing/rescaling, flipping, rotation, color jittering, noise injection, random erasing, and/or synthetic data generation, frame dropping/sampling, temporal cropping/trimming, frame rate jittering, looping/temporal padding, and/or the like) to simulate real-world acquisition variability and to improve reliability. Classification performance of the models may be monitored and measured with accuracy, precision/recall, AUC, F1, and/or log-loss, with multi-task losses balanced (e.g., cross-entropy for classification heads and L1/L2 for regression heads) as discussed in greater detail below.

Precision measures the proportion of true positive predictions among the positive predictions made by the model (e.g., of all the times the model said 'positive,' how often was the model correct). Recall (sometimes referred to as sensitivity) measures the proportion of true positive predictions among all actual positive cases (e.g., of all the actual positives, how many did the model correctly identify).

F1 is the harmonic mean of precision and recall, providing a metric that balances precision and recall. It is especially useful when the data is imbalanced, as it penalizes extreme values in either precision or recall.

AUC (Area Under the Curve) corresponds to the ROC (Receiver Operating Characteristic) curve. It quantifies the model's ability to distinguish between classes across possible thresholds; where a higher AUC indicates better overall classification performance.

Log loss (or logarithmic loss) measures the uncertainty of the model's predictions by penalizing confident but incorrect predictions more heavily and provides a continuous metric for how well the predicted probabilities match the actual outcomes.

At run time, a sliding window of frames (e.g., 1-5 seconds) may optionally be streamed through the sequence model; the outputs may be aggregated into rates (e.g., blink rate), stability indices (e.g., smooth pursuit vs. saccade/nystagmus), and/or continuous trajectories (e.g., pupil diameter, droop score). These may be used in combination in a decision layer to produce probabilities or risk assessments for the targeted eye-region conditions discussed herein and thus may be used in determining whether a subject is capable of giving valid consent to sexual acts.

The images (e.g., video images) captured for the training set of images may optionally be captured using substantially the same recording characteristics for each recording. For example, optionally images may be captured using controlled lighting and camera distance, and where the camera is front-facing (positioned at the eye-level of the subject) with consistent framing of both eyes, so that each subject's image is captured with the same framing and using the same lighting and distance from the camera. Images may optionally be captured with the same resolution (e.g., 1080p (1980×1080 pixels)), with a frame rate of 60 FPS (frames per second), where a given video recording is of a duration between 50 and 60 seconds. Other resolutions, frame rates and recording durations may be utilized. Optionally, the videos may be stored in a common, high quality format, such as MP4, AVI, or MOV, with H.264 or HEVC compression to reduce file sizes and hence reduce computer memory utilization without losing image details used to perform the analysis described herein.

As similarly discussed elsewhere herein, in order to have a diverse population in the training dataset, optionally, at least 100, 500, or 1000 subjects are recorded across different demographics (e.g., different ages, genders, ethnicities, weights, etc.). Videos of a given subject may optionally be recorded before and after intoxication, at different intoxication levels and/or at different times of day. A calibrated sensor, such as a calibrated breathalyzer, may be utilized to measure Blood Alcohol Concentration (BAC) at each recording and may be synchronized/linked to the recording using a time/date stamp. Recording of a given subject may be assigned with the same anonymous identifier so that all recordings of the given subject may be linked.

The following is an option example format for storing data, including sober videos, videos of different levels of intoxication, and timestamping for models:

```
/raw_videos
  /person_001
    /sober_video_001.mp4
    /intoxicated_video_001.mp4
    /intoxicated_video_002.mp4
  /person_002
    /sober_video_001.mp4
    /intoxicated_video_001.mp4
    /intoxicated_video_002.mp4
  ...
  /person_N
```

-continued

```
        /sober_video_001.mp4
        /intoxicated_video_001.mp4
        /intoxicated_video_002.mp4
        /processed_data
    /person_001
        /sober_video_features_001.mp4
        /intoxicated_video_features_001.mp4
        /intoxicated_video_features_002.mp4
    /person_002
        /sober_video_features_001.mp4
        /intoxicated_video_features_001.mp4
        /intoxicated_video_features_002.mp4
    ...
    /person_N
        /sober_video_features_001.mp4
/raw_videos
    /person_001
        /sober_video_001.mp4
        /intoxicated_video_001.mp4
        /intoxicated_video_002.mp4
    /person_002
        /sober_video_001.mp4
        /intoxicated_video_001.mp4
        /intoxicated_video_002.mp4
    ...
    /person_N
        /sober_video_001.mp4
        /intoxicated_video_001.mp4
        /intoxicated_video_002.mp4
        /processed_data
    /person_001
        /sober_video_features_001.mp4
        /intoxicated_video_features_001.mp4
        /intoxicated_video_features_002.mp4
    /person_002
        /sober_video_features_001.mp4
        /intoxicated_video_features_001.mp4
        /intoxicated_video_features_002.mp4
    ...
    /person_N
        /sober_video_features_001.mp4
                /intoxicated_video_features_001.mp4
                /intoxicated_video_features_002.mp4
            /train_test_split
                train_{timestamp}.json
                test_{timestamp}.json
                train_test_split_metadata.json
            /model_outputs
                /models
        /train
        model_{timestamp}
        model_metadata_{timestamp}.json
        model_metrics_{timestamp}.json
        logs_{timestamp}.json
        model_{timestamp}
        model_metadata_{timestamp}.json
        model_metrics_{timestamp}.json_logs_[{timestamp}.json
```

While training data may be collected under controlled laboratory conditions, such environments are unlikely to reflect the variability encountered during actual deployment and recordings of real subjects. Therefore, to improve the performance of models disclosed herein, transformations are optionally applied to the original video data to simulate real-world situations, such as variations in lighting, shading, and/or other environmental factors, to ensure the model's reliability in the disclosed applications.

A data augmentation module may be utilized to apply image-based, temporal, and/or spatio-temporal augmentation techniques to expand the training dataset and improve model performance to adequately perform with non-ideal images as similarly discussed above. Data augmentation may comprise performing cropping, resizing/rescaling, flipping, rotation, color jittering, noise injection, random erasing, and/or synthetic data generation (e.g., generated using Generative Adversarial Networks (GANs)), frame dropping/sampling, temporal cropping/trimming, frame rate jittering, looping/temporal padding, and/or the like.

Image-based augmentation may be applied on a frame by frame basis. The following description provides additional technical details on such image-based augmentation with respect to a recording of a subject being used for training purposes.

Cropping may comprise random cropping or center cropping of a given frame, wherein spatial regions of frames are cropped to provide frames that may not be centered.

Resizing/rescaling may comprise changing the resolution or aspect ratio of a given frame to provide frames that have different specifications than those retrieved in the data gathering process.

Flipping may comprise horizontal flipping and/or vertical flipping, wherein frames may be flipped horizontally and/or vertically to ensure maximal generalization of eye shape.

Rotation of a frame may be performed (e.g., by 5 degrees, 10 degrees, 20 degrees, 45 degrees, or other rotation amount) to train the model to be able to adequately perform even when the image is not an ideal frontal picture.

Color jittering may comprise causing random changes to brightness, contrast, saturation, and/or hue in a frame to enhance the model's ability to perform with different environmental lighting factors.

Noise injection may comprise the addition of noise into a frame, such as Gaussian noise, to simulate camera imperfections and instability.

Cutout/random erasing may comprise masking random regions (e.g., random rectangular regions) to provide an image where not the whole eye is visible all the time (e.g., where a portion of the eye is covered by hair or eyelashes).

Temporal augmentation techniques do not modify the frame itself, but rather how the sequence of frames is displayed, that is, the time dimension of a video recording of a subject. The following description provides additional technical details on such temporal augmentation.

Frame dropping/sampling may comprise randomly dropping or skipping frames in a sequence of frames.

Temporal cropping/trimming may comprise selecting and deleting random sub-clips from the full video recording.

Frame rate jittering may comprise altering playback speed by resampling frames.

Looping/temporal padding may comprise repeating frames (e.g., to reach a desired length).

For example, a GAN may optionally be used to synthesize realistic peri-ocular samples (e.g., eye crops and short frame sequences) that augment scarce or imbalanced training data for features like pupil boundaries, eyelid geometry, and/or blink dynamics. A GAN comprises a generator (sometimes referred to as GGG) that maps noise (and optionally conditions such as landmark heatmaps, lighting metadata, gaze angle, and/or subject ID proxies) to synthetic images, and a discriminator (sometimes referred to as DDD) that learns to distinguish real from generated samples. Adversarial training drives the generator to model the true data distribution. Optionally, conditional GANs (cGANs) or Style-based GANs may be guided by control signals (e.g., target pupil diameter bins, eyelid positions, and/or EAR trajectories) to cause the synthetic outputs to cover edge cases (e.g., dilated or constricted pupils, partial occlusions, and/or varied illumination). For temporal augmentation (e.g., blinks, smooth pursuit, and/or the like), video-GAN extensions may be utilized to enforce temporal coherence via 3D convolutions or recurrent generators, ensuring that frame-to-frame changes obey physiologic constraints rather than flicker artifacts.

Optionally, to stabilize training and improve fidelity, WGAN-GP losses, spectral normalization, and/or multi-scale discriminators with patch-wise critics may be utilized that attend to fine structures like pupil rims and eyelid edges. The synthetic set is then balanced against real data to mitigate class skew (e.g., rare droop cases), and filtered with automatic quality gates (e.g., sharpness, contrast, landmark consistency, and/or the like) before entering the pipeline.

Evaluation may be performed using, by way of example, FID/KID for realism, precision-recall in feature space for diversity vs. fidelity, and downstream metrics (AUC, F1, log loss) measured on models trained with GAN data and without GAN data to confirm utility. Thus, GAN-based synthesis may optionally be utilized to enhance coverage of physiologic and behavioral variations the model needs to learn, strengthening generalization for blink detection, pupil measurement, eyelid droop scoring, gaze stability, and/or eye-movement pattern recognition.

A classification module may optionally be configured to implement a binary classification model trained to distinguish between individuals who are intoxicated to the extent they cannot grant informed consent (Class 1) and those who are not so intoxicated (Class 0), based on extracted features. The model may use CNNs, LSTMs, or transformer architectures, and can be trained on labeled datasets with ground truth intoxication levels (e.g., BAC (Blood Alcohol Concentration) measurements).

For example, the system may be configured to utilize training datasets comprising video recordings labeled with ground truth intoxication levels as determined by Blood Alcohol Concentration (BAC) measurements (e.g., determined via a blood test or a calibrated breathalyzer). Peri-ocular video sequences may be captured from subjects at controlled BAC intervals (e.g., baseline, low, moderate, high), with a given sample annotated by numeric BAC values and categorical impairment bins (e.g., sober, impaired, severely impaired). Datasets may further include behavioral and physiological annotations, such as onset of nystagmus prior to 45°, distinct nystagmus at maximum deviation, blink rate (blinks per minute), pupil diameter, eyelid droop score, and/or smoothness of gaze pursuit.

As similarly discussed elsewhere herein, datasets may be constructed to be demographically diverse, spanning age, gender, ethnicity, eye color, device type, and/or lighting conditions, thereby significantly reducing bias and improving generalizability. To address class imbalance and rare physiologic scenarios, program instructions may further cause the system to augment training data using conditional GANs, synthesizing peri-ocular crops and short sequences with controlled pupil size, eyelid geometry, Eye Aspect Ratio (EAR) trajectories, and/or illumination. Synthetic samples may be filtered by quality gates (e.g., sharpness, contrast, landmark consistency) and balanced against real data, with utility confirmed by comparing downstream metrics (accuracy, precision/recall, AUC, F1, and/or log-loss) on models trained with and without GAN augmentation.

Overfitting may optionally be mitigated and reduced through dropout, weight decay, data augmentation, and/or early stopping. In the context of training deep learning models for biometric analysis, overfitting occurs when a model learns patterns specific to the training data, such as noise or irrelevant details, rather than generalizable features. To address this, several regularization and training strategies are optionally utilized. Dropout is a technique where, during a given training iteration, a random subset of neurons in the network is temporarily deactivated, preventing the model from becoming overly reliant on any particular pathway and encouraging the learning of redundant, robust representations. Weight decay penalizes large weights in the model by adding a term to the loss function proportional to the sum of the squared weights, which discourages complex models that might overfit the training data.

As similarly described above, data augmentation systematically increases the diversity of the training set by applying transformations such as cropping, resizing/rescaling, flipping, rotation, color jittering, noise injection, random erasing, and/or synthetic data generation (e.g., generated using Generative Adversarial Networks (GANs), frame dropping/sampling, temporal cropping/trimming, frame rate jittering, looping/temporal padding to images or a sequence of frames, exposing the model to a broader range of scenarios and reducing sensitivity to specific data artifacts. Early stopping monitors the model's performance on a validation set during training and halts the process when performance ceases to improve or to improve materially, thereby preventing the model from continuing to fit the training data at the expense of generalization. Collectively, these techniques ensure that the trained model achieves high reliability and generalizability across diverse operational conditions, enhancing reliable biometric verification and consent capacity assessment.

A decision output module may be configured to output a determination of whether the individual is too intoxicated to provide valid consent to sexual intimacy. The output may be presented as a binary result (0 or 1, unable to provide informed consent or capable of providing informed consent), a probability score, and/or a risk assessment.

In order to enhance privacy and security, optionally visual data (e.g., still images and video images) is stored in encrypted formats with strict access controls so that only authorized personnel may access the visual data in unencrypted form. Data may be anonymized where appropriate, and personally identifiable information may be protected in compliance with applicable privacy regulations (e.g., GDPR, HIPAA).

Optionally, some or all of the foregoing functionality relating to determining whether a user is too intoxicated to grant consent for sexual relations may be deployed as a mobile app, enabling users to self-assess their intoxication level before engaging in sexual activity.

Optionally some or all of the foregoing functionality relating to determining whether a user is too intoxicated to grant consent for sexual relations may be integrated with smart glasses or head-mounted cameras configured to monitor a wearer's eyes for continuous monitoring in social settings.

Optionally some or all of the foregoing functionality relating to determining a person's intoxication level may be used by healthcare professionals, law enforcement, or legal representatives to provide objective evidence of intoxication affecting consent or ability to perform certain functions.

Optionally, the system and process may incorporate additional data sources, such as speech analysis, facial expression recognition, and/or physiological sensors (e.g., heart rate, skin conductance) to improve accuracy in determining intoxication levels and in determining whether a person is too intoxicated to grant consent to sexual activity.

The foregoing techniques for determining whether a person is too intoxicated to grant consent to sexual activity may be utilized with the consent platform described herein, providing automated intoxication screening as part of the consent process.

Figure 8A:
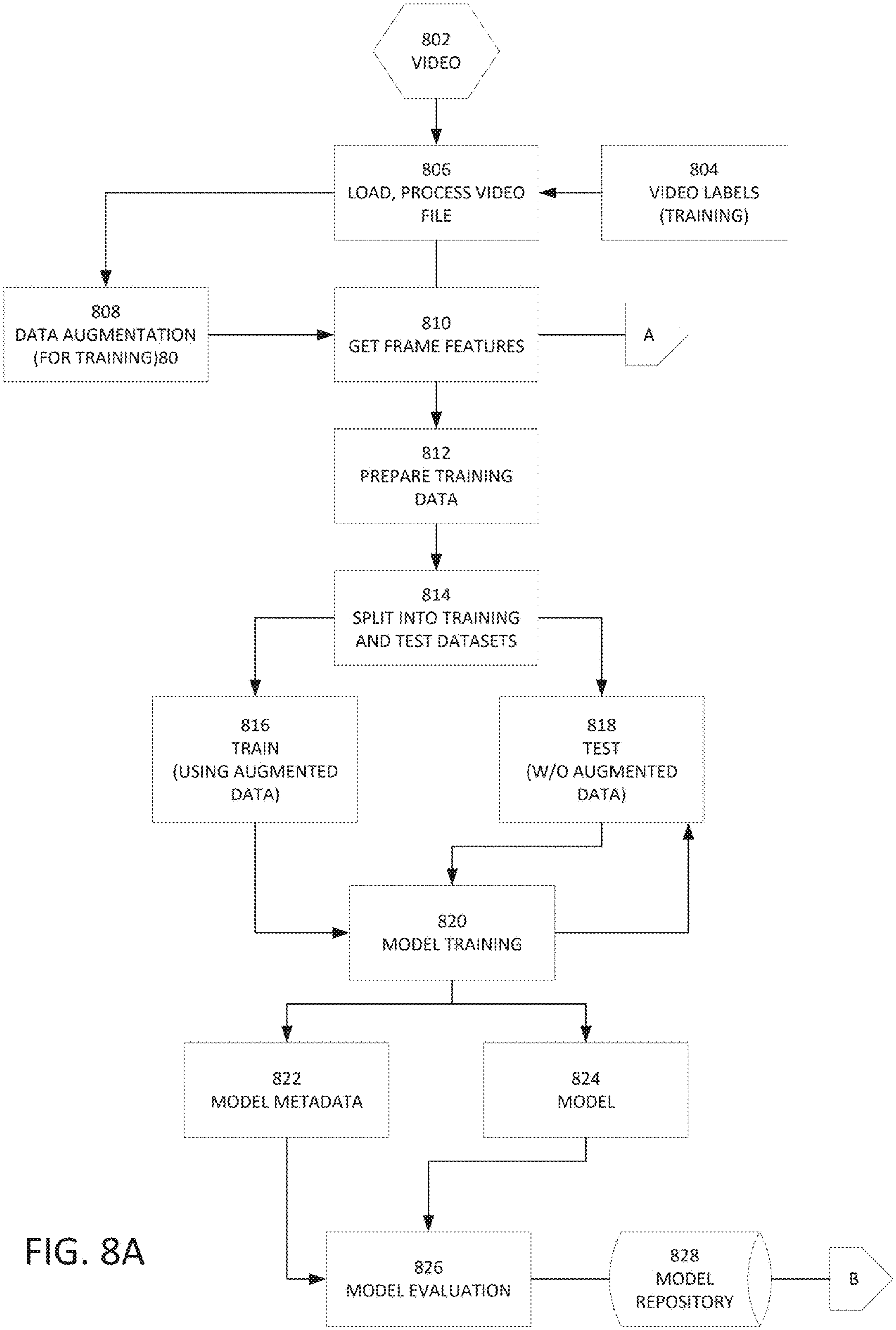
FIGS. 8A, 8B illustrate an example process.
Figure 8B:
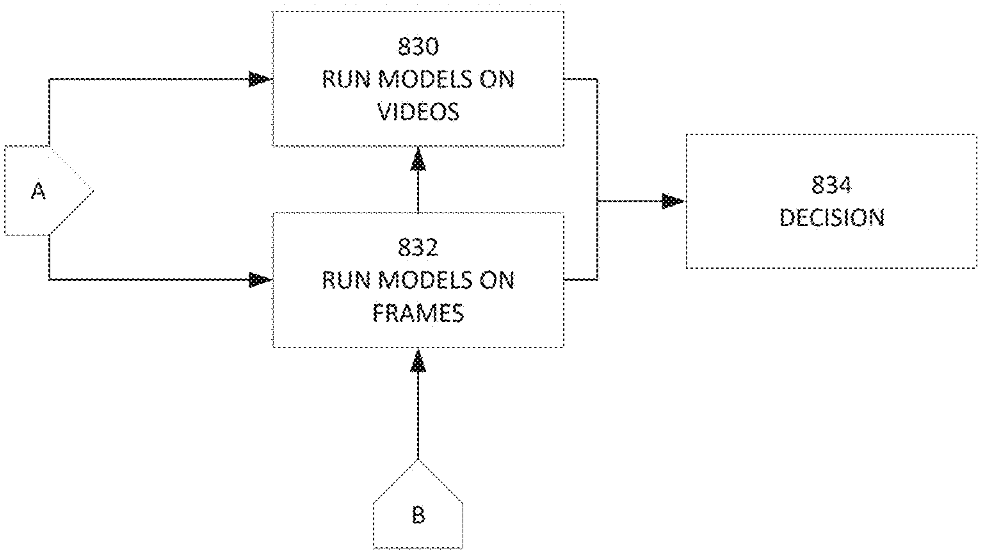

FIGS. 8A and 8B illustrate an example process for training and deploying a biometric model to assess a subject's capacity to provide valid consent (e.g., to sexual activity).

First, the training process will be described, although certain portions of the process are used for both training and for real time determination of the actual subject's ability to provide valid consent. At block 802, a video recording of all or a portion of a subject's face, including the eyes is input. These recordings are optionally collected under controlled conditions, ensuring consistent lighting, camera positioning, and/or framing. A given subject is recorded at multiple intoxication levels, synchronized with ground truth BAC measurements as similarly described above.

At block 804, during training, video labels are accessed to provide ground truth annotations, such as intoxication level (e.g., determined using a device the measures or estimates blood alcohol level, such as a breathalyzer), behavioral and physiological indicators (e.g., nystagmus, blink rate, pupil diameter), time of day, and/or demographic data (e.g., age, sex, weight, race, etc.).

At block 806, the video is loaded and processed, including normalization steps described herein, such as resizing, cropping (e.g., to extract sub-images comprising eye regions), color correction, and/or noise reduction. Conversion to grayscale or alternative color spaces may optionally be performed to facilitate feature extraction as described above.

At block 808, data augmentation is performed. For example, image-based and/or temporal augmentation techniques described above may be applied to simulate real-world variability and enhance model robustness. These augmentation techniques may optionally include cropping, resizing, flipping, rotation, color jittering, noise injection, random erasing, frame dropping, temporal cropping, frame-rate jittering, and/or looping. Conditional GANs may optionally be used to synthesize realistic peri-ocular samples, augmenting scarce or imbalanced training data.

At block 810, feature extraction is performed. For example, as described elsewhere herein, features are extracted from the video frames, such as low-level (e.g., using color histograms, HOG, SURF keypoints, optical flow), mid-level (e.g., using 3D HOG, histograms of optical flow, space-time interest points, MoSIFT), and/or high-level (e.g., using CNN-based spatial features, region-based CNNs, 3D CNNs, two-stream networks, CNN+LSTM stacks, transformer encoders) features. These capture motion, texture, appearance, and dynamic behaviors such as blinks, gaze stability, saccades, and nystagmus.

At block 812, training data preparation is performed. The extracted features and augmented data are prepared for model training, ensuring that the dataset is demographically diverse and balanced.

At block 814, the training data is split into training datasets 816 and test datasets 818, enabling accurate evaluation of model performance.

At block 820, training is performed using augmented data, while testing uses non-augmented data. Deep learning models (CNNs, LSTMs, transformers) are trained to classify and regress physiological and behavioral indicators of intoxication. Overfitting is mitigated through dropout, weight decay, data augmentation, and/or early stopping. At block 826, model performance is evaluated on the trained model 824 and model metadata 822 using metrics such as accuracy, precision, recall, F1 score, AUC, and/or log loss. Evaluated models that satisfy certain evaluation criteria are stored in a model repository for use in performing the foregoing analysis on real subjects in real time.

During a real-time evaluation process of an actual subject, the following process may be performed. At block 802, a video of the subject's face (including the eyes) is received via an application installed on a user device as similarly described elsewhere herein. At block 806, the video is loaded and processed, with frame features extracted as in the training phase. At block 810, frame features are extracted for analysis by the trained models as similarly described above with respect to the training process. The stored models from the model repository 828 are run on the video 830 and individual frames 832 to analyze physiological and behavioral features. For example, the trained biometric models are applied to the incoming video frames and sequences to extract and analyze a comprehensive set of physiological and/or behavioral features for determining the subject's state of intoxication and their capacity to provide valid consent. By way of illustration, the analysis may include some or all of the following techniques, where various detections and measurements are optionally scored.

Eye movement and nystagmus detection, smooth pursuit and saccades, wherein the system tracks the movement of the subject's eyes as they follow a moving target (e.g., the device's illuminated screen). Eye movement and nystagmus detection detects whether the eyes can smoothly pursue the target or exhibit jerky, involuntary movements (saccades), which are indicative of impaired cerebellar function due to intoxication.

Horizontal gaze nystagmus analysis, wherein the system analyzes for rhythmic, involuntary eye movements when the eyes are held at maximum deviation. Sustained nystagmus, especially at angles less than 45 degrees from center, is a strong indicator of intoxication. The distance and duration of eye jerking are measured to generate a nystagmus score. For example, the distance may be determined by measuring the Euclidean distance between the starting and ending coordinates of a detected jerking event, and/or by summing the frame-to-frame displacements during the event to quantify the total path traversed by the eye. The eye jerking duration may be determined by identifying the sequence of frames over which the jerking event persists and converting the frame count to elapsed time using the video's frame rate (e.g., duration=number of frames×frame interval).

Pupil size and pupillary reflex measurements may be performed, wherein using computer vision techniques (e.g., edge detection, thresholding, contour analysis), the system identifies the pupil and measures its diameter in pixels, converting this to physical units. Alcohol and certain drugs affect pupil size. For example, alcohol may cause dilation (mydriasis) or constriction (miosis), while opioids typically cause constriction. The measured diameter is compared to baseline and threshold values to assess intoxication likelihood and to generate a score. The system may perform pupillary reflex measurements by analyzing the speed and extent of pupil constriction in response to changes in screen illumination, as delayed reflexes are associated with intoxication.

Blink detection may be performed, wherein the system monitors changes in the appearance of the eyes over time, using landmark-based signals (such as the Eye Aspect Ratio) and pixel intensity changes to detect blinks. A significant decrease in EAR indicates a blink event. The blink events are aggregated over a time window (e.g., 15-30 seconds) to calculate the blink rate (blinks per minute). Intoxication often leads to a reduced blink rate due to slowed neural responses and impaired motor function. If the blink rate falls below a specified threshold, it may be flagged as a sign of intoxication and accordingly scored.

Eyelid drooping (Ptosis) measurements may be taken and scored, wherein, the system may analyze eyelid position over time, using geometric measurements from facial landmarks to detect ptosis (drooping eyelids), which can be a sign of severe intoxication or neurological impairment. Such detected eye drooping may be flagged and scored.

Gaze stability and direction may be determined, wherein deep learning models (e.g., CNNs, RNNs, transformers, and/or other models) are used to estimate gaze direction and stability. The system checks whether the subject is consistently tracking the user device while being moved or if their gaze is unstable, which may indicate cognitive impairment. Detected impairment may be flagged and scored.

The models output predictions regarding the subject's state of intoxication and ability to provide valid consent. Based on the model outputs, at block 834 a decision module determines whether the subject is capable of providing valid consent to sexual activity. The output may be a binary result (capable/incapable), a probability score, and/or a risk assessment. For example, optionally some or all of the foregoing features (e.g., nystagmus score, pupil diameter, blink rate, droop score, gaze stability, device movement, and/or other features) are scored, the scores may be weighted and combined using a decision module to produce a final assessment of the subject's capacity to provide valid consent. The output may be a binary result, a probability score, and/or a risk assessment, and if incapacity to provide valid consent is detected, notifications are generated as described herein.

Certain aspects will now be further discussed. It is understood that various of the following aspects may be utilized together, and some or all of the elements of the aspects may be combined.

An aspect of the present disclosure relates to a voice authentication process. A code (e.g., a unique code such as described elsewhere herein) is transmitted to a first user electronic address. A determination is made as to whether the code was received from the first user and a second user within a threshold time-period, and if so, the first and second users are enabled to record a consent verification script. Characteristics of the first user recording are compared with those of a first user reference voice recording (e.g., an enrollment voice recording) to determine whether both voice recordings are from the same person and are from the person associated with the relevant account. Characteristics of the second user recording are compared with those of a second user reference voice recording to determine whether they are from the same person. At least partly in response to determining that the first recording and the first user reference voice recording are from the same person and that the second recording and the second user reference voice recording are from the same person a consent verification indication is generated. Optionally, the consent verification indication is transmitted to the first user and/or is stored in memory.

An aspect of the present disclosure relates to verifying a user identifier. Optionally, during a voice authentication process, a code is transmitted to a first user electronic address. A determination is made as to whether the code was received from the first user and a second user within a threshold time period, and if so, the first and second users are enabled to record a consent verification script. Characteristics of the first user recording are compared with those of a first user reference voice recording to determine whether they are from the same person. Characteristics of the second user recording are compared with those of a second user reference voice recording to determine whether they are from the same person. In response to determining that the first recording and the first user reference voice recording are from the same person and that the second recording and the second user reference voice recording are from the same person a consent verification indication is generated.

An aspect of the present disclosure relates to a system configured to process voice recordings and to perform voice authentication, the system comprising: a computer device; a network interface; non-transitory computer readable memory having program instructions stored thereon that when executed by the computer device cause the system to perform operations comprising: receiving, over the network via the network interface, a recording comprising a reference voice recording from a first user during an enrollment process; storing the reference voice recording from the first user in memory; receiving over the network via the network interface, a first consent validation request from a first user; generating a unique validation code; transmitting, over the network via the network interface, the unique validation code to at least a first destination associated with the first user; determining if the unique validation code was received from the first user and a second user within a first threshold period of time; at least partly in response to determining that the unique validation code was received from the first user and the second user within the first threshold period of time, enabling the first user to record the first user reading a first script and the second user to record the second user reading a second script; receiving a first recording from the first user; receiving a second recording from the second user; comparing characteristics of the first recording from the first user with characteristics of the stored reference voice recording of the first user to determine whether the first recording and the stored reference voice recording of the first user are from a same person and determining via an analysis of the first recording whether the first recording indicates that the first user is intellectually competent to provide a first consent to a first action; comparing characteristics of the second recording from the second user with characteristics of a stored reference voice recording of the second user to determine whether the second recording and the stored reference voice recording of the second user are from the same person and determining via an analysis of the second recording whether the second recording indicates that the second user is intellectually competent to provide a second consent to the first action; at least partly in response to determining that: the first recording and the stored reference voice recording of the first user are from the same person and that the first user is intellectually competent to provide the first consent to the first action, and the second recording and the stored reference voice recording of the second user are from the same person and that the second user is intellectually competent to provide the second consent to the first action, generating a consent verification indication; transmitting, over the network via the network interface, to at least one destination associated with the first user, a communication providing the consent verification indication; transmitting, over the network via the network interface, to at least one destination associated with the second user, a communication providing the consent verification indication.

Optionally, the analysis of the first recording further comprises performing an analysis of a power spectrum of the first recording; comparing characteristics of the first recording from the first user with characteristics of the stored reference voice recording of the first user to determine whether the first recording and the stored reference voice recording of the first user are from the same person further comprises using a voice template; comparing characteristics of the first recording from the first user with characteristics of the stored reference voice recording of the first user to determine whether the first recording and the stored reference voice recording of the first user are from the same person further comprises performing liveness detection to determine whether the first recording is from a live person or was from a speaker transducer. Optionally, the analysis of the first recording further comprises performing an analysis of a power spectrum of the first recording. Optionally, comparing characteristics of the first recording from the first user with characteristics of the stored reference voice recording of the first user to determine whether the first recording and the stored reference voice recording of the first user are from the same person further comprises using a voice template. Optionally, comparing characteristics of the first recording from the first user with characteristics of the stored reference voice recording of the first user to determine whether the first recording and the stored reference voice recording of the first user are from the same person further comprises performing liveness detection to determine whether the first recording is from a live person or was from a speaker transducer. Optionally, the analysis of the first recording further comprises determining an estimated state of inebriation. Optionally, the operations further comprise providing content related to obtaining consent to the first user and performing a text process to measure how successfully the first user consumed the content.

An aspect of the present disclosure relates to a computer implemented method configured to perform voice authentication, the method comprising: receiving, at a computer system, a recording comprising a reference voice recording from a first user during an enrollment process; receiving, at the computer system, a first consent validation request from a first user; generating a validation code; transmitting, using the computer system, the validation code to at least a first destination associated with the first user; determining, using the computer system, if the validation code was received from the first user and a second user within a first threshold period of time; at least partly in response to determining that the validation code was received from the first user and the second user within the first threshold period of time, enabling the first user to record the first user reading a first script and the second user to record the second user reading a second script; receiving a first recording from the first user; receiving a second recording from the second user; comparing characteristics of the first recording from the first user with characteristics of the reference voice recording of the first user to determine whether the first recording and the reference voice recording of the first user are from a same person; comparing characteristics of the second recording from the second user with characteristics of a reference voice recording of the second user to determine whether the second recording and the reference voice recording of the second user are from the same person; at least partly in response to determining that: the first recording and the reference voice recording of the first user are from the same person, and the second recording and the reference voice recording of the second user are from the same person, generating, using the computer system, a consent verification indication; transmitting, using the computer system, to at least one destination associated with the first user, a communication providing the consent verification indication; transmitting to at least one destination associated with the second user, a communication providing the consent verification indication.

Optionally, the method further comprising: determining via an analysis of the first recording whether the first recording indicates that the first user is intellectually competent to provide a first consent to a first action, wherein: the analysis of the first recording further comprises performing an analysis of a power spectrum of the first recording; comparing characteristics of the first recording from the first user with characteristics of the reference voice recording of the first user to determine whether the first recording and the reference voice recording of the first user are from the same person further comprises using a voice template; and comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, determining via an analysis of the first recording whether the first recording indicates that the first user is intellectually competent to provide a first consent to a first action, wherein the analysis of the first recording further comprises performing an analysis of a power spectrum of the first recording. Optionally, comparing characteristics of the first recording from the first user with characteristics of the reference voice recording of the first user to determine whether the first recording and the reference voice recording of the first user are from the same person further comprises using a voice template. Optionally, comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the method further comprising analyzing the first recording and determining an estimated state of inebriation of the first user. Optionally, the method further comprising providing content related to obtaining consent to the first user and performing a text process to measure how successfully the first user consumed the content.

An aspect of the present disclosure relates to a non-transitory computer readable memory having program instructions stored thereon that when executed by a computing device cause the computing device to perform operations comprising: receiving a recording comprising a reference voice recording from a first user during an enrollment process; receiving a first consent validation request from a first user; enabling the first user to record the first user reading a first script and a second user to record the second user reading a second script; receiving a first recording from the first user; receiving a second recording from the second user; comparing characteristics of the first recording from the first user with characteristics of the reference voice recording of the first user to determine whether the first recording and the reference voice recording of the first user are from a same person; comparing characteristics of the second recording from the second user with characteristics of a reference voice recording of the second user to determine whether the second recording and the reference voice recording of the second user are from the same person; at least partly in response to determining that: the first recording and the reference voice recording of the first user are from the same person, and the second recording and the reference voice recording of the second user are from the same person, generating a consent verification indication; transmitting to at least one destination associated with the first user, a communication providing the consent verification indication; transmitting to at least one destination associated with the second user, a communication providing the consent verification indication.

Optionally, the operations further comprising: determining via an analysis of the first recording whether the first recording indicates that the first user is intellectually competent to provide a first consent to a first action, wherein: the analysis of the first recording further comprises performing an analysis of a power spectrum of the first recording; comparing characteristics of the first recording from the first user with characteristics of the reference voice recording of the first user to determine whether the first recording and the reference voice recording of the first user are from the same person further comprises using a voice template; comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the operations further comprising: determining via an analysis of the first recording whether the first recording indicates that the first user is intellectually competent to provide a first consent to a first action, wherein the analysis of the first recording further comprises performing an analysis of a power spectrum of the first recording. Optionally, comparing characteristics of the first recording from the first user with characteristics of the reference voice recording of the first user to determine whether the first recording and the reference voice recording of the first user are from the same person further comprises using a voice template. Optionally, comparing characteristics of the first recording from the first user with characteristics of the reference voice recording of the first user to determine whether the first recording and the reference voice recording of the first user are from the same person further comprises performing liveness detection to determine whether the first recording is from a live person or was from a speaker transducer. Optionally, the operations further comprising analyzing the first recording and determining an estimated state of inebriation of the first user. Optionally, the operations further comprising providing content related to obtaining consent to the first user and performing a text process to measure how successfully the first user consumed the content.

An aspect of the present disclosure relates to a system configured to process images, the system comprising: a computer device; non-transitory computer readable memory having program instructions stored thereon that when executed by the computer device cause the system to perform operations comprising: accessing a first plurality of images of a user captured using a camera; enhancing the first plurality of images by adjusting luminescence, contrast, and/or sharpness; locating a face in the first plurality of images using Haar cascades, a Histogram of Oriented Gradients, a Viola-Jones framework, and/or a first deep learning algorithm; locating first and second eyes in the face using a plurality of located facial landmarks and/or a convolutional neural network; locating respective pupils in the located first and second eyes; using optical flow and/or a second deep learning algorithm to determine movements of at least the first eye; detecting eye jerking of at least the first eye over two or more images in the first plurality of images based at least in part on the determined movements of the first eye; determining a distance of the detected eye jerking of the first eye and how long the detected eye jerking lasted; based at least in part on the determined distance of the detected eye jerking of the first eye and how long the detected eye jerking lasted, generating a first intoxication indicator; determining a size of a first pupil in one or more of the first plurality of images using a number of pixels in a line defining a diameter of the first pupil; based at least in part on the determined size of the first pupil, generating a second intoxication indicator; detecting, in the first plurality of images, eye blinking of at least the first eye using positions of one or more eye landmarks and/or using changes in pixel intensities over time; determining an eye blink rate of at least the first eye based at least in part on the detected eye blinking; using the determined eye blink rate of the first eye, generating a third intoxication indicator; using the first intoxication indicator, the second intoxication indicator, and the third intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the second intoxication indicator, and the third intoxication indicator are weighted differently in determining whether the user has the capacity to consent to the first act. Optionally, determining the distance of the detected eye jerking of the first eye and how long the detected eye jerking lasted, further comprises determining whether the user has nystagmus. Optionally, the system is configured to detect whether the user is smoothly moving the camera, while at least a portion of the first plurality of images are captured, using acceleration data from a three axis accelerometer associated with the camera, and at least partly in response to detecting that acceleration varies by more than a threshold amount, determine that the camera is not being smoothly moved by the user and generating a first message. Optionally, using the first intoxication indicator, the second intoxication indicator, and the third intoxication indicator, in determining whether the user has the capacity to consent to the first act, further comprises using an analysis of a voice recording from the user in determining whether the user has the capacity to consent to the first act. Optionally, system is configured to enable instructions to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured during such movements.

An aspect of the present disclosure related to a computer implemented method, the method comprising: accessing from memory a first plurality of images of a user captured using a camera, at least a portion of the first plurality of images captured while the camera was being between a side of the user's face to a front of the user's face; locating the face in the first plurality of images using Haar cascades, a Histogram of Oriented Gradients, a Viola-Jones framework, and/or a first deep learning algorithm; locating at least a first eye in the face using a plurality of located facial landmarks and/or a convolutional neural network; locating a pupil in the first eye; determining movements of the first eye in the first plurality of images; detecting eye jerking of at least the first eye over two or more images in the first plurality of images based at least in part on the determined movements of the first eye; determining a distance of the detected eye jerking of the first eye and how long the detected eyejerking lasted; based at least in part on the determined distance of the detected eyejerking of the first eye and how long the detected eye jerking lasted, generating a first intoxication indicator; using the first intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the method further comprising: determining a diameter of the pupil of the first eye in one or more of the first plurality of images using a number of pixels in a line defining a diameter of the pupil of the first eye; and wherein using the first intoxication indicator in determining whether the user has the capacity to consent to the first act, further comprises using the determined diameter of the pupil in determining whether the user has the capacity to consent to the first act. Optionally, the method further comprising: detecting, in the first plurality of images, eye blinking of the first eye using positions of one or more eye landmarks and/or using changes in pixel intensities over time; determining an eye blink rate of at least the first eye based at least in part on the detected eye blinking, wherein using the first intoxication indicator in determining whether the user has the capacity to consent to the first act, further comprises using the determined eye blink rate in determining whether the user has the capacity to consent to the first act. Optionally, the method further comprising: analyzing a voice recording of the user; and wherein using the first intoxication indicator in determining whether the user has the capacity to consent to the first act, further comprises using the analysis of the voice recording of the user in determining whether the user has the capacity to consent to the first act. Optionally, determining the distance of the detected eye jerking of the first eye and how long the detected eye jerking lasted, further comprises determining whether the user has nystagmus. Optionally, the method further comprising; detecting whether the user is smoothly moving the camera while at least a portion of the first plurality of images is captured using acceleration data from a three axis accelerometer associated with the camera; and at least partly in response to detecting that acceleration varies by more than a threshold amount: determining that the camera is not being smoothly moved by the user; and generate a first message. Optionally, the method further comprising electronically causing instructions to be audibly provided to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured during such camera movements.

An aspect of the present disclosure relates to a non-transitory computer readable memory having program instructions stored thereon that when executed by a computing device cause the computing device to perform operations comprising: accessing from memory a first plurality of images of a user captured using a camera, at least a portion of the first plurality of images captured while the camera was being moved in space between a side of the user's face to a front of the user's face; locating the face in the first plurality of images using Haar cascades, a Histogram of Oriented Gradients, a Viola-Jones framework, and/or a first deep learning algorithm; locating at least a first eye in the face using a plurality of located facial landmarks and/or a convolutional neural network; locating a pupil in the first eye; determining movements of the first eye; detecting eye jerking of at least the first eye over two or more images in the first plurality of images based at least in part on the determined movements of the first eye; determining a distance of the detected eye jerking of the first eye and how long the detected eye jerking lasted; based at least in part on the determined distance of the detected eye jerking of the first eye and how long the detected eye jerking lasted, generating a first intoxication indicator; using the first intoxication indicator, determining whether the user has a capacity to consent to a first act; and at least partly in response to determining that the user lacks the capacity to consent to the first act, causing one or more messages to be generated and transmitted to one or more respective electronic destinations.

Optionally, the operations further comprising: determining a diameter of the pupil of the first eye using a number of pixels in a line defining a diameter of the pupil of the first eye, wherein using the first intoxication indicator in determining whether the user has the capacity to consent to the first act, further comprises using the determined diameter of the pupil of the first eye in determining whether the user has the capacity to consent to the first act. Optionally, the operations further comprising: detecting, in the first plurality of images, eye blinking of the first eye using positions of one or more eye landmarks and/or using changes in pixel intensities over time; and determining an eye blink rate of at least the first eye based at least in part on the detected eye blinking, wherein using the first intoxication indicator in determining whether the user has the capacity to consent to the first act, further comprises using the determined eye blink rate in determining whether the user has the capacity to consent to the first act. Optionally, the operations further comprising: analyzing a voice recording of the user, wherein using the first intoxication indicator in determining whether the user has the capacity to consent to the first act, further comprises using the analysis of the voice recording of the user in determining whether the user has the capacity to consent to the first act. Optionally, determining the distance of the detected eye jerking of the first eye and how long the detected eye jerking lasted, further comprises determining whether the user has nystagmus. Optionally, the operations further comprising; detecting whether the user is smoothly moving the camera while at least a portion of the first plurality of images are captured using acceleration data from a three axis accelerometer associated with the camera; and at least partly in response to detecting that acceleration varies by more than a threshold amount, determine that the camera is not being smoothly moved by the user and generate a first message. Optionally, the operations further comprising electronically causing instructions to be audibly presented to the user to hold the camera in a left hand facing the user, position the camera at eye level, move the camera from far left of the user's face to directly in front of the user's face, and to hold the camera in a right hand facing the user, position the camera at eye level, move the camera from far right of the user's face to directly in front of the user's face, wherein at least a portion of the first plurality of images are captured while the camera is being moved.

An aspect of the present disclosure relates to computer-implemented method, the method comprising: accessing from memory, via a computing device, video images of a subject captured using a camera; preprocessing one or more of the video images by adjusting luminescence, contrast, and/or sharpness; locating a face in the video images using one or more face detection algorithms comprising Haar cascades, Histogram of Oriented Gradients, Viola-Jones framework, and/or a deep learning model; locating at least one eye in the face in one or more of the video images using facial landmarks and/or a feature extraction model comprising a neural network; locating a pupil in the at least one eye; determining movements of the at least one eye across a plurality of the video images using optical flow and/or deep learning-based landmark tracking, to localize positions of the pupil over time; detecting eye jerking of the at least one eye over two or more sequential video images based at least in part on the determined movements, wherein deviations in trajectory, velocity, and/or acceleration of the at least one eye that exceed corresponding threshold criteria are detected and used to detect eye jerking of the at least one eye; determining a distance of the detected eye jerking and a duration of the detected eye jerking; generating a first intoxication indicator based at least in part on the determined distance and duration of the detected eye jerking; determining a diameter, radius, and/or area of the pupil in one or more of the video images; generating a second intoxication indicator based at least in part on the determined diameter, radius, and/or area of the pupil; detecting eye blinking of the at least one eye using positions of eye landmarks and/or changes in pixel intensities over time; determining an eye blink rate based at least in part on the detected eye blinking; generating a third intoxication indicator based at least in part on the determined eye blink rate; determining, using the first, second, and third intoxication indicators, whether the subject has a mental capacity to consent to a first 'action; and causing one or more messages to be generated and transmitted to one or more respective electronic destinations regarding whether the subject has the capacity to consent to the first action.

Optionally, the first, second, and third intoxication indicators are weighted differently in determining whether the subject has the capacity to consent to the first action.

Optionally, preprocessing the images further comprises performing: resizing, cropping, color correction, and/or noise reduction.

Optionally, the method further comprises: augmenting training data used to train at least the feature extraction model using conditional generative adversarial networks (GANs) to synthesize: peri-ocular crops, a sequence of images with controlled pupil size, eyelid geometry, and/or an eye aspect ratio trajectory.

Optionally, a training dataset used in training the feature extraction model is constructed to be demographically diverse across age, gender, ethnicity, eye color, and lighting conditions to reduce bias and improve generalizability.

Optionally, image based data augmentation is applied to a frame in a dataset used to train the feature extraction model, wherein the image based data augmentation is applied frame wise and comprises cropping, resizing, vertical flipping, rotation, color jittering, noise injection, and random erasing to simulate real world acquisition variability.

Optionally, temporal augmentation is applied sequence wise to a dataset used to train the feature extraction model, wherein the temporal augmentation comprises frame dropping, frame sampling, temporal cropping, frame rate jittering, looping and/or temporal padding.

Optionally, the method further comprises training the feature extraction model to generate per frame embeddings of an eye region, and feeding the embeddings with optical flow motion cues into an LSTM (Long Short-Term Memory) network or transformer encoder to learn blink dynamics, gaze stability indices, saccade patterns, and/or nystagmus signatures over time.

Optionally, the method further comprises training the feature extraction model to extract features, wherein training comprises performing overfitting mitigation techniques comprising dropout, weight decay, data augmentation, and/or early stopping.

Optionally, training of the feature extraction model comprises using spatio temporal deep feature architectures comprising 3D CNNs to learn motion and appearance from video clips, two stream networks to combine RGB appearance with optical flow motion, CNN+LSTM stack to capture micro events, and a transformer based encoder to model long range temporal dependencies via attention.

Optionally, the method further comprises using a transformer encoder to model long range temporal dependencies via attention, wherein the transformer encoder applies positional encodings to a per frame feature sequence and integrates heterogeneous features, comprising at least two of pupil diameter, eyelid geometry, Eye Aspect Ratio (EAR), or optical flow vectors, via multi head self attention to weigh frames most predictive of stability indices.

Optionally, the method further comprises generating a training dataset of recordings of subjects, wherein recordings for a given subject are collected before and after intoxication at multiple intoxication levels and times of day, synchronized with blood alcohol content (BAC), measurements via timestamping.

Optionally, extraction of low level and mid level features in a video recording is performed using color histograms, HOG, local binary patterns, SURF keypoints, optical flow magnitudes, motion boundary histograms, trajectory features, 3D HOG, histograms of optical flow, space time interest points, and/or MoSIFT.

Optionally, determining whether the subject has the capacity to consent further comprises performing a ptosis analysis comprising: locating upper- and lower-eyelid boundaries within a peri-ocular region using facial landmark detection and/or a convolutional neural network; computing eyelid-aperture height and temporal variation in eyelid opening across sequential frames; and generating a ptosis-based intoxication indicator when the eyelid-aperture height and/or temporal variation satisfies a predetermined threshold indicative of eyelid drooping consistent with intoxication.

Optionally, generating an intoxication indicator further comprises: segmenting a scleral region of at least one eye using edge detection, contour analysis, and/or deep-learning-based semantic segmentation; determining a pixel area of visible sclera of the at least one eye across sequential frames; and generating a sclera-area-based intoxication indicator when asymmetric or excessive scleral exposure satisfies one or more intoxication thresholds.

Optionally, determining whether the subject has capacity to consent further comprises performing a sclera-redness analysis, the analysis comprising: segmenting scleral pixels using a trained segmentation model; computing redness metrics comprising normalized red-channel dominance, hue- or saturation-based vascular density, and/or spatial distribution of redness; and generating a redness-based intoxication indicator when one or more redness metrics satisfy predetermined intoxication criteria.

Optionally, preprocessing and feature extraction further comprise performing a light-refraction or eye-wetness analysis comprising: detecting corneal specular highlights using eye-landmark tracking; measuring highlight area, intensity, and/or sharpness to determine a wetness or tear-film index; and generating a wetness-based intoxication indicator when the tear-film index satisfies an intoxication threshold.

Optionally, determining whether the subject has capacity to consent further comprises performing a tear-meniscus layer analysis, the analysis comprising: capturing images of a lower eyelid margin; segmenting tear-meniscus boundaries using a trained segmentation model; measuring tear-meniscus height; and generating a tear-meniscus-based intoxication indicator when the measured tear-meniscus height satisfies a threshold indicative of intoxication-related tear-film changes.

An aspect of the present disclosure relates to a system for determining whether a subject is capable of providing valid consent to an action, the system comprising: a processor and memory storing instructions that, when executed, cause the system to: preprocess video images received from a camera by adjusting luminescence, contrast, and/or sharpness; locate a face in the video images using one or more face detection algorithms; locate at least one eye in the face using facial landmarks and/or a feature extraction model comprising a neural network; locate a pupil in the at least one eye; determine movements of the at least one eye across a plurality of images in the video images; detect eye jerking of the at least one eye over two or more images in the video images based at least in part on the determined movements; determine a distance and/or duration of the detected eye jerking; generate a first intoxication indicator based at least in part on the determined distance and/or duration of the detected eye jerking; determine a diameter, radius, and/or area of the pupil in one or more of the images of the video images; generate a second intoxication indicator based at least in part on the determined diameter, radius, and/or area of the pupil; detect eye blinking of the at least one eye using positions of eye landmarks and/or changes in pixel intensities over time; determine an eye blink rate based at least in part on the detected eye blinking; generate a third intoxication indicator based at least in part on the determined eye blink rate; determine, using the first, second, and third intoxication indicators, whether the subject has capacity to consent to the action; and cause one or more messages to be generated and transmitted to one or more respective electronic destinations identifying whether the subject has the capacity to consent to the action.

Optionally, the first, second, and third intoxication indicators are weighted differently in determining whether the subject has the capacity to consent to the action.

Optionally, the determination of the subject's capacity to consent is based on a formula comprising a weighted combination of intoxication indicators, and the subject is determined to lack capacity to consent when the weighted combination exceeds a threshold.

Optionally, the determination of the subject's capacity to consent is performed by a decision output module configured to output a binary result, a probability score, and/or a risk assessment.

Optionally, preprocessing the images further comprises: resizing one or more images to a predetermined resolution using interpolation; cropping one images without removing a peri-ocular area, by dynamically locating facial landmarks and extracting sub-images comprising detected eye regions; adjusting contrast of one or more by analyzing a distribution of pixel intensity values to detect underexposed or overexposed conditions, and adjusting brightness and contrast accordingly by modifying pixel intensity values; and performing noise reduction on one or more images by applying image filtering configured to suppress high-frequency noise.

Optionally, the system is further configured to augment training data used to train at least the feature extraction model using conditional generative adversarial networks (GANs) to synthesize peri-ocular crops, sequences of images with controlled pupil size, eyelid geometry, and eye aspect ratio trajectories.

Optionally, image-based data augmentation on training images used to train at least the feature extraction model is applied frame-wise and comprises cropping, resizing, flipping, rotation, color jittering, noise injection, and random erasing with respect to one or more training images.

Optionally, temporal augmentation on training images used to train a model configured to determine eye movements in video images in the video images is applied sequence-wise and comprises frame dropping, frame sampling, temporal cropping, frame-rate jittering, looping, and/or temporal padding.

Optionally, the feature extraction model comprises a convolutional neural network (CNN) to generate per-frame embeddings of an eye region, and the system is configured to provide the embeddings with optical-flow motion cues to an LSTM (Long Short-Term Memory) network and/or transformer encoder to learn blink dynamics, gaze stability indices, saccade patterns, and/or nystagmus signatures.

Optionally, the pupil is located using SURF to identify and describe keypoints with intensity gradients in an eye region that satisfy a first criteria, and filtering the keypoints to locate a dark, circular area characteristic of the pupil.

An aspect of the present disclosure relates to a system for determining a subject intoxication state, the system comprising: a processor and memory storing instructions that, when executed, cause the system to: preprocess video images received from a camera by adjusting luminescence, contrast, and/or sharpness; locate a face in the video images using one or more face detection algorithms; locate at least one eye in the face using facial landmarks and/or a feature extraction model comprising a neural network; locate a pupil in the at least one eye; determine movements of the at least one eye across a plurality of images in the video images; detect eye jerking of the at least one eye over two or more images in the video images based at least in part on the determined movements; determine a distance and/or duration of the detected eye jerking; generate a first intoxication indicator based at least in part on the determined distance and/or duration of the detected eye jerking; determine a diameter, radius, and/or area of the pupil in one or more of the images of the video images; generate a second intoxication indicator based at least in part on the determined diameter, radius, and/or area of the pupil; detect eye blinking of the at least one eye using positions of eye landmarks and/or changes in pixel intensities overtime; determine an eye blink rate based at least in part on the detected eye blinking; generate a third intoxication indicator based at least in part on the determined eye blink rate; determine, using the first, second, and third intoxication indicators, whether the subject has capacity to safely perform a first action; and cause one or more messages to be generated and transmitted to one or more respective electronic destinations identifying whether the subject has the capacity to safely perform a first action.

Optionally, the first, second, and third intoxication indicators are weighted differently in determining whether the subject has the capacity to safely perform the first action.

Optionally, the first action comprises operating a vehicle.

Optionally, the determination of the subject's capacity to safely perform the first action is based on a formula comprising a weighted combination of intoxication indicators, and the subject is determined to lack capacity to safely perform the first action when the weighted combination exceeds a threshold.

Optionally, the determination of the subject's capacity to safely perform the first action is performed by a decision output module configured to output a binary result, a probability score, and/or a risk assessment.

Optionally, preprocessing the images further comprises: resizing one or more images to a predetermined resolution using interpolation; cropping one images without removing a peri-ocular area, by dynamically locating facial landmarks and extracting sub-images comprising detected eye regions; adjusting contrast of one or more by analyzing a distribution of pixel intensity values to detect underexposed or overexposed conditions, and adjusting brightness and contrast accordingly by modifying pixel intensity values; and performing noise reduction on one or more images by applying image filtering configured to suppress high-frequency noise.

Optionally, the system is further configured to augment training data used to train at least the feature extraction model using conditional generative adversarial networks (GANs) to synthesize peri-ocular crops, sequences of images with controlled pupil size, eyelid geometry, and eye aspect ratio trajectories.

Optionally, image-based data augmentation on training images used to train at least the feature extraction model is applied frame-wise and comprises cropping, resizing, flipping, rotation, color jittering, noise injection, and random erasing with respect to one or more training images.

Optionally, temporal augmentation on training images used to train a model configured to determine eye movements in video images in the video images is applied sequence-wise and comprises frame dropping, frame sampling, temporal cropping, frame-rate jittering, looping, and/or temporal padding.

Optionally, the feature extraction model comprises a convolutional neural network (CNN) to generate per-frame embeddings of an eye region, and the system is configured to provide the embeddings with optical-flow motion cues to an LSTM (Long Short-Term Memory) network and/or transformer encoder to learn blink dynamics, gaze stability indices, saccade patterns, and/or nystagmus signatures.

Optionally, the pupil is located using SURF to identify and describe keypoints with intensity gradients in an eye region that satisfy a first criteria, and filtering the keypoints to locate a dark, circular area characteristic of the pupil.

Thus, as described herein, systems and methods are disclosed that overcome the technical problems related to performing user verification, while reducing the amount of memory and processing power needed to provide such verification.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, the method comprising:

accessing from memory, via a computing device, video images of a subject captured using a camera;

preprocessing one or more of the video images by adjusting luminescence, contrast, and/or sharpness;

locating a face in the video images using one or more face detection algorithms comprising Haar cascades, Histogram of Oriented Gradients, Viola-Jones framework, and/or a deep learning model;

locating at least one eye in the face in one or more of the video images using facial landmarks and/or a feature extraction model comprising a neural network;

locating a pupil in the at least one eye;

determining movements of the at least one eye across a plurality of the video images using optical flow and/or deep learning-based landmark tracking, to localize positions of the pupil over time;

detecting eye jerking of the at least one eye over two or more sequential video images based at least in part on the determined movements, wherein deviations in trajectory, velocity, and/or acceleration of the at least one eye that exceed corresponding threshold criteria are detected and used to detect eye jerking of the at least one eye;

determining a distance of the detected eye jerking and a duration of the detected eye jerking;

generating a first intoxication indicator based at least in part on the determined distance and duration of the detected eye jerking;

determining a diameter, radius, and/or area of the pupil in one or more of the video images;

generating a second intoxication indicator based at least in part on the determined diameter, radius, and/or area of the pupil;

detecting eye blinking of the at least one eye using positions of eye landmarks and/or changes in pixel intensities over time;

determining an eye blink rate based at least in part on the detected eye blinking;

generating a third intoxication indicator based at least in part on the determined eye blink rate;

determining, using the first, second, and third intoxication indicators, whether the subject has a mental capacity to consent to a first action; and causing one or more messages to be generated and transmitted to one or more respective electronic destinations regarding whether the subject has the capacity to consent to the first action.

2. The method of claim 1, wherein the first, second, and third intoxication indicators are weighted differently in determining whether the subject has the capacity to consent to the first action.

3. The method of claim 1, wherein preprocessing the images further comprises performing:

resizing, cropping, color correction, and noise reduction.

4. The method of claim 1, the method further comprising:

augmenting training data used to train at least the feature extraction model using conditional generative adversarial networks (GANs) to synthesize:

peri-ocular crops, a sequence of images with controlled pupil size, eyelid geometry, and an eye aspect ratio trajectory.

5. The method of claim 1, wherein a training dataset used in training the feature extraction model is constructed to be demographically diverse across age, gender, ethnicity, eye color, and lighting conditions to reduce bias and improve generalizability.

6. The method of claim 1, wherein image-based data augmentation is applied to a frame in a dataset used to train the feature extraction model, wherein the image-based data augmentation is applied frame-wise and comprises cropping, resizing, vertical flipping, rotation, color jittering, noise injection, and random erasing to simulate real-world acquisition variability.

7. The method of claim 1, wherein temporal augmentation is applied sequence-wise to a dataset used to train the feature extraction model, wherein the temporal augmentation comprises frame dropping, frame sampling, temporal cropping, frame-rate jittering, looping and/or temporal padding.

8. The method of claim 1, the method further comprising training the feature extraction model to generate per-frame embeddings of an eye region, and feeding the embeddings with optical-flow motion cues into an LSTM (Long Short-Term Memory) network or transformer encoder to learn blink dynamics, gaze stability indices, saccade patterns, and/or nystagmus signatures over time.

9. The method of claim 1, the method further comprising training the feature extraction model to extract features, wherein training comprises performing overfitting mitigation techniques comprising dropout, weight decay, data augmentation, and/or early stopping.

10. The method of claim 1, wherein training of the feature extraction model comprises using spatio-temporal deep feature architectures comprising 3D CNNs to learn motion and appearance from video clips, two-stream networks to combine RGB appearance with optical-flow motion, CNN+LSTM stack to capture micro-events, and a transformer-based encoder to model long-range temporal dependencies via attention.

11. The method of claim 1, the method further comprising using a transformer encoder to model long-range temporal dependencies via attention, wherein the transformer encoder applies positional encodings to a per-frame feature sequence and integrates heterogeneous features, comprising at least two of pupil diameter, eyelid geometry, Eye Aspect Ratio (EAR), or optical-flow vectors, via multi-head self-attention to weigh frames most predictive of stability indices.

12. The method of claim 1, the method further comprising generating a training dataset of recordings of subjects, wherein recordings for a given subject are collected before and after intoxication at multiple intoxication levels and times of day, synchronized with blood alcohol content (BAC) measurements via timestamping.

13. The method of claim 1, wherein extraction of low-level and mid-level features in a video recording is performed using color histograms, HOG, local binary patterns, SURF keypoints, optical-flow magnitudes, motion boundary histograms, trajectory features, 3D-HOG, histograms of optical flow, space-time interest points, and/or MoSIFT.

14. The method of claim 1, wherein determining whether the subject has the capacity to consent further comprises performing a ptosis analysis comprising:
- locating upper- and lower-eyelid boundaries within a peri-ocular region using facial landmark detection and/or a convolutional neural network;
- computing eyelid-aperture height and temporal variation in eyelid opening across sequential frames; and
- generating a ptosis-based intoxication indicator when the eyelid-aperture height and/or temporal variation satisfies a predetermined threshold indicative of eyelid drooping consistent with intoxication.

15. The method of claim 1, wherein generating an intoxication indicator further comprises:
- segmenting a scleral region of at least one eye using edge detection, contour analysis, and/or deep-learning-based semantic segmentation;
- determining a pixel area of visible sclera of the at least one eye across sequential frames; and
- generating a sclera-area-based intoxication indicator when asymmetric or excessive scleral exposure satisfies one or more intoxication thresholds.

16. The method of claim 1, wherein determining whether the subject has capacity to consent further comprises performing a sclera-redness analysis, the analysis comprising:
- segmenting scleral pixels using a trained segmentation model;
- computing redness metrics comprising normalized red-channel dominance, hue- or saturation-based vascular density, and/or spatial distribution of redness; and
- generating a redness-based intoxication indicator when one or more redness metrics satisfy predetermined intoxication criteria.

17. The method of claim 1, wherein preprocessing and feature extraction further comprise performing a light-refraction or eye-wetness analysis comprising:
- detecting corneal specular highlights using eye-landmark tracking;
- measuring highlight area, intensity, and/or sharpness to determine a wetness or tear-film index; and
- generating a wetness-based intoxication indicator when the tear-film index satisfies an intoxication threshold.

18. The method of claim 1, wherein determining whether the subject has capacity to consent further comprises performing a tear-meniscus layer analysis, the analysis comprising:
- capturing images of a lower eyelid margin;
- segmenting tear-meniscus boundaries using a trained segmentation model;
- measuring tear-meniscus height; and
- generating a tear-meniscus-based intoxication indicator when the measured tear-meniscus height satisfies a threshold indicative of intoxication-related tear-film changes.

19. A system for determining whether a subject is capable of providing valid consent to an action, the system comprising:
- a processor and memory storing instructions that, when executed, cause the system to:
  - preprocess video images received from a camera by adjusting luminescence, contrast, and/or sharpness;
  - locate a face in the video images using one or more face detection algorithms;
  - locate at least one eye in the face using facial landmarks and/or a feature extraction model comprising a neural network;
  - locate a pupil in the at least one eye;
  - determine movements of the at least one eye across a plurality of images in the video images;
  - detect eye jerking of the at least one eye over two or more images in the video images based at least in part on the determined movements;
  - determine a distance and/or duration of the detected eye jerking;
  - generate a first intoxication indicator based at least in part on the determined distance and/or duration of the detected eye jerking;
  - determine a diameter, radius, and/or area of the pupil in one or more of the images of the video images;
  - generate a second intoxication indicator based at least in part on the determined diameter, radius, and/or area of the pupil;
  - detect eye blinking of the at least one eye using positions of eye landmarks and/or changes in pixel intensities over time;
  - determine an eye blink rate based at least in part on the detected eye blinking;
  - generate a third intoxication indicator based at least in part on the determined eye blink rate;

determine, using the first, second, and third intoxication indicators, whether the subject has capacity to consent to the action; and cause one or more messages to be generated and transmitted to one or more respective electronic destinations identifying whether the subject has the capacity to consent to the action.

20. The system of claim 19, wherein the first, second, and third intoxication indicators are weighted differently in determining whether the subject has the capacity to consent to the action.

21. The system of claim 19, wherein the determination of the subject's capacity to consent is based on a formula comprising a weighted combination of intoxication indicators, and the subject is determined to lack capacity to consent when the weighted combination exceeds a threshold.

22. The system of claim 19, wherein the determination of the subject's capacity to consent is performed by a decision output module configured to output a binary result, a probability score, and/or a risk assessment.

23. The system of claim 19, wherein preprocessing the images further comprises:

resizing one or more images to a predetermined resolution using interpolation;

cropping one images without removing a peri-ocular area, by dynamically locating facial landmarks and extracting sub-images comprising detected eye regions;

adjusting contrast of one or more by analyzing a distribution of pixel intensity values to detect underexposed or overexposed conditions, and adjusting brightness and contrast accordingly by modifying pixel intensity values; and performing noise reduction on one or more images by applying image filtering configured to suppress high-frequency noise.

24. The system of claim 19, wherein the system is further configured to augment training data used to train at least the feature extraction model using conditional generative adversarial networks (GANs) to synthesize peri-ocular crops, sequences of images with controlled pupil size, eyelid geometry, and eye aspect ratio trajectories.

25. The system of claim 19, wherein image-based data augmentation on training images used to train at least the feature extraction model is applied frame-wise and comprises cropping, resizing, flipping, rotation, color jittering, noise injection, and random erasing with respect to one or more training images.

26. The system of claim 19, wherein temporal augmentation on training images used to train a model configured to determine eye movements in video images in the video images is applied sequence-wise and comprises frame dropping, frame sampling, temporal cropping, frame-rate jittering, looping, and/or temporal padding.

27. The system of claim 19, wherein the feature extraction model comprises a convolutional neural network (CNN) to generate per-frame embeddings of an eye region, and the system is configured to provide the embeddings with optical-flow motion cues to an LSTM (Long Short-Term Memory) network and/or transformer encoder to learn blink dynamics, gaze stability indices, saccade patterns, and/or nystagmus signatures.

28. The system of claim 19, wherein the pupil is located using SURF to identify and describe keypoints with intensity gradients in an eye region that satisfy a first criteria, and filtering the keypoints to locate a dark, circular area characteristic of the pupil.

* * * * *